(12) United States Patent
Muratani

(10) Patent No.: US 8,125,712 B2
(45) Date of Patent: Feb. 28, 2012

(54) ZOOM LENS SYSTEM AND OPTICAL APPARATUS USING THE SAME

(75) Inventor: Mami Muratani, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/023,075

(22) Filed: Jan. 31, 2008

(65) Prior Publication Data

US 2008/0198463 A1 Aug. 21, 2008

(30) Foreign Application Priority Data

Feb. 16, 2007 (JP) ................................. 2007-036779

(51) Int. Cl.
*G02B 27/64* (2006.01)
(52) U.S. Cl. ........................ 359/557; 359/676; 359/691
(58) Field of Classification Search .................. None
See application file for complete search history.

(56) References Cited

U.S. PATENT DOCUMENTS

| | | | |
|---|---|---|---|
| 4,993,814 A | 2/1991 | Hata | |
| 5,283,693 A | 2/1994 | Kohno et al. | |
| 5,446,592 A | 8/1995 | Kohno et al. | |
| 5,652,678 A | 7/1997 | Suzuki et al. | |
| 6,025,961 A | 2/2000 | Kohno et al. | |
| 6,124,987 A | 9/2000 | Kayanuma et al. | |
| 7,177,096 B2 | 2/2007 | Enomoto | |
| 7,436,601 B2 | 10/2008 | Watanabe | |
| 2006/0023319 A1 | 2/2006 | Terada et al. | |
| 2006/0082897 A1 | 4/2006 | Enomoto | |
| 2006/0092525 A1 | 5/2006 | Sato et al. | |
| 2006/0103946 A1 | 5/2006 | Nagai et al. | |
| 2006/0215275 A1* | 9/2006 | Ori | 359/680 |
| 2006/0274427 A1 | 12/2006 | Wantanabe | |
| 2007/0070518 A1* | 3/2007 | Muratani et al. | 359/680 |

FOREIGN PATENT DOCUMENTS

| | | |
|---|---|---|
| CN | 1758084 A | 4/2008 |
| JP | 06-337374 A | 12/1994 |
| JP | 8-122638 A | 5/1996 |
| JP | 9-33809 A | 2/1997 |
| JP | 9-311273 A | 12/1997 |

(Continued)

OTHER PUBLICATIONS

Geary, Introduction to Lens Design: With practical Zemax examples, Willmann-Bell Inc., Richmond, VA, 2002, p. 23.*

*Primary Examiner* — Lee Fineman
(74) *Attorney, Agent, or Firm* — Miles & Stockbridge P.C.

(57) ABSTRACT

Providing a zoom lens system with a vibration reduction function excellently correcting aberrations with accomplishing compact, lightweight, and slim upon being accommodated, and to provide an optical apparatus using the zoom lens system. The system consists of, in order from an object, a first group having negative power, a second group having positive power. Upon zooming from a wide-angle end to a telephoto end, a distance between the first group and the second group decreases. The first group consists of, in order from the object, a first lens having negative power and a second lens having positive power. The second group consists of, in order from the object, a third lens having positive power, a fourth lens having negative power, and a fifth lens having positive power. An image blur is corrected by shifting the second group as a whole in a direction substantially perpendicular to the optical axis.

24 Claims, 51 Drawing Sheets

FOREIGN PATENT DOCUMENTS

| | | |
|---|---|---|
| JP | 2001-215407 A | 8/2001 |
| JP | 2003-131128 A | 5/2003 |
| JP | 2004-252099 A | 9/2004 |
| JP | 2006-039180 A | 2/2006 |
| JP | 2006-133755 A | 5/2006 |
| JP | 2006-171429 A | 6/2006 |

* cited by examiner

ZOOM LENS SYSTEM AND OPTICAL APPARATUS USING THE SAME

The disclosure of the following priority application is herein incorporated by reference:

Japanese Patent Application No. 2007-036779 filed on Feb. 16, 2007.

BACKGROUND OF THE INVENTION

1. Field of the Invention

The present invention relates to a zoom lens system and an optical apparatus using the zoom lens system.

2. Related Background Art

With increasing miniaturizing trend of digital cameras, an optical system loaded thereon has strongly been required to be compact and lightweight to increase portability. With increasing integration of solid-state imaging devices, there has been required a zoom lens system capable of providing high contrast with respect to a higher spatial frequency. There has been proposed a negative-leading zoom lens system suitable for a compact digital camera using such a solid-state imaging device in Japanese Patent Application Laid-Open No. 2006-133755.

Upon taking a picture, a camera shake is a cause of severely deteriorating resolution. Accordingly, in a so-called consumer-type digital camera, which is relatively low price and widely distributed, a compact, lightweight zoom lens with a vibration reduction function for correcting an image blur caused by a camera shake has been required.

SUMMARY OF THE INVENTION

The present invention is made in view of the aforementioned problems.

According to a first aspect of the present invention, there is provided a zoom lens system consisting of, in order from an object: a first lens group having negative refractive power; a second lens group having positive refractive power; upon varying a state of lens group positions from a wide-angle end state to a telephoto end state, a distance between the first lens group and the second lens group decreasing, the first lens group consisting of, in order from the object, a first lens having negative refractive power and a second lens having positive refractive power, the second lens group consisting of, in order from the object, a third lens having positive refractive power, a fourth lens having negative refractive power, and a fifth lens having positive refractive power, and at least a portion of the second lens group being moved in a direction substantially perpendicular to an optical axis.

In the first aspect of the present invention, it is preferable that the first lens has at least one aspherical surface.

In the first aspect of the present invention, it is preferable that the aspherical surface is disposed at least on an image side surface of the first lens.

In the first aspect of the present invention, it is preferable that the third lens, the fourth lens, and the fifth lens are disposed with respective air spaces in between.

In the first aspect of the present invention, the following conditional expression (1) is preferably satisfied:

$$0.02 < 100 \times \alpha^2 / (-f1) \times ft < 2.90 \quad (1)$$

where α denotes an amount of shift of at least a portion of the second lens group in the direction substantially perpendicular to the optical axis for vibration reduction, f1 denotes a focal length of the first lens group, and ft denotes a focal length of the zoom lens system in the telephoto end state.

In the first aspect of the present invention, the following conditional expression (2) is preferably satisfied:

$$0.20 < fw \times f2 / (-f1)^2 < 0.40 \quad (2)$$

where fw denotes a focal length of the zoom lens system in the wide-angle end state, f1 denotes a focal length of the first lens group, and f2 denotes a focal length of the second lens group.

In the first aspect of the present invention, the following conditional expression (3) is preferably satisfied:

$$0.76 < S2/fw < 1.30 \quad (3)$$

where S2 denotes a thickness of the second lens group, and fw denotes a focal length of the zoom lens system in the wide-angle end state.

In the first aspect of the present invention, the following conditional expression (4) is preferably satisfied:

$$1.05 < FNw \times fw / (-f1) < 1.85 \quad (4)$$

where FNw denotes an f-number of the zoom lens system in the wide-angle end state, fw denotes a focal length of the zoom lens system in the wide-angle end state, and f1 denotes a focal length of the first lens group.

In the first aspect of the present invention, the following conditional expression (5) is preferably satisfied:

$$0.10 < \Delta sag/fw < 0.50 \quad (5)$$

where $\Delta sag = XS(h) - X(h)$, in which sag amounts $XS(h)$ and $X(h)$ are denoted by the following spherical expression $XS(h)$ and aspherical expression $X(h)$ upon $y = h = 0.85r$:

$$XS(y) = y^2 / [r \times \{1 + (1 - y^2/r^2)^{1/2}\}]$$

$$X(y) = y^2 / [r \times \{1 + (1 - K \times y^2/r^2)^{1/2}\}] + C4 \times y^4 + C6 \times y^6 + C8 \times y^8 + C10 \times y^{10}$$

where y denotes a vertical height from the optical axis, $X(y)$ denotes a sag amount which is a distance along the optical axis from the tangent surface at the vertex of the aspherical surface to the aspherical surface at the vertical height y from the optical axis, $XS(y)$ denotes a sag amount which is a distance along the optical axis from the tangent surface at the vertex of the reference sphere at the vertical height y from the optical axis, r denotes a radius of curvature of a reference sphere (paraxial radius of curvature), K denotes a conical coefficient, and Cn denotes aspherical coefficient of n-th order, and where $X(y)$ and $XS(y)$ are positive toward the image plane.

In the first aspect of the present invention, the following conditional expression (6) is preferably satisfied:

$$TLw/f34 < 2.90 \quad (6)$$

where TLw denotes a total lens length of the zoom lens system in the wide-angle end state, and f34 denotes a focal length of an air distance between the image side surface of the third lens and the object side surface of the fourth lens, which is defined by the following expression:

$$(1/f34) = ((1-n3)/r3R) + ((n4-1)/r4F) + d34 \times ((1-n3)/r3R) \times ((n4-1)/r4F)$$

where r3R denotes a radius of curvature of the image side surface of the third lens, r4F denotes a radius of curvature of the object side surface of the fourth lens, n3 denotes refractive index of the third lens at d-line (λ=587.6 nm), n4 denotes refractive index of the fourth lens at d-line (λ=587.6 nm), and d34 denotes a distance between the image side surface of the third lens and the object side surface of the fourth lens.

In the first aspect of the present invention, the following conditional expression (7) is preferably satisfied:

$$-1.10 < fw/f45 \quad (7)$$

where fw denotes a focal length of the zoom lens system in the wide-angle end state, and f45 denotes a focal length of an air distance between the image side surface of the fourth lens and the object side surface of the fifth lens, which is defined by the following expression:

$$(1/f45) = ((1-n4)/r4R) + ((n5-1)/r5F) + d45 \times ((1-n4)/r4R) \times ((n5-1)/r5F)$$

where r4R denotes a radius of curvature of the image side surface of the fourth lens, r5F denotes a radius of curvature of the object side surface of the fifth lens, n4 denotes refractive index of the fourth lens at d-line (λ=587.6 nm), n5 denotes refractive index of the fifth lens at d-line (λ=587.6 nm), and d45 denotes a distance between the image side surface of the fourth lens and the object side surface of the fifth lens.

In the first aspect of the present invention, it is preferable that the third lens has at least one aspherical surface.

In the first aspect of the present invention, the following conditional expression (8) is preferably satisfied:

$$1.85 < Z \times S1/S2 < 5.00 \quad (8)$$

where S1 denotes the thickness of the first lens group, S2 denotes the zoom ratio.

In the first aspect of the present invention, it is preferable that the second lens group as a whole is moved in a direction substantially perpendicular to an optical axis.

According to a second aspect of the present invention, there is provided an optical apparatus using the zoom lens system according to the first aspect.

According to a third aspect of the present invention, there is provided a method for correcting an image blur of a zoom lens system that consists of, in order from an object, a first lens group having negative refractive power and a second lens group having positive refractive power, a distance between the first lens group and the second lens group decreasing upon varying a state of lens group positions from a wide-angle end state to a telephoto end state, the first lens group consisting of, in order from the object, a first lens having negative refractive power and a second lens having positive refractive power, and the second lens group consisting of, in order from the object, a third lens having positive refractive power, a fourth lend having negative refractive power, and a fifth lens having positive refractive power, the method comprising a step of: shifting at least a portion of the second lens group in a direction substantially perpendicular to an optical axis.

In the third aspect of the present invention, it is preferable that the first lens has at least one aspherical surface, and the aspherical surface is disposed at least on an image side surface of the first lens.

In the third aspect of the present invention, the following conditional expression (1) is preferably satisfied:

$$0.02 < 100 \times \alpha^2/(-f1) \times ft < 2.90 \quad (1)$$

where α denotes an amount of shift of at least a portion of the second lens group in the direction substantially perpendicular to the optical axis for vibration reduction, f1 denotes a focal length of the first lens group, and ft denotes a focal length of the zoom lens system in the telephoto end state.

In the third aspect of the present invention, the following conditional expression (2) is preferably satisfied:

$$0.20 < fw \times f2/(-f1)^2 < 0.40 \quad (2)$$

where fw denotes a focal length of the zoom lens system in the wide-angle end state, f1 denotes a focal length of the first lens group, and f2 denotes a focal length of the second lens group.

In the third aspect of the present invention, the following conditional expression (3) is preferably satisfied:

$$0.76 < S2/fw < 1.30 \quad (3)$$

where S2 denotes a thickness of the second lens group, and fw denotes a focal length of the zoom lens system in the wide-angle end state.

In the third aspect of the present invention, the following conditional expression (5) is preferably satisfied:

$$0.10 < \Delta sag/fw < 0.50 \quad (5)$$

where $\Delta sag = XS(h) - X(h)$, in which sag amounts XS(h) and X(h) are denoted by the following spherical expression XS(h) and aspherical expression X(h) upon y=h=0.85r:

$$XS(y) = y^2 / [r \times \{1 + (1 - y^2/r^2)^{1/2}\}]$$

$$X(y) = y^2 / [r \times \{1 + (1 - K \times y^2/r^2)^{1/2}\}] + C4 \times y^4 + C6 \times y^6 + C8 \times y^8 + C10 \times y^{10}$$

where y denotes a vertical height from the optical axis, X(y) denotes a sag amount which is a distance along the optical axis from the tangent surface at the vertex of the aspherical surface to the aspherical surface at the vertical height y from the optical axis, XS(y) denotes a sag amount which is a distance along the optical axis from the tangent surface at the vertex of the reference sphere at the vertical height y from the optical axis, r denotes a radius of curvature of a reference sphere (paraxial radius of curvature), K denotes a conical coefficient, and Cn denotes aspherical coefficient of n-th order, and where X(y) and XS(y) are positive toward the image plane.

In the third aspect of the present invention, the following conditional expression (8) is preferably satisfied:

$$1.85 < Z \times S1/S2 < 5.00 \quad (8)$$

where S1 denotes the thickness of the first lens group, S2 denotes the thickness of the second lens group, and Z denotes the zoom ratio.

According to a fourth aspect of the present invention, there is provided a method for varying a focal length of a zoom lens system that consists of, in order from an object, a first lens group having negative refractive power and a second lens group having positive refractive power, the first lens group consisting of, in order from the object, a first lens having negative refractive power and a second lens having positive refractive power, and the second lens group consisting of, in order from the object, a third lens having positive refractive power, a fourth lend having negative refractive power, and a fifth lens having positive refractive power, and at least a portion of the second lens group being shifted in a direction substantially perpendicular to an optical axis, the method comprising a step of: decreasing a distance between the first lens group and the second lens group upon varying a state of lens group positions from a wide-angle end state to a telephoto end state.

In the fourth aspect of the present invention, it is preferable that the first lens has at least one aspherical surface.

In the fourth aspect of the present invention, it is preferable that the third lens, the fourth lens and the fifth lens are disposed with respective air spaces in between.

The present invention makes it possible to provide a zoom lens system with a vibration reduction function excellently correcting various aberrations with accomplishing to be compact, lightweight, and slim upon being accommodated, and to provide an optical apparatus using the zoom lens system.

BRIEF DESCRIPTION OF THE DRAWINGS

FIGS. 1A and 1B are diagrams showing an electronic still camera which is equipped with a zoom lens system with a vibration reduction function according to the present embodiment explained later, in which FIG. 1A is a front view and FIG. 1B is a rear view.

FIGS. 4A, 4B and 4C are graphs showing various aberrations of the zoom lens system according to Example 1 upon focusing on infinity, in which FIG. 4A shows the wide-angle end state, FIG. 4B shows the intermediate focal length state, and FIG. 4C shows the telephoto end state.

FIGS. 5A, 5B, 5C are graphs showing coma upon shifting a vibration reduction lens group of the zoom lens system according to Example 1, in which FIG. 5A shows the wide-angle end state, FIG. 5B shows the intermediate focal length state, and FIG. 5C shows the telephoto end state.

FIGS. 7A, 7B and 7C are graphs showing various aberrations of the zoom lens system according to Example 2 upon focusing on infinity, in which FIG. 7A shows the wide-angle end state, FIG. 7B shows the intermediate focal length state, and FIG. 7C shows the telephoto end state.

FIGS. 8A, 8B, 8C are graphs showing coma upon shifting a vibration reduction lens group of the zoom lens system according to Example 2, in which FIG. 8A shows the wide-angle end state, FIG. 8B shows the intermediate focal length state, and FIG. 8C shows the telephoto end state.

FIGS. 10A, 10B and 10C are graphs showing various aberrations of the zoom lens system according to Example 3 upon focusing on infinity, in which FIG. 10A shows the wide-angle end state, FIG. 10B shows the intermediate focal length state, and FIG. 10C shows the telephoto end state.

FIGS. 11A, 11B, 11C are graphs showing coma upon shifting a vibration reduction lens group of the zoom lens system according to Example 3, in which FIG. 11A shows the wide-angle end state, FIG. 11B shows the intermediate focal length state, and FIG. 11C shows the telephoto end state.

FIGS. 13A, 13B and 13C are graphs showing various aberrations of the zoom lens system according to Example 4 upon focusing on infinity, in which FIG. 13A shows the wide-angle end state, FIG. 13B shows the intermediate focal length state, and FIG. 13C shows the telephoto end state.

FIGS. 14A, 14B, 14C are graphs showing coma upon shifting a vibration reduction lens group of the zoom lens system according to Example 4, in which FIG. 14A shows the wide-angle end state, FIG. 14B shows the intermediate focal length state, and FIG. 14C shows the telephoto end state.

FIGS. 16A, 16B and 16C are graphs showing various aberrations of the zoom lens system according to Example 5 upon focusing on infinity, in which FIG. 16A shows the wide-angle end state, FIG. 16B shows the intermediate focal length state, and FIG. 16C shows the telephoto end state.

FIGS. 17A, 17B, 17C are graphs showing coma upon shifting a vibration reduction lens group of the zoom lens system according to Example 5, in which FIG. 17A shows the wide-angle end state, FIG. 17B shows the intermediate focal length state, and FIG. 17C shows the telephoto end state.

FIGS. 19A, 19B and 19C are graphs showing various aberrations of the zoom lens system according to Example 6 upon focusing on infinity, in which FIG. 19A shows the wide-angle end state, FIG. 19B shows the intermediate focal length state, and FIG. 19C shows the telephoto end state.

FIGS. 20A, 20B, 20C are graphs showing coma upon shifting a vibration reduction lens group of the zoom lens system according to Example 6, in which FIG. 20A shows the wide-angle end state, FIG. 20B shows the intermediate focal length state, and FIG. 20C shows the telephoto end state.

FIGS. 22A, 22B and 22C are graphs showing various aberrations of the zoom lens system according to Example 7 upon focusing on infinity, in which FIG. 22A shows the wide-angle end state, FIG. 22B shows the intermediate focal length state, and FIG. 22C shows the telephoto end state.

FIGS. 23A, 23B, 23C are graphs showing coma upon shifting a vibration reduction lens group of the zoom lens system according to Example 7, in which FIG. 23A shows the wide-angle end state, FIG. 23B shows the intermediate focal length state, and FIG. 23C shows the telephoto end state.

DETAILED DESCRIPTION OF THE MOST PREFERRED EMBODIMENT

The present embodiment is going to be explained below.

Figure 1A:
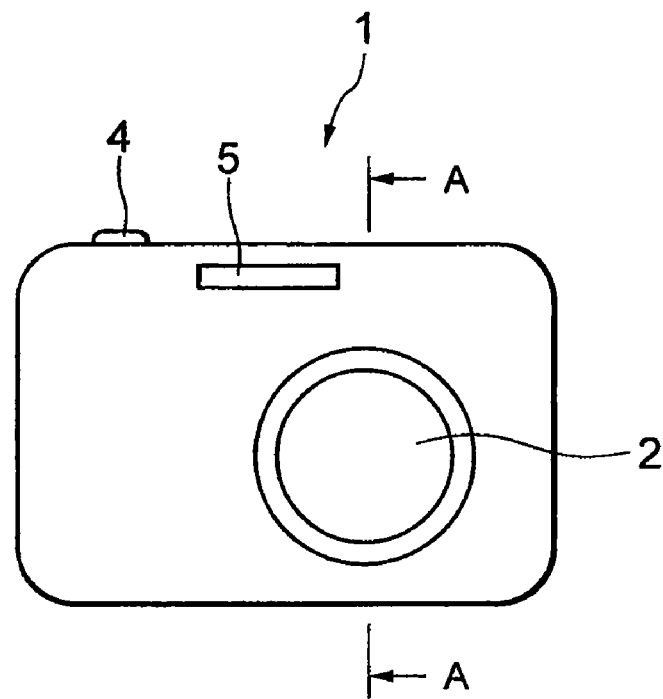
Figure 1B:
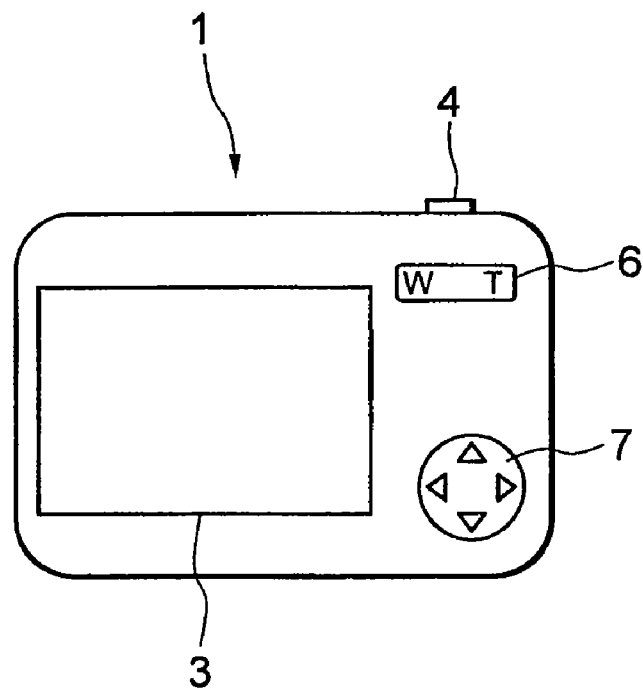
Figure 2:
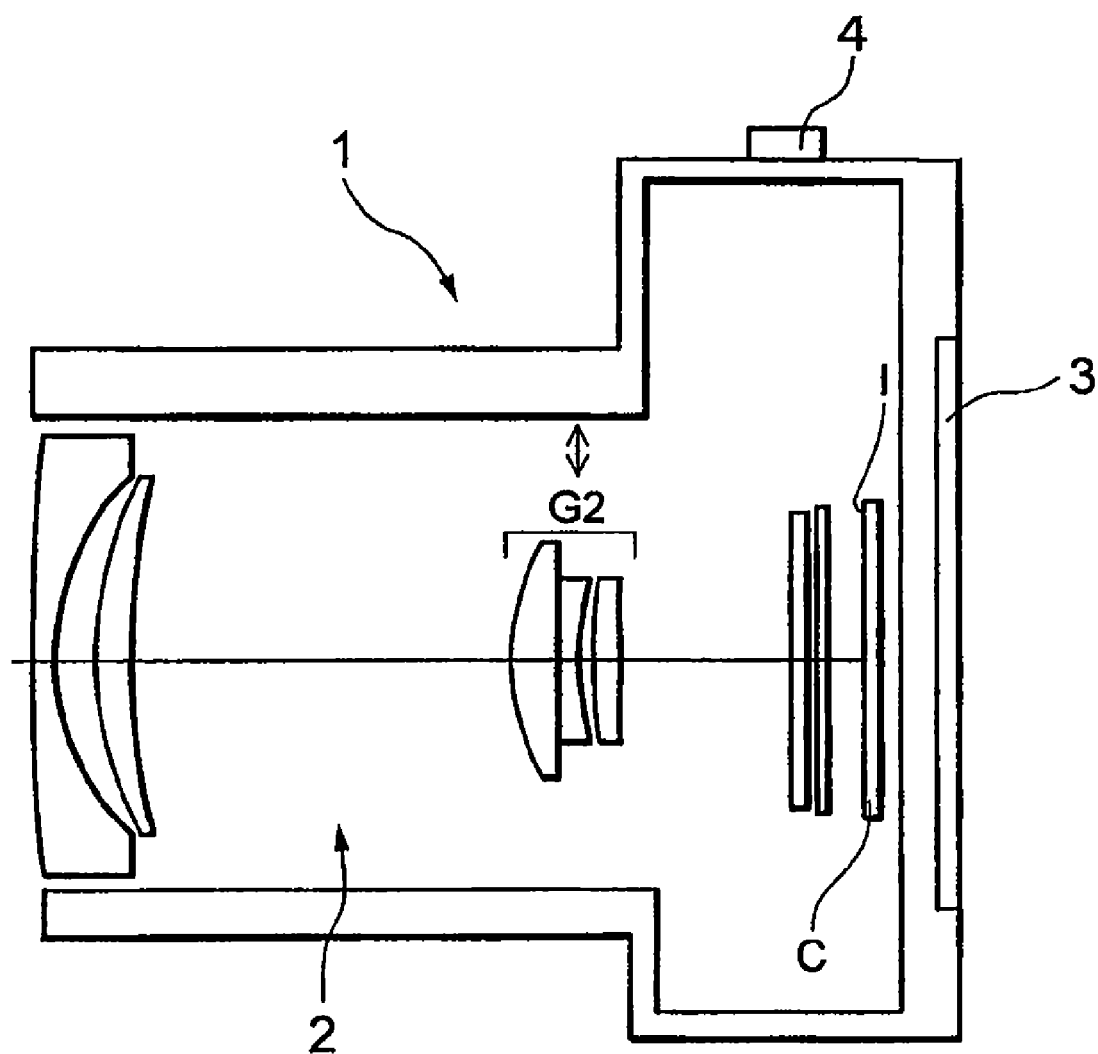
FIG. 2 is a cross-sectional view along the A-A line in FIG. 1A.

FIGS. 1A and 1B are diagrams showing an electronic still camera equipped with a zoom lens system with a vibration reduction function (hereinafter simply called a zoom lens system) according to the present embodiment, which is explained later, in which FIG. 1A is a front view and FIG. 1B is a rear view. FIG. 2 is a cross-sectional view along the A-A line in FIG. 1A.

In an electronic still camera 1 (hereinafter called a camera) according to the present embodiment shown in FIGS. 1A, 1B and 2, when a power switch button (not shown) is pressed, a shutter (not shown) of an image-taking lens 2 is opened and light from a subject (not shown) is collected by the image-taking lens 2 and an image is formed on an imaging device C (such as CCD, CMOS, and the like) disposed on an image plane I. The subject image formed on the imaging device C is displayed on a liquid crystal monitor 3 disposed backside of the camera 1. After fixing the composition of the subject image with observing the liquid crystal monitor 3, a photographer depresses a release button 4 to take a picture of the subject image by the imaging device C, and stores in a memory (not shown). On this occasion, a camera shake of the camera 1 due to hand movement and the like is detected by an angular velocity sensor (not shown), a vibration reduction lens group G2 disposed in the image-taking lens 2 is shifted in a direction perpendicular to an optical axis of the image-taking lens 2 by a vibration reduction mechanism (not shown) so as to correct an image blur on an image plane I caused by the camera shake of the camera 1.

The image-taking lens 2 is composed of a zoom lens system 2 according to the present embodiment explained later. Moreover, in the camera 1, there are disposed such as an auxiliary light emitter 5 that emits auxiliary light when the subject is dark, a W-T button 6 that makes the zoom lens system, which is the image-taking lens 2, zoom from a wide-angle end state (W) to a telephoto end state (T), and a function button 7 that is used for setting various conditions of the camera 1.

In this manner, the camera 1 equipped with the zoom lens system 2 according to the present embodiment explained later is composed.

Then, a zoom lens system according to the present embodiment is explained below.

A zoom lens system according to the present embodiment consists of, in order from an object, a first lens group having negative refractive power, and a second lens group having positive refractive power. When a state of the focal length varies from a wide-angle end state to a telephoto end state, a distance between the first lens group and the second lens group decreases. The first lens group consists of, in order from an object, a first lens having negative refractive power and an aspherical surface, and a second lens having positive refractive power. The second lens group consists of, in order from an object, a third lens having positive refractive power, a fourth lens having negative refractive power, and a fifth lens having positive refractive power. An image blur is corrected by shifting the second lens group in a body in a direction substantially perpendicular to an optical axis.

In such a two-lens-group zoom lens system composed of, in order from the object, a first lens group having negative refractive power, and a second lens group having positive refractive power, since the number of the lens groups is few, aberrations can be kept within preferable level with making configuration of each lens group relatively simple. With configuring the second lens group by three lenses which is, in order from the object, a third lens having positive refractive power, a fourth lens having negative refractive power, and a fifth lens having positive refractive power, it becomes possible to accomplish both compactness and preferable optical performance.

In such a negative-positive two-lens-group zoom lens system, the number of the lens groups can be few, and configuration of each lens group can be relatively simple. However, since the zoom lens system as a whole becomes a retro focus type, there is a disadvantage that distortion becomes large in the wide-angle end state. Since the height of incident light of the first lens group largely varies between the wide-angle end state and the telephoto end state, it is the most effective to correct distortion in the wide-angle end state by the first lens group. However, since to make larger the dimension of the first lens group directly affects the dimension of the whole zoom lens system, the first lens group should be made slim and small as much as possible. In order not to make the first lens group thicker with keeping the number of the lenses two and with excellently correcting distortion, it is very effective to dispose an aspherical surface on the first lens having negative refractive power in the first lens group.

Moreover, in such a negative-positive two-lens-group zoom lens system, since the diameter of the second lens group can generally be made smaller than that of the first lens group, it is preferable that vibration reduction is carried out by shifting (a) lens(es) in the second lens group. In the zoom lens system according to the present embodiment, since the second lens group is compact and light weight, it becomes possible to shift the second lens group as a hole, so that a drive mechanism for the vibration reduction becomes simple.

As a vibration reduction method, in order to correct an image blur, it can be considered that a portion of a lens group is shifted in a direction substantially perpendicular to the optical axis. However, to shift a lens group in a body means that a plurality of lenses, whose generation of coma upon vibration reduction is small, can be shifted in a body, so that vibration reduction effect can be obtained with reducing deterioration in optical performance upon decentering in comparison with a case where a portion of a lens group is shifted.

The aspherical surface of the first lens is preferably disposed at least on the image side surface so as to correct distortion.

In a zoom lens system according to the present embodiment, the third lens, the fourth lens, and the fifth lens are preferably disposed with respective air spaces in between. With composing the second lens group, in order from the object, the third lens having positive refractive power, the fourth lens having negative refractive power, and the fifth lens having positive refractive power without cementing each other, the second lens group becomes a triplet type, so that it becomes possible to accomplish both compactness and excellent optical performance.

In a zoom lens system according to the present embodiment, when an image blur is corrected by shifting the vibration reduction lens group in a direction substantially perpendicular to the optical axis, the shifting amount of the second lens group as the vibration reduction lens group in a direction perpendicular to the optical axis varies somewhat in accordance with the vibration reduction effect. In consideration of an amount of the image blur able to be dealt with, in other words, the ratio of image movement to the amount of the shift, the focal length of the first lens group has to be considered in accordance with the focal length in the telephoto end state. In a zoom lens system according to the present embodiment, in order to accomplish compactness with carrying out vibration reduction, the following conditional expression (1) is preferably satisfied:

$$0.02 < 100 \times \alpha^2/(-f1) \times ft < 2.90 \tag{1}$$

where $\alpha$ denotes an amount of shift of the second lens group in the direction substantially perpendicular to the optical axis for vibration reduction, f1 denotes a focal length of the first lens group, and ft denotes a focal length of the zoom lens system in the telephoto end state.

Conditional expression (1) defines an appropriate range of the amount of shift of the second lens group as the vibration reduction lens group in the direction perpendicular to the optical axis normalized by the focal length in the telephoto end state and the focal length of the first lens group.

When the ratio $100 \times \alpha^2/(-f1) \times ft$ is equal to or falls below the lower limit of conditional expression (1), the amount of shift of the second lens group upon vibration reduction becomes small, so that it becomes difficult to exhibit sufficient vibration reduction ability. Otherwise the focal length of the first lens group becomes too long, astigmatism upon vibration reduction becomes large, and the moving amount of the first lens group upon zooming becomes large, so that the zoom lens system as a whole becomes large.

On the other hand, when the ratio $100 \times \alpha^2/(-f1) \times ft$ is equal to or exceeds the upper limit of conditional expression (1), the moving amount of the image upon shifting the second lens group for vibration reduction becomes large resulting in generation of a minute image blur caused by a control error, so that it becomes impossible to accomplish given optical performance upon vibration reduction. Otherwise the focal length of the first lens group becomes short, so that astigmatism in the wide-angle end state and spherical aberration in the telephoto end state become worse. Otherwise the focal length in the telephoto end state becomes short, so that it becomes impossible to make the zoom ratio larger.

In order to secure the effect of the present embodiment, it is preferable to set the lower limit of conditional expression (1) to 0.095. In order to secure the effect of the present embodiment, it is preferable to set the upper limit of conditional expression (1) to 2.00. In order to further secure the effect of the present embodiment, it is preferable to set the upper limit of conditional expression (1) to 1.69.

In a zoom lens system according to the present embodiment, the following conditional expression (2) is preferably satisfied:

$$0.20 < fw \times f2/(-f1)^2 < 0.40 \quad (2)$$

where fw denotes a focal length of the zoom lens system in the wide-angle end state, f1 denotes a focal length of the first lens group, and f2 denotes a focal length of the second lens group.

Conditional expression (2) defines an appropriate range of a ratio of the focal length of the zoom lens system in the wide-angle end state and the focal length of the first lens group to that of the second lens group.

When the value $fw \times f2/(-f1)^2$ is equal to or falls below the lower limit of conditional expression (2), the focal length of the first lens group becomes too long, so that the zoom lens system as a whole becomes large. Otherwise the focal length of the second lens group becomes short, the radius of curvature of each lens composing the second lens group becomes small, so that it becomes difficult to correct spherical aberration and off-axis coma.

On the other hand, when the value $fw \times f2/(-f1)^2$ is equal to or exceeds the upper limit of conditional expression (2), the focal length of the zoom lens system in the wide-angle end state becomes large, and the angle of view becomes narrow, so that it becomes impossible to accomplish a wide angle of view. Otherwise the focal length of the first lens group becomes short, so that the moving amount of the image on the image plane upon shifting the second lens group as a vibration reduction lens group in the direction perpendicular to the optical axis becomes too large, coma in the telephoto end state becomes worse, and it becomes impossible to secure excellent optical performance.

In order to secure the effect of the present embodiment, it is preferable to set the lower limit of conditional expression (2) to 0.25. In order to secure the effect of the present embodiment, it is preferable to set the upper limit of conditional expression (2) to 0.35.

In a zoom lens system according to the present embodiment, the following conditional expression (3) is preferably satisfied:

$$0.76 < S2/fw < 1.30 \quad (3)$$

where S2 denotes a thickness of the second lens group, and fw denotes a focal length of the zoom lens system in the wide-angle end state.

Conditional expression (3) defines a distance along the optical axis between the most object side lens surface of the second lens group and the most image side lens surface of the second lens group (the thickness of the second lens group) by the focal length of the zoom lens system in the wide-angle end state.

When the ratio S2/fw is equal to or falls below the lower limit of conditional expression (3), the second lens group becomes too thin, the burden to each lens in the second lens group becomes large, so that it becomes difficult to correct off-axis aberrations to be corrected, and in particular astigmatism becomes worse.

On the other hand, when the ratio S2/fw is equal to or exceeds the upper limit of conditional expression (3), the focal length of the zoom lens system in the wide-angle end state becomes too small, and a radius of curvature of each lens becomes small, so that spherical aberration and coma become worse. Otherwise the thickness of the second lens group becomes too thick, so that the whole lens barrel becomes too large.

In order to secure the effect of the present embodiment, it is preferable to set the lower limit of conditional expression (3) to 0.80. In order to secure the effect of the present embodiment, it is preferable to set the upper limit of conditional expression (3) to 1.15.

In a zoom lens system according to the present embodiment, the following conditional expression (4) is preferably satisfied:

$$1.05 < FNw \times fw/(-f1) < 1.85 \quad (4)$$

where FNw denotes an f-number of the zoom lens system in the wide-angle end state, fw denotes a focal length of the zoom lens system in the wide-angle end state, and f1 denotes a focal length of the first lens group.

Conditional expression (4) defines a ratio of an f-number to the focal length of the first lens group.

When the value $FNw \times fw/(-f1)$ is equal to or falls below the lower limit of conditional expression (4), the focal length of the first lens group becomes too long, so that the total lens length of the zoom lens system becomes long. Otherwise the focal length of the second lens group becomes relatively small, and a radius of curvature of each lens composing the second lens group becomes small, so that it becomes difficult to correct spherical aberration and coma generating off-axis.

On the other hand, when the value $FNw \times fw/(-f1)$ is equal to or exceeds the upper limit of conditional expression (4), the focal length of the first lens group becomes too short, and the radius of curvature of the negative lens in the first lens group becomes small, so that it becomes difficult to correct lateral chromatic aberration. Otherwise the f-number of the zoom lens system in the wide-angle end state becomes large. Otherwise the focal length of the zoom lens system in the wide-angle end state becomes long, so that an angle of view becomes small.

In order to secure the effect of the present embodiment, it is preferable to set the lower limit of conditional expression (4) to 1.15. In order to secure the effect of the present embodiment, it is preferable to set the upper limit of conditional expression (4) to 1.40.

In a zoom lens system according to the present embodiment, in order to excellently correct distortion and coma, the following conditional expression (5) is preferably satisfied:

$$0.10 < \Delta sag/fw < 0.50 \tag{5}$$

where $\Delta sag = XS(h) - X(h)$, in which sag amounts $XS(h)$ and $X(h)$ are denoted by the following spherical expression $XS(y)$ and aspherical expression $X(y)$ upon $y = h = 0.85r$:

$$XS(y) = y^2/[r \times \{1 + (1 - y^2/r^2)^{1/2}\}]$$

$$X(y) = y^2/[r \times \{1 + (1 - \kappa \times y^2/r^2)^{1/2}\}] + C4 \times y^4 + C6 \times y^6 + C8 \times y^8 + C10 \times y^{10}$$

where y denotes a vertical height from the optical axis, X(y) denotes a sag amount which is a distance along the optical axis from the tangent surface at the vertex of the aspherical surface to the aspherical surface at the vertical height y from the optical axis, XS(y) denotes a sag amount which is a distance along the optical axis from the tangent surface at the vertex of the reference sphere at the vertical height y from the optical axis, r denotes a radius of curvature of a reference sphere (paraxial radius of curvature), K denotes a conical coefficient, and Cn denotes aspherical coefficient of n-th order. X(y) and XS(y) are positive toward the image plane.

Conditional expression (5) defines sag amount of aspherical shape with respect to spherical shape at the effective aperture by the focal length of the zoom lens system in the wide-angle end state.

When the ratio Δsag/fw is equal to or falls below the lower limit of conditional expression (5), an angle of the normal at the position of the effective aperture so called as a draft angle becomes large, so that it becomes difficult to fabricate. Otherwise the aspherical surface comes closer to the spherical shape, so that the effect of the aspherical surface cannot be expected. Accordingly, it becomes difficult to correct distortion generating in the first lens group in the wide-angle end state. On the other hand, when the ratio Δsag/fw is equal to or exceeds the upper limit of conditional expression (5), the degree of aspherical shape becomes too steep, so that astigmatism and come become worse.

In order to secure the effect of the present embodiment, it is preferable to set the lower limit of conditional expression (5) to 0.15. In order to secure the effect of the present embodiment, it is preferable to set the upper limit of conditional expression (5) to 0.40.

In a zoom lens system according to the present embodiment the following conditional expression (6) is preferably satisfied:

$$TLw/f34 < 2.90 \tag{6}$$

where TLw denotes a total lens length of the zoom lens system in the wide-angle end state, and f34 denotes a focal length of an air distance between the image side surface of the third lens and the object side surface of the fourth lens, which is defined by the following expression:

$$(1/f34) = ((1-n3)/r3R) + ((n4-1)/r4F) + d34 \times ((1-n3)/r3R) \times ((n4-1)/r4F)$$

where r3R denotes a radius of curvature of the image side surface of the third lens, r4F denotes a radius of curvature of the object side surface of the fourth lens, n3 denotes refractive index of the third lens at d-line ($\lambda$=587.6 nm), n4 denotes refractive index of the fourth lens at d-line ($\lambda$=587.6 nm), and d34 denotes a distance between the image side surface of the third lens and the object side surface of the fourth lens.

Conditional expression (6) defines a focal length of an air lens upon considering the air space between the third lens and the fourth lens in the second lens group as an air lens.

When the ratio TLw/f34 is equal to or exceeds the upper limit of conditional expression (6), the radius of curvature of the image side surface of the third lens becomes too small, the edge width cannot be secured. Otherwise it becomes difficult to correct spherical aberration and coma by this surface. Otherwise upon making refractive index of the third lens higher, it also becomes difficult to correct chromatic aberration.

In order to secure the effect of the present embodiment, it is preferable to set the upper limit of conditional expression (6) to 2.00.

In a zoom lens system according to the present embodiment, the following conditional expression (7) is preferably satisfied:

$$-1.10 < fw/f45 \tag{7}$$

where fw denotes a focal length of the zoom lens system in the wide-angle end state, and f45 denotes a focal length of an air distance between the image side surface of the fourth lens and the object side surface of the fifth lens, which is defined by the following expression:

$$(1/f45) = ((1-n4)/r4R) + ((n5-1)/r5F) + d45 \times ((1-n4)/r4R) \times ((n5-1)/r5F)$$

where r4R denotes a radius of curvature of the image side surface of the fourth lens, r5F denotes a radius of curvature of the object side surface of the fifth lens, n4 denotes refractive index of the fourth lens at d-line ($\lambda$=587.6 nm), n5 denotes refractive index of the fifth lens at d-line ($\lambda$=587.6 nm), and d45 denotes a distance between the image side surface of the fourth lens and the object side surface of the fifth lens.

Conditional expression (7) defines a focal length of an air lens upon considering the air space between the fourth lens and the fifth lens in the second lens group as an air lens.

When the ratio fw/f45 is equal to or falls below the lower limit of conditional expression (7), radius of curvature of the image side surface of the fourth lens becomes small, so that the second lens group becomes thicker. Otherwise deviation of the light coming out from the surface becomes too large, off-axis aberrations, coma in particular, are exceedingly generated.

In order to secure the effect of the present embodiment, it is preferable to set the lower limit of conditional expression (7) to −0.50.

In a zoom lens system according to the present embodiment, the most object side lens of the second lens group, which is the third lens, preferably has an aspherical surface. With including an aspherical surface in the third lens, it becomes possible to excellently correct spherical aberration and coma.

In a zoom lens system according to the present embodiment, the following conditional expression (8) is preferably satisfied:

$$1.85 < Z \times S1/S2 < 5.00 \qquad (8)$$

where S1 denotes a distance along the optical axis between the object side surface of the first lens having negative refractive power disposed to the most object side of the first lens group and the image side surface of the second lens having positive refractive power disposed to the most image side of the first lens group, which is the thickness of the first lens group, S2 denotes a distance along the optical axis between the object side surface of the third lens having positive refractive power located to the most object side of the second lens group and the image side surface of the fifth lens having positive refractive power disposed to the most image side of the second lens group, which is the thickness of the second lens group, and Z denotes the ratio of the focal length of the zoom lens system in the telephoto end state to that in the wide-angle end state (zoom ratio).

Conditional expression (8) defines the thicknesses of the first lens group and the second lens group by the zoom ratio.

When the value Z×S1/S2 is equal to or falls below the lower limit of conditional expression (8), the thickness of the first lens group becomes too thin, so that it becomes difficult to correct distortion. Otherwise the focal length in the wide-angle end state becomes too long, so that it becomes difficult to secure a sufficient angle of view. Otherwise the focal length in the telephoto end state becomes too short, so that it becomes impossible to secure a sufficient zoom ratio.

On the other hand, when the value Z×S1/S2 is equal to or exceeds the upper limit of conditional expression (8), the thickness of the second lens group becomes too short, so that it becomes impossible to correct spherical aberration and coma.

In order to secure the effect of the present embodiment, it is preferable to set the lower limit of conditional expression (8) to 2.30. In order to secure the effect of the present embodiment, it is preferable to set the upper limit of conditional expression (8) to 4.00.

A zoom lens system of each Example according to the present embodiment is explained below.

Example 1

Figure 3:
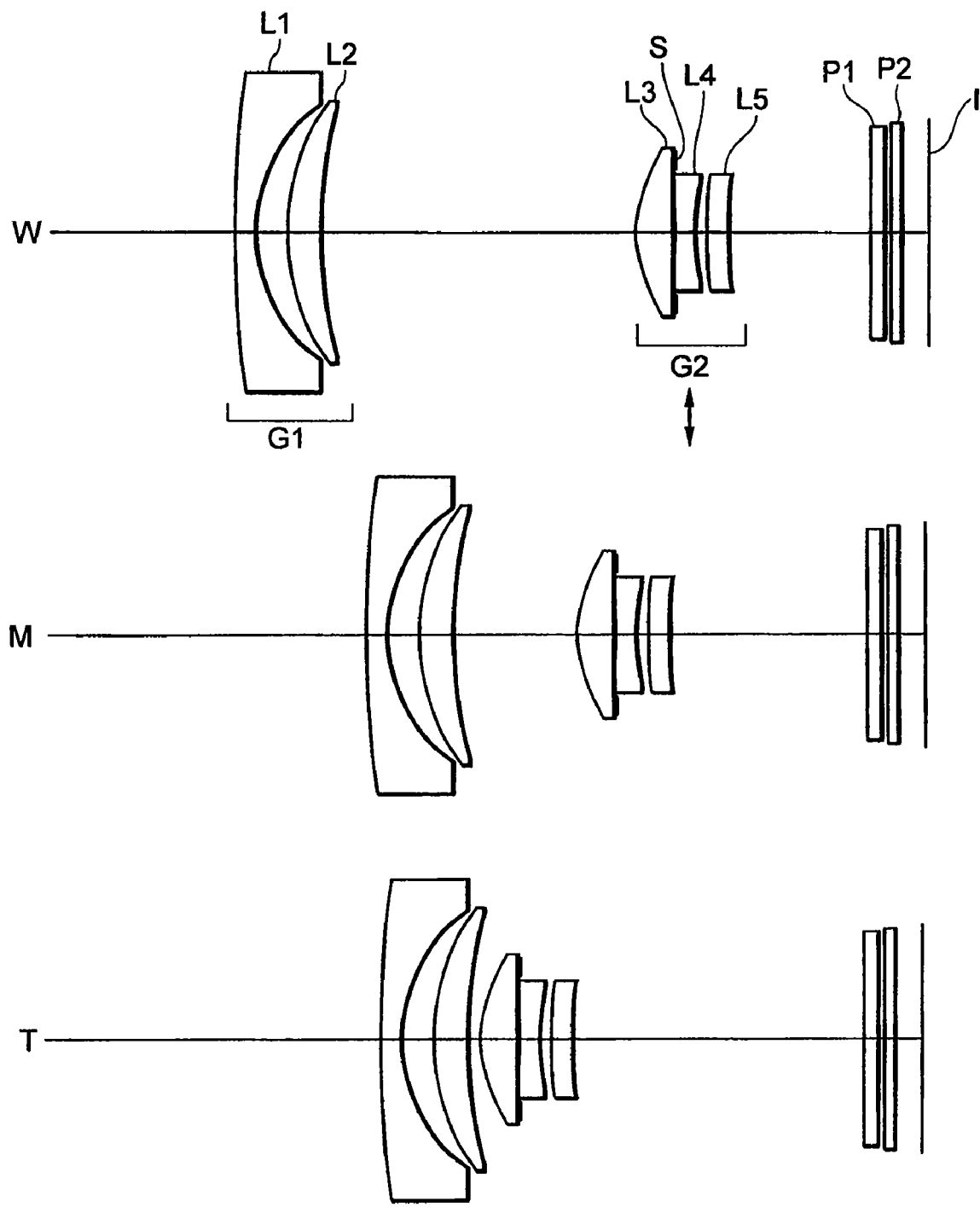
FIG. 3 is a diagram showing a lens configuration of a zoom lens system according to Example 1 of the present embodiment, in which W denotes a wide-angle end state, M denotes an intermediate focal length state, and T denotes a telephoto end state.

FIG. 3 is a diagram showing a lens configuration of a zoom lens system according to Example 1 of the present embodiment, in which W denotes a wide-angle end state, M denotes an intermediate focal length state, and T denotes a telephoto end state. Reference symbols used in the following explanations are attached only to a diagram showing the wide-angle end state W, and are omitted in the other states. The same rule is applied to the other Examples.

In FIG. 3, the zoom lens system according to Example 1 is composed of, in order from an object, a first lens group G1 having negative refractive power, and a second lens group G2 having positive refractive power. When a state of lens group positions varies from a wide-angle end state W to a telephoto end state T, the first lens group G1 and the second lens group G2 are moved along an optical axis such that a distance between the first lens group G1 and the second lens group G2 decreases.

The first lens group G1 having negative refractive power as a whole is composed of two lenses that are, in order from the object, a negative meniscus lens L1 having a convex surface facing the object, and a positive meniscus lens L2 having a convex surface facing the object.

The second lens group G2 having positive refractive power as a whole is composed of three lenses that are, in order from the object, a positive meniscus lens L3 having a convex surface facing the object, a double concave negative lens L4, and a double convex positive lens L5. Those three lenses are independently disposed with respective air spaces in between.

An aperture stop S for defining an f-number is disposed to the image side adjacent to the third lens L3, and moved together with the second lens group G2.

An image blur on the image plane I caused by a camera shake and the like is corrected by shifting the second lens group G2 as a whole in a direction substantially perpendicular to the optical axis.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with the zoom lens system according to Example 1 are listed in Table 1.

In [Specifications], f denotes a focal length, Bf denotes a back focal length, FNO denotes an f-number, and 2ω denotes an angle of view (unit: degree).

In [Lens Data], the first column shows the lens surface number counted in order from the object side, the second column "r" shows a radius of curvature of the lens surface, the third column "d" shows a distance to the next lens surface along the optical axis, the fourth column "vd" shows Abbe number of the medium at d-line (wavelength λ=587.6 nm), and the fifth column "nd" shows refractive index of the medium at d-line (wavelength λ=587.6 nm). In the second column "r", "r=0.0000" denotes a plane surface. Refractive index of the air nd=1.000000 is omitted.

In [Aspherical Data], an aspherical surface is exhibited by the following expression:

$$X(y) = y^2 / [r \cdot \{1 + (1 - \kappa \cdot y^2 / r^2)^{1/2}\}] + C4 \cdot y^4 + C6 \cdot y^6 + C8 \cdot y^8 + C10 \cdot y^{10}$$

where y denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere (paraxial radius of curvature), K denotes a conical coefficient, and Cn denotes aspherical coefficient of n-th order. In [Aspherical Data], "E-n" (n: integer) denotes "×10$^{-n}$". The position of an aspherical surface is expressed by attaching "*" to the right side of the surface number and a radius of curvature of a reference sphere is shown in the second column "r".

In [Variable Distances], a focal length f, the distance between the object and the most object side lens surface D0, values for respective variable distances with respect to wide-angle end state W, intermediate focal length state M, and telephoto end stat T are shown. In [Values for Conditional Expressions], values for respective conditional expressions are shown.

In the tables for various values, unless otherwise specified, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples, so that duplicated explanations are omitted.

TABLE 1

[Specifications]

| | W | M | T |
|---|---|---|---|
| f = | 5.5 | 9.5 | 16.0 |
| FNO = | 2.92 | 3.67 | 4.78 |
| 2ω = | 71.89° | 43.58° | 26.38° |
| Bf = | 1.4329 (constant) | | |

[Lens Data]

| | r | d | νd | nd |
|---|---|---|---|---|
| 1 | 38.5603 | 1.0000 | 40.43 | 1.836100 |
| 2* | 4.7895 | 1.5652 | | |
| 3 | 7.6599 | 1.6000 | 23.78 | 1.846660 |
| 4 | 17.6635 | D4 | | |
| 5 | 4.3651 | 1.8000 | 52.32 | 1.755000 |
| 6 | 90.0000 | 0.1175 | | |
| 7* | −30.7854 | 1.0000 | 24.06 | 1.821140 |
| 8 | 8.0018 | 0.5302 | | |
| 9 | 20.7522 | 1.1000 | 58.19 | 1.622630 |
| 10* | −21.2884 | D10 | | |
| 11 | 0.0000 | 0.6000 | 64.20 | 1.516800 |
| 12 | 0.0000 | 0.4000 | | |
| 13 | 0.0000 | 0.5000 | 64.20 | 1.516800 |
| 14 | 0.0000 | Bf | | |

[Aspherical Data]

Surface Number: 2

K = 0.2995
C4 = 2.79880E−04
C6 = 4.52510E−07
C8 = 1.20380E−07
C10 = −2.64930E−09

Surface Number: 7

K = 70.0000
C4 = 3.31030E−04
C6 = 6.81250E−05
C8 = 9.41930E−07
C10 = −2.76200E−08

Surface Number: 10

K = −92.7552
C4 = 2.06340E−03
C6 = 4.21370E−04
C8 = −1.51580E−05
C10 = 6.90940E−06

[Variable Distances]

| | W | M | T |
|---|---|---|---|
| f | 5.50000 | 9.50000 | 16.00000 |
| D0 | ∞ | ∞ | ∞ |
| D4 | 15.33691 | 5.97220 | 0.74113 |
| D10 | 6.92749 | 9.66744 | 14.11985 |

[Values for Conditional Expressions]

Figure 4A:
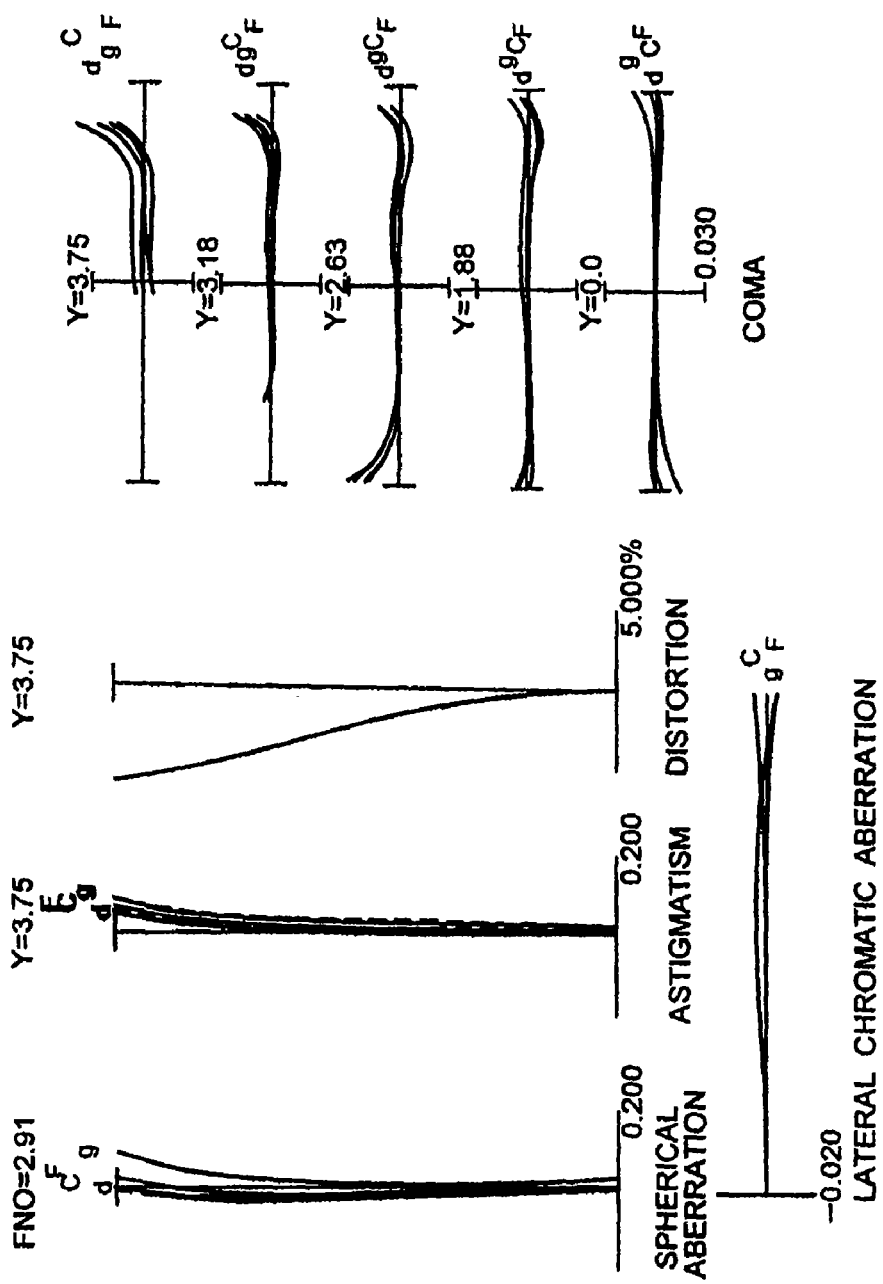
Figure 4B:
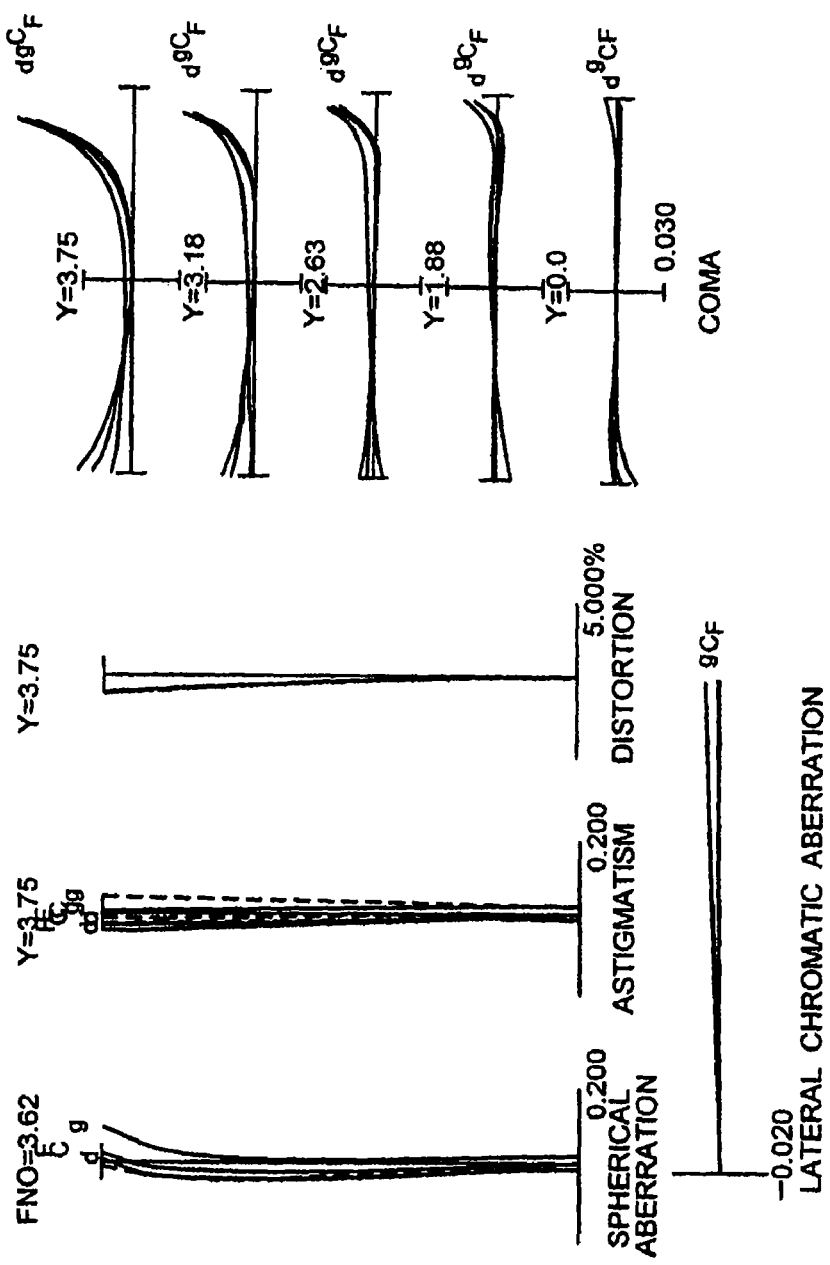
Figure 4C:
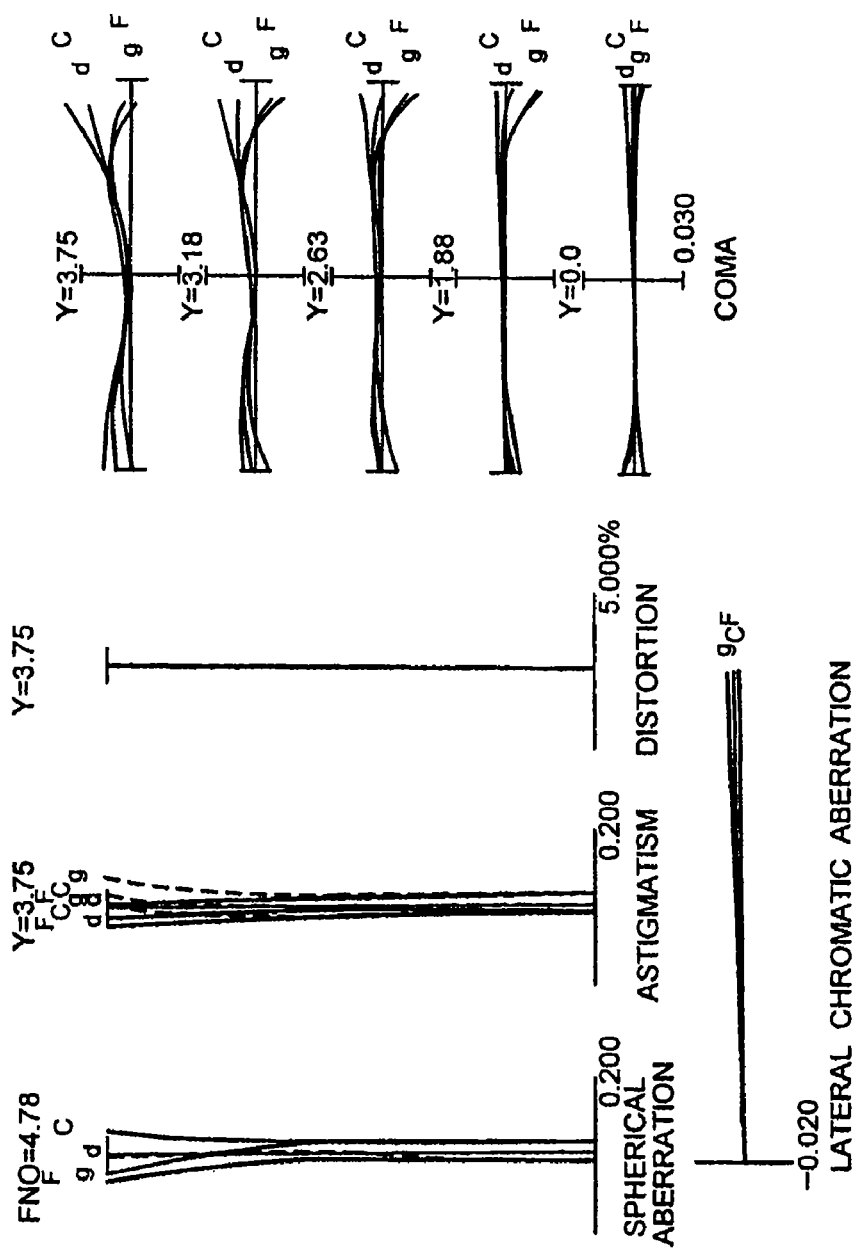
Figure 5A:
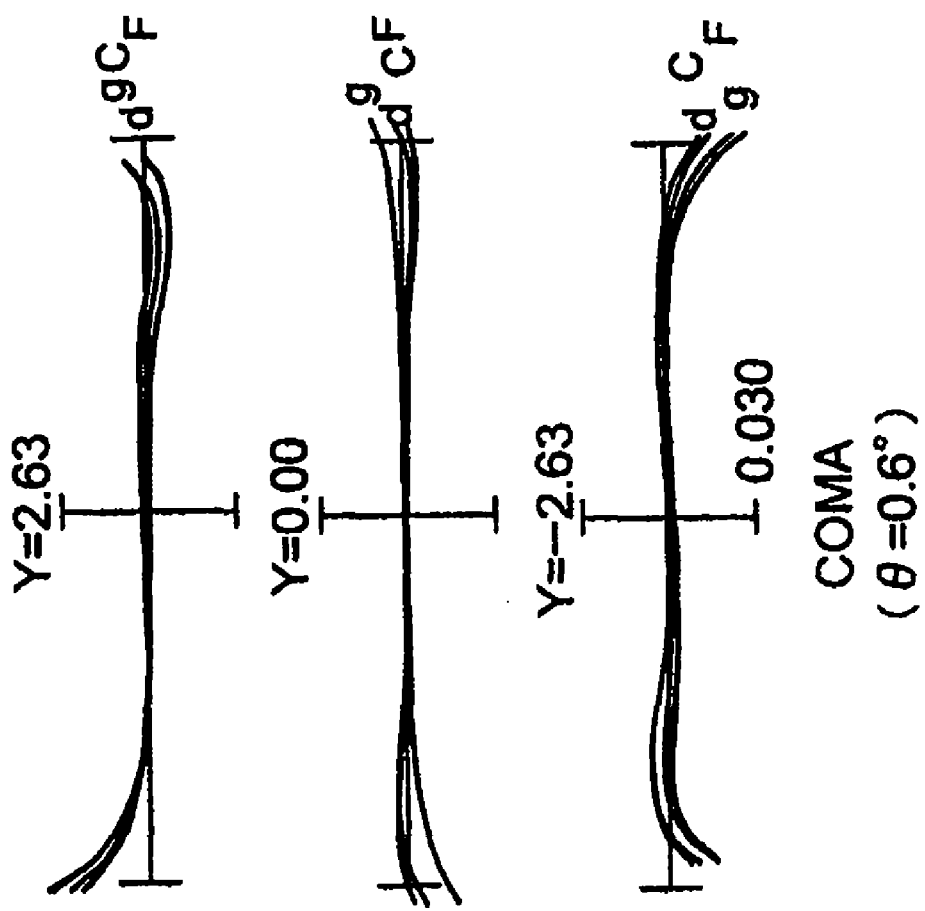
Figure 5B:
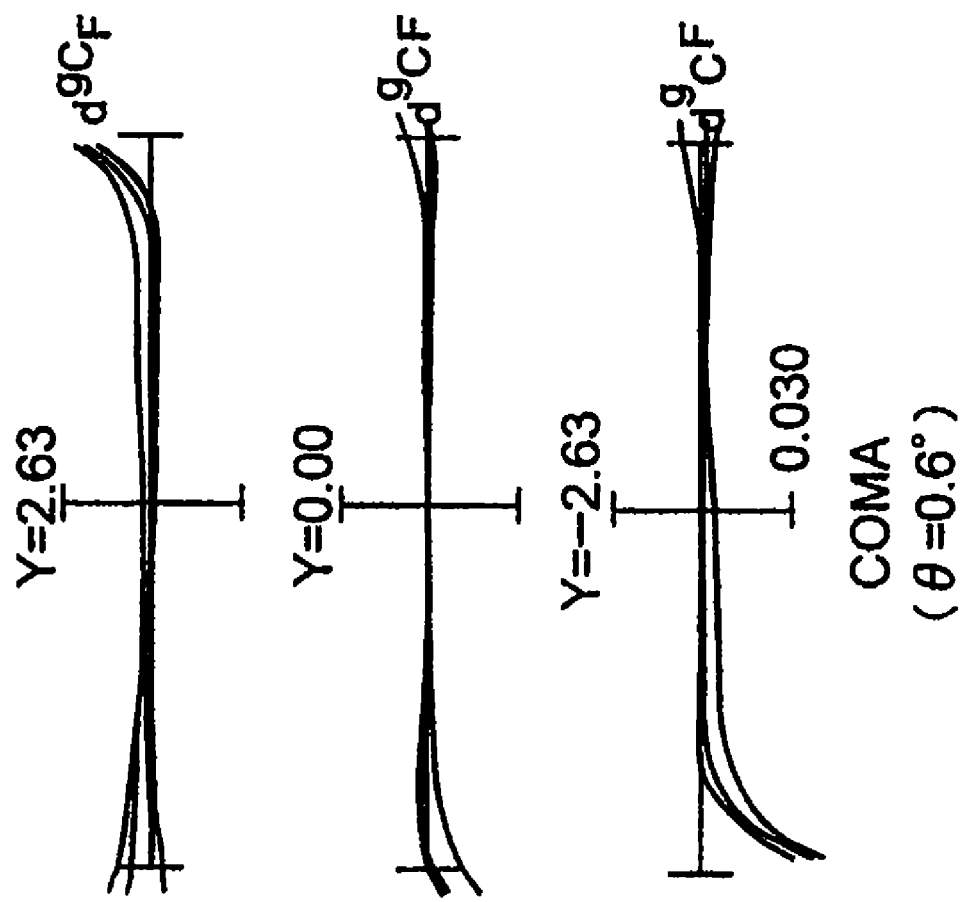
Figure 5C:
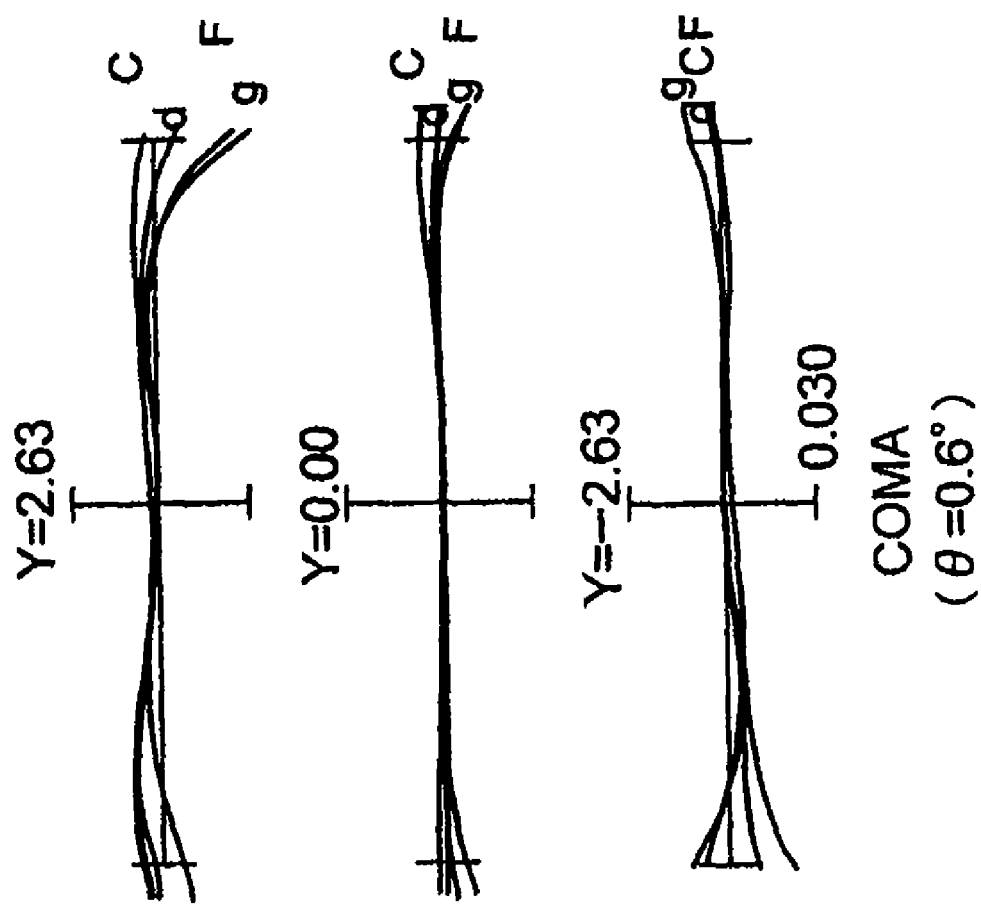

(1): $100 \times \alpha^2/(-f1) \times ft = 0.696$
(2): $fw \times f2/(-f1)^2 = 0.282$
(3): $S2/fw = 0.827$
(4): $FNw \times fw/(-f1) = 1.201$ TABLE 1-continued (5): $\Delta sag/fw = 0.208$
(6): $TLw/f34 = -1.190$
(7): $fw/f45 = -0.390$
(8): $Z \times S1/S2 = 2.664$ FIGS. 4A, 4B and 4C are graphs showing various aberrations of the zoom lens system according to Example 1 upon focusing on infinity, in which FIG. 4A shows the wide-angle end state, FIG. 4B shows the intermediate focal length state, and FIG. 4C shows the telephoto end state. FIGS. 5A, 5B, 5C are graphs showing coma upon shifting a vibration reduction lens group of the zoom lens system according to Example 1, in which FIG. 5A shows the wide-angle end state, FIG. 5B shows the intermediate focal length state, and FIG. 5C shows the telephoto end state.

In respective graphs, FNO denotes an f-number, Y denotes an image height, d denotes an aberration curve at d-line (wavelength λ=587.6 nm), g denotes an aberration curve at g-line (wavelength λ=435.6 nm), C denotes an aberration curve at C-line (wavelength λ=656.3 nm), and F denotes an aberration curve at F-line (wavelength λ=486.1 nm). In graphs showing spherical aberration, the f-number with respect to the maximum diameter is shown. In graphs showing astigmatism and distortion, the maximum value of the image height Y is shown. In graphs showing coma, each image height Y is shown. In the graph showing astigmatism, a solid line indicates a sagittal image plane, and a broken line indicates a meridional image plane. In graphs showing coma upon shifting, θ denotes a deviation angle of the second lens group with respect to the optical axis. The above-described explanation regarding various aberration graphs is the same as the other examples.

As is apparent from the respective graphs, the zoom lens system according to Example 1 shows superb optical performance as a result of good corrections to various aberrations over entire zoom range from the wide-angle end state W to the telephoto end state T even in the state upon shifting.

Example 2

Figure 6:
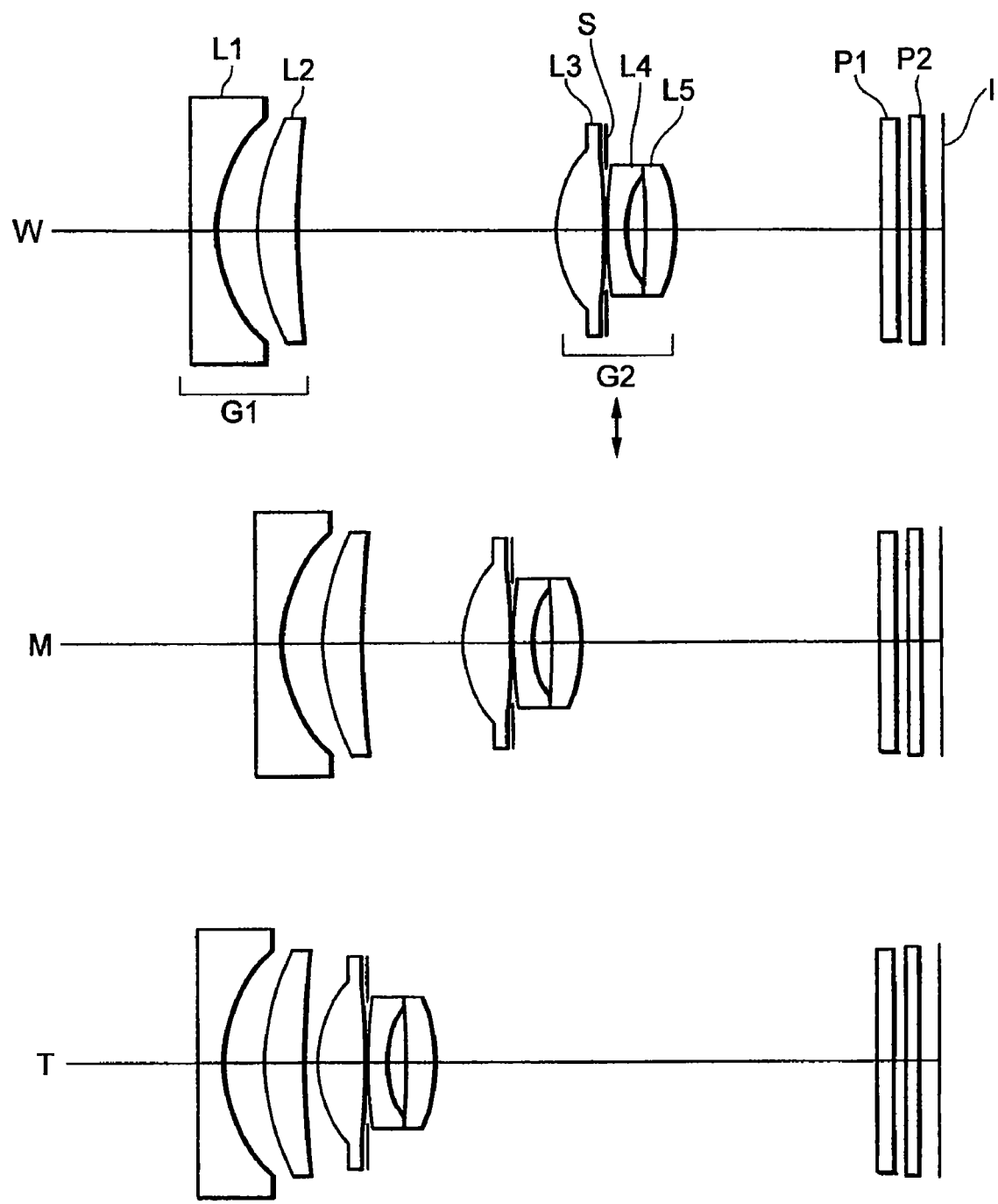
FIG. 6 is a diagram showing a lens configuration of a zoom lens system according to Example 2 of the present embodiment, in which W denotes a wide-angle end state, M denotes an intermediate focal length state, and T denotes a telephoto end state.

FIG. 6 is a diagram showing a lens configuration of a zoom lens system according to Example 2 of the present embodiment, in which W denotes a wide-angle end state, M denotes an intermediate focal length state, and T denotes a telephoto end state.

In FIG. 6, the zoom lens system according to Example 2 is composed of, in order from an object, a first lens group G1 having negative refractive power, and a second lens group G2 having positive refractive power. When a state of lens group positions varies from a wide-angle end state W to a telephoto end state T, the first lens group G1 and the second lens group G2 are moved along an optical axis such that a distance between the first lens group G1 and the second lens group G2 decreases.

The first lens group G1 having negative refractive power as a whole is composed of two lenses that are, in order from the object, a double concave negative lens L1, and a positive meniscus lens L2 having a convex surface facing the object.

The second lens group G2 having positive refractive power as a whole is composed of three lenses that are, in order from the object, a double convex positive lens L3, a negative meniscus lens L4 having a convex surface facing the object, and a positive meniscus lens L5 having a concave surface facing the object. Those three lenses are independently disposed with respective air spaces in between.

An aperture stop S for defining an f-number is disposed to the image side adjacent to the third lens L3, and moved together with the second lens group G2.

An image blur on the image plane I caused by a camera shake and the like is corrected by shifting the second lens group G2 as a whole in a direction substantially perpendicular to the optical axis.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with the zoom lens system according to Example 2 are listed in Table 2.

TABLE 2

[Specifications]

| | W | M | T |
|---|---|---|---|
| f = | 6.4 | 11.0 | 18.2 |
| FNO = | 3.1 | 4. | 5.42 |
| 2ω = | 64.3° | 38.3° | 23.4° |
| Bf = | 0.91466 (constant) | | |

[Lens Data]

| | r | d | vd | nd |
|---|---|---|---|---|
| 1 | −469.4821 | 1.0000 | 40.94 | 1.806100 |
| 2* | 4.8392 | 1.8000 | | |
| 3 | 8.9995 | 1.6000 | 22.76 | 1.808090 |
| 4 | 27.5683 | D4 | | |
| 5* | 4.0126 | 2.0000 | 53.22 | 1.693500 |
| 6* | −12.4122 | 0.1000 | | |
| 7 | 20.7298 | 0.8000 | 28.27 | 2.003300 |
| 8 | 3.6444 | 0.8000 | | |
| 9 | −21.3325 | 1.2000 | 59.10 | 1.583320 |
| 10* | −6.1453 | D10 | | |
| 11 | 0.0000 | 0.7600 | 64.20 | 1.516800 |
| 12 | 0.0000 | 0.5000 | | |
| 13 | 0.0000 | 0.5000 | 64.20 | 1.516800 |
| 14 | 0.0000 | Bf | | |

[Aspherical Data]

Surface Number: 2

K = 1.0434
C4 = −8.12290E−04
C6 = −3.18460E−05
C8 = 5.48330E−07
C10 = −9.95350E−08

Surface Number: 5

K = 0.3781
C4 = 5.44620E−05
C6 = 2.75390E−05
C8 = 0.00000E+00
C10 = 0.00000E+00

Surface Number: 6

K = 1.0000
C4 = 2.94430E−03
C6 = −1.14100E−04
C8 = 3.23020E−06
C10 = 0.00000E+00

Surface Number: 10

K = 3.5947
C4 = −1.40950E−04
C6 = 9.75960E−05
C8 = 1.00000E−14
C10 = 1.00000E−16

TABLE 2-continued

[Variable Distances]

| | W | M | T |
|---|---|---|---|
| f | 6.40000 | 11.00000 | 18.20000 |
| D0 | ∞ | ∞ | ∞ |
| D4 | 10.79155 | 4.10717 | 0.42805 |
| D10 | 8.52883 | 12.41792 | 18.50519 |

[Values for Conditional Expressions]

Figure 7A:
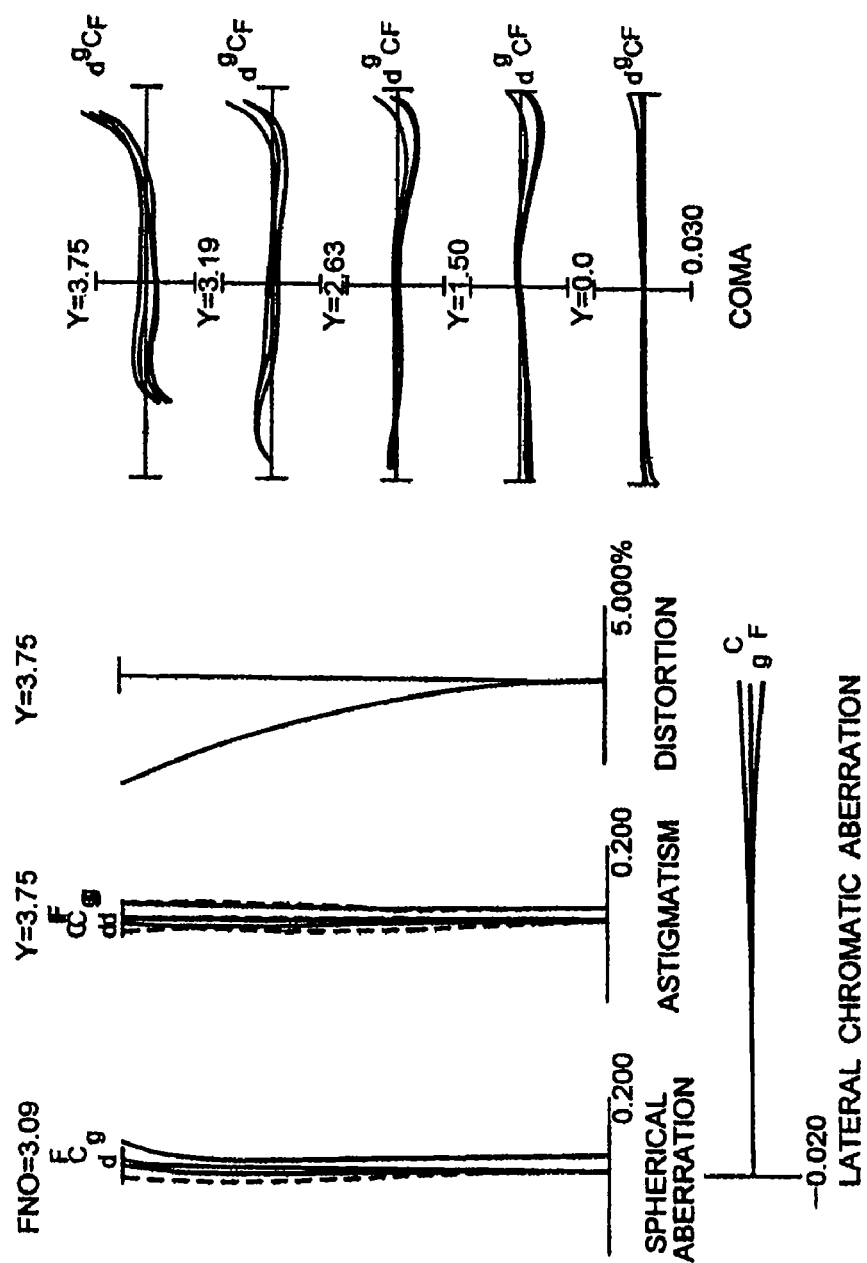
Figure 7B:
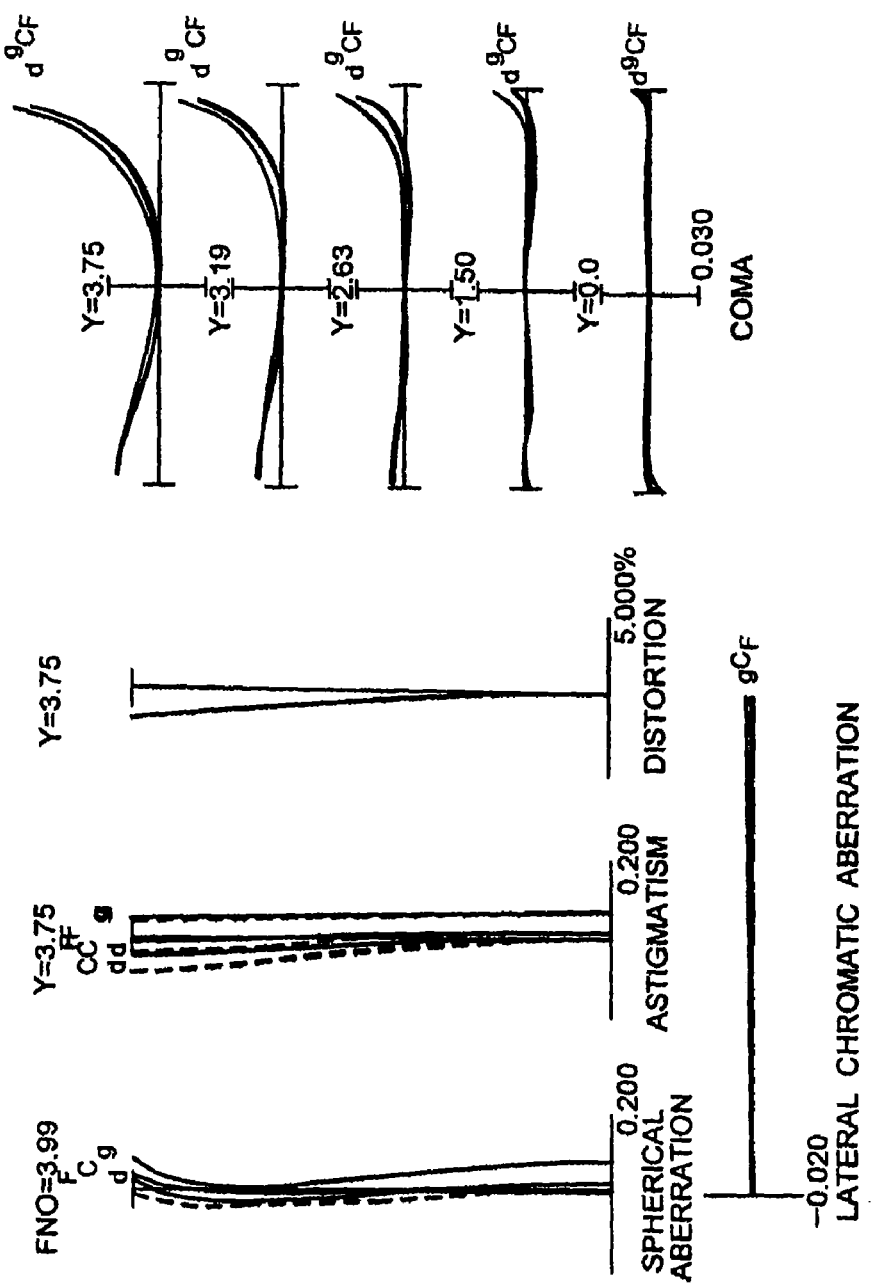
Figure 7C:
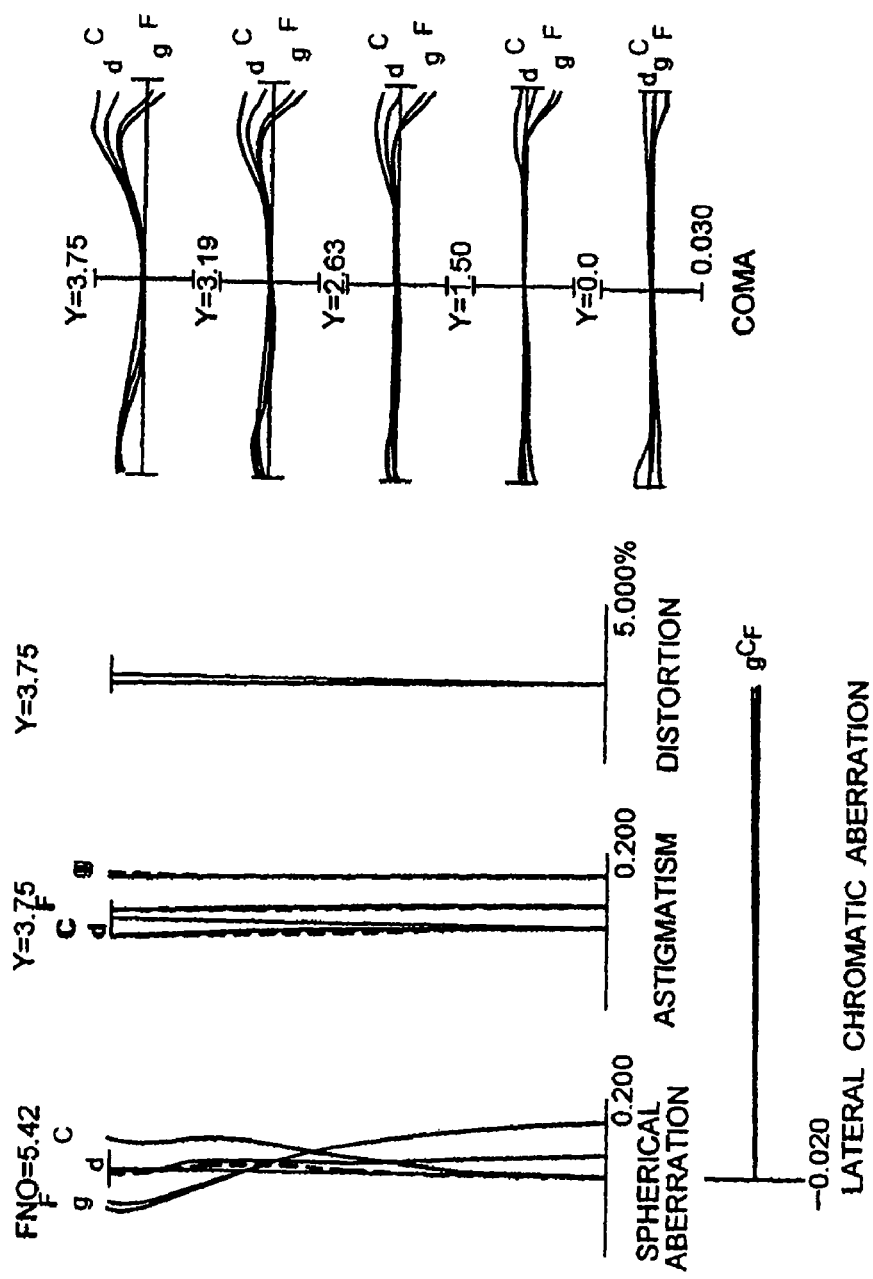
Figure 8A:
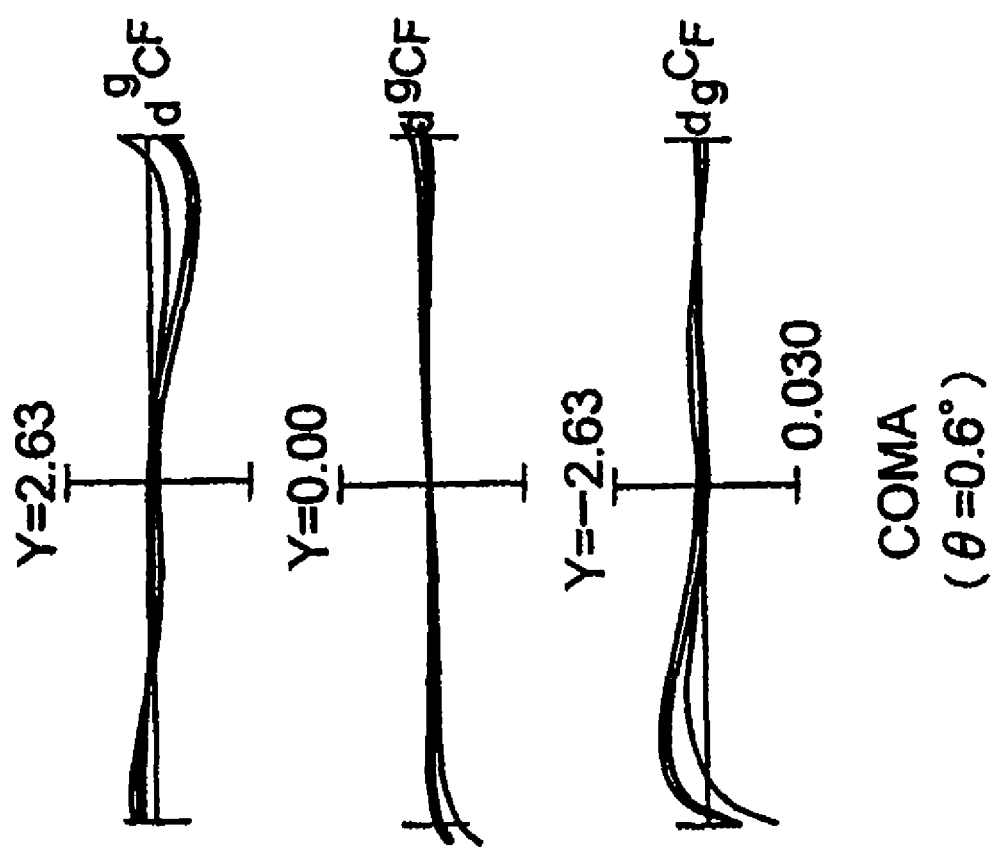
Figure 8B:
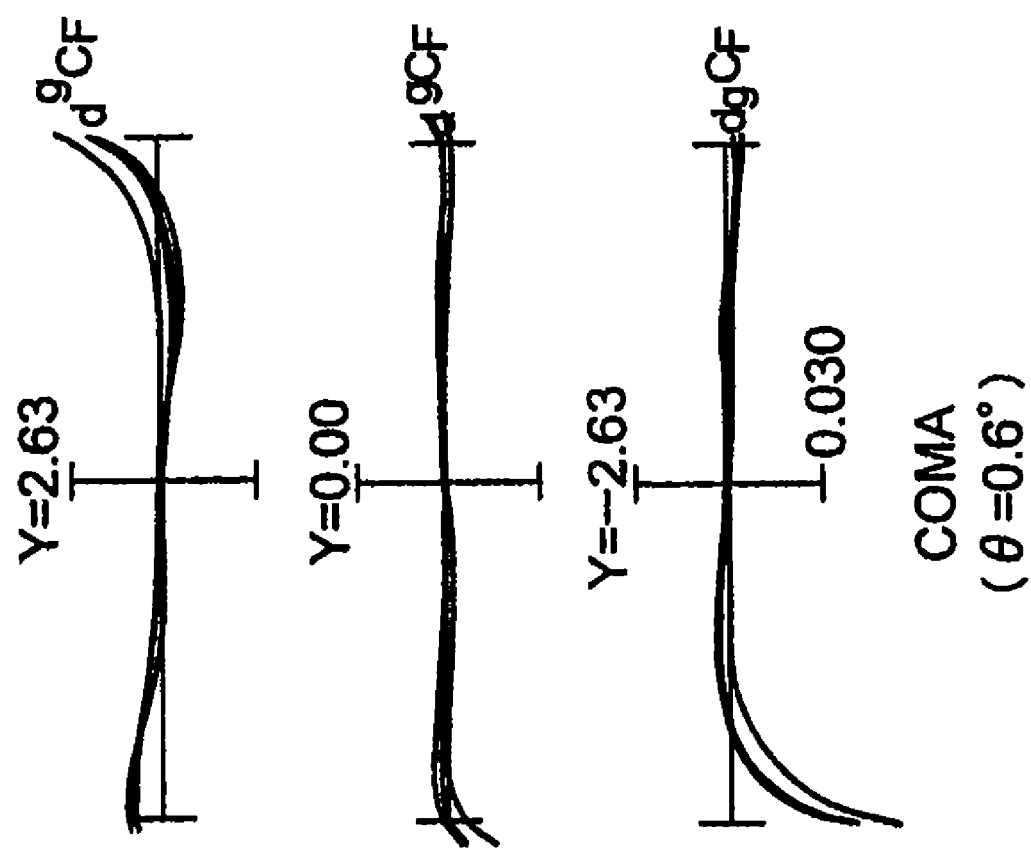
Figure 8C:
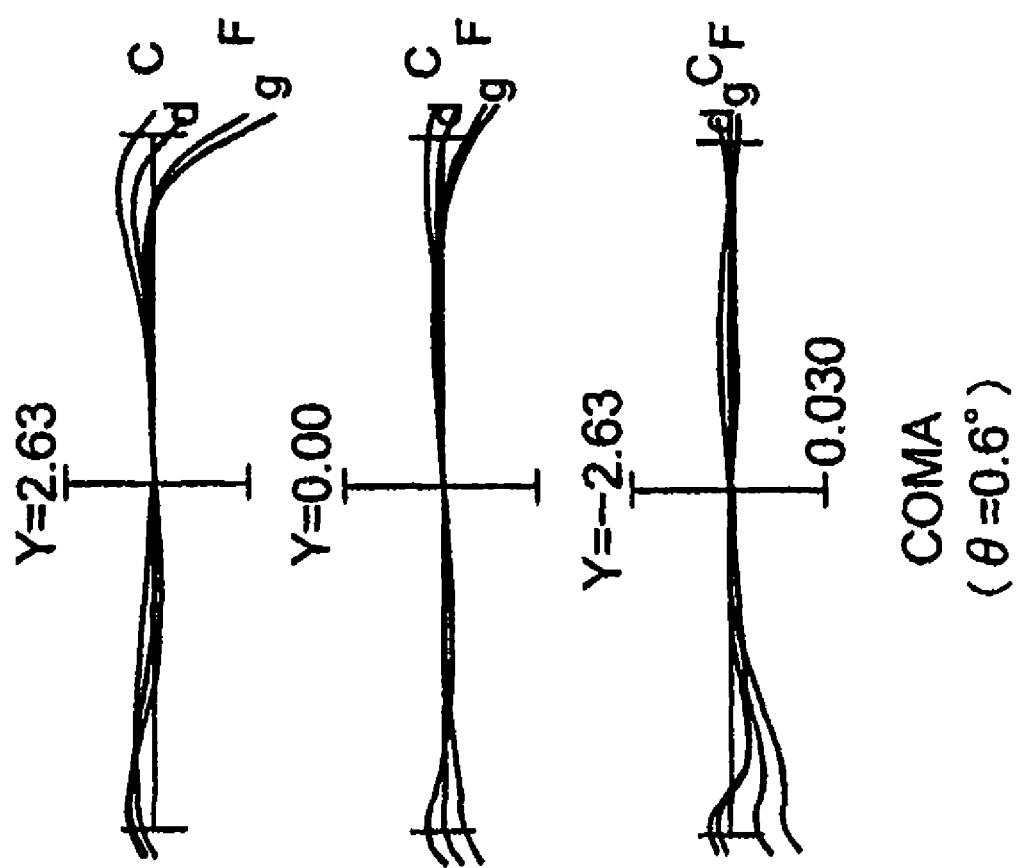

(1): $100 \times \alpha^2/(-f1) \times ft = 0.853$
(2): $fw \times f2/(-f1)^2 = 0.492$
(3): $S2/fw = 0.766$
(4): $FNw \times fw/(-f1) = 1.802$
(5): $\Delta sag/fw = 0.193$
(6): $TLw/f34 = 3.255$
(7): $fw/f45 = -1.975$
(8): $Z \times S1/S2 = 2.554$ FIGS. 7A, 7B and 7C are graphs showing various aberrations of the zoom lens system according to Example 2 upon focusing on infinity, in which FIG. 7A shows the wide-angle end state, FIG. 7B shows the intermediate focal length state, and FIG. 7C shows the telephoto end state. FIGS. 8A, 8B, 8C are graphs showing coma upon shifting a vibration reduction lens group of the zoom lens system according to Example 2, in which FIG. 8A shows the wide-angle end state, FIG. 8B shows the intermediate focal length state, and FIG. 8C shows the telephoto end state.

As is apparent from the respective graphs, the zoom lens system according to Example 2 shows superb optical performance as a result of good corrections to various aberrations over entire zoom range from the wide-angle end state W to the telephoto end state T even in the state upon shifting.

Example 3

Figure 9:
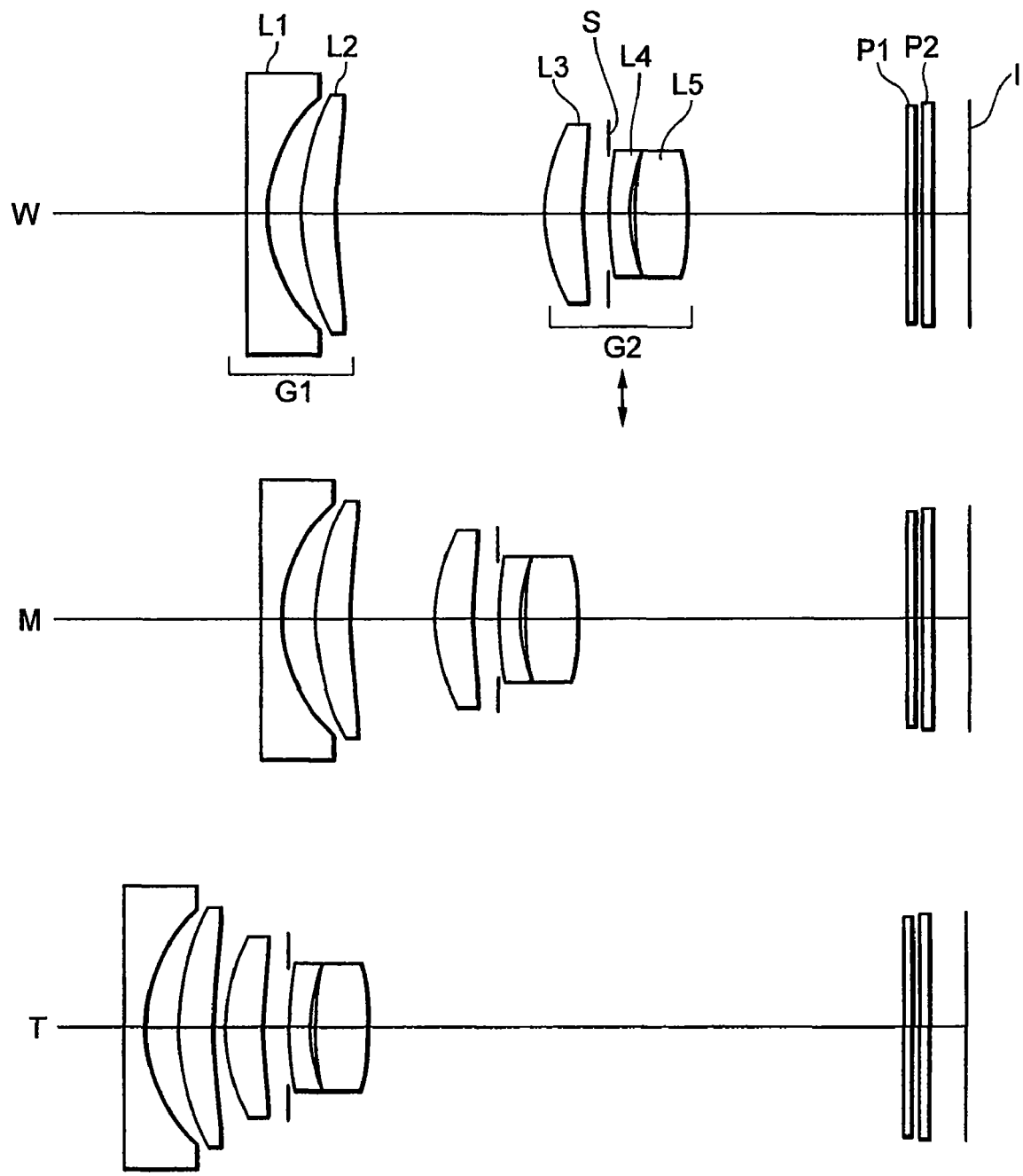
FIG. 9 is a diagram showing a lens configuration of a zoom lens system according to Example 3 of the present embodiment, in which W denotes a wide-angle end state, M denotes an intermediate focal length state, and T denotes a telephoto end state.

FIG. 9 is a diagram showing a lens configuration of a zoom lens system according to Example 3 of the present embodiment, in which W denotes a wide-angle end state, M denotes an intermediate focal length state, and T denotes a telephoto end state.

In FIG. 9, the zoom lens system according to Example 3 is composed of, in order from an object, a first lens group G1 having negative refractive power, and a second lens group G2 having positive refractive power. When a state of lens group positions varies from a wide-angle end state W to a telephoto end state T, the first lens group G1 and the second lens group G2 are moved along an optical axis such that a distance between the first lens group G1 and the second lens group G2 decreases.

The first lens group G1 having negative refractive power as a whole is composed of two lenses that are, in order from the object, a double concave negative lens L1, and a positive meniscus lens L2 having a convex surface facing the object.

The second lens group G2 having positive refractive power as a whole is composed of three lenses that are, in order from the object, a positive meniscus lens L3 having a convex surface facing the object, a negative meniscus lens L4 having a convex surface facing the object, and a double convex positive lens L5. Those three lenses are independently disposed with respective air spaces in between.

An aperture stop S for defining an f-number is disposed to the object side adjacent to the fourth lens L4, and moved together with the second lens group G2.

An image blur on the image plane I caused by a camera shake and the like is corrected by shifting the second lens group G2 as a whole in a direction substantially perpendicular to the optical axis.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with the zoom lens system according to Example 3 are listed in Table 3.

TABLE 3

[Specifications]

|  | W | M | T |
|---|---|---|---|
| f = | 6.5 | 11.0 | 21.0 |
| FNO = | 3.37 | 4.44 | 6.84 |
| 2ω = | 63.6° | 38.5° | 20.37° |
| Bf = | 1.77954 (constant) | | |

[Lens Data]

|  | r | d | νd | nd |
|---|---|---|---|---|
| 1 | −112.3306 | 0.8000 | 40.94 | 1.806100 |
| 2* | 4.2371 | 1.7000 | | |
| 3 | 8.5683 | 1.6000 | 22.76 | 1.808090 |
| 4 | 28.7483 | D4 | | |
| 5* | 5.3890 | 1.8000 | 57.79 | 1.609700 |
| 6 | 19.7297 | 1.2458 | | |
| 7 | 13.9576 | 1.0000 | 23.78 | 1.846660 |
| 8 | 5.4653 | 0.2400 | | |
| 9 | 10.3653 | 2.4000 | 63.38 | 1.618000 |
| 10 | −10.7596 | D10 | | |
| 11 | 0.0000 | 0.4000 | 64.14 | 1.516330 |
| 12 | 0.0000 | 0.4000 | | |
| 13 | 0.0000 | 0.5000 | 64.14 | 1.516330 |
| 14 | 0.0000 | Bf | | |

[Aspherical Data]

Surface Number: 2

K = 0.1801
C4 = 1.75500E−05
C6 = −3.23480E−06
C8 = −3.83910E−07
C10 = 2.26310E−08

Surface Number: 5

K = 0.2254
C4 = −3.03930E−06
C6 = 1.40380E−06
C8 = −7.32240E−08
C10 = 1.00000E−16

[Variable Distances]

|  | W | M | T |
|---|---|---|---|
| f | 6.5000 | 11.0000 | 21.0000 |
| D0 | ∞ | ∞ | ∞ |
| D4 | 9.84520 | 4.18087 | 0.28477 |
| D10 | 10.35216 | 15.35216 | 26.46327 |

[Values for Conditional Expressions]

Figure 10A:
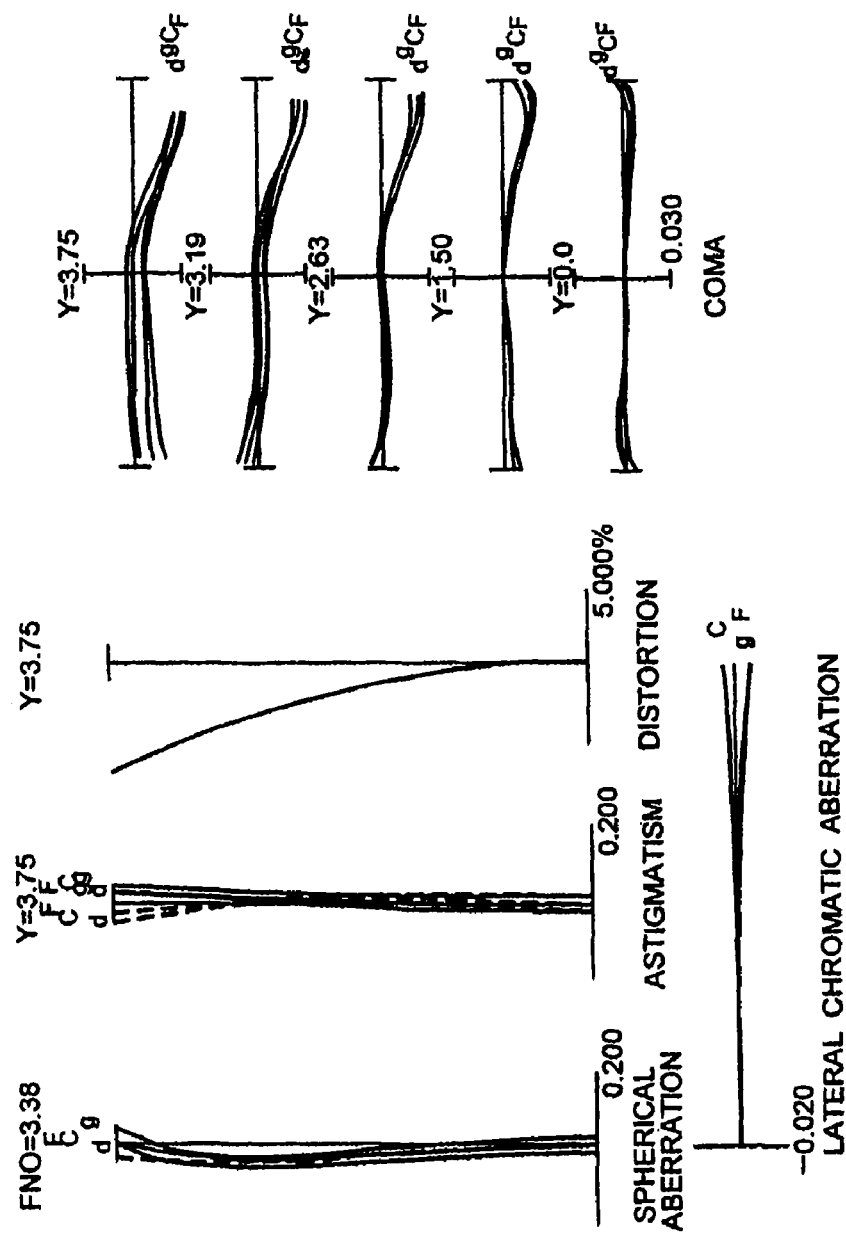
Figure 10B:
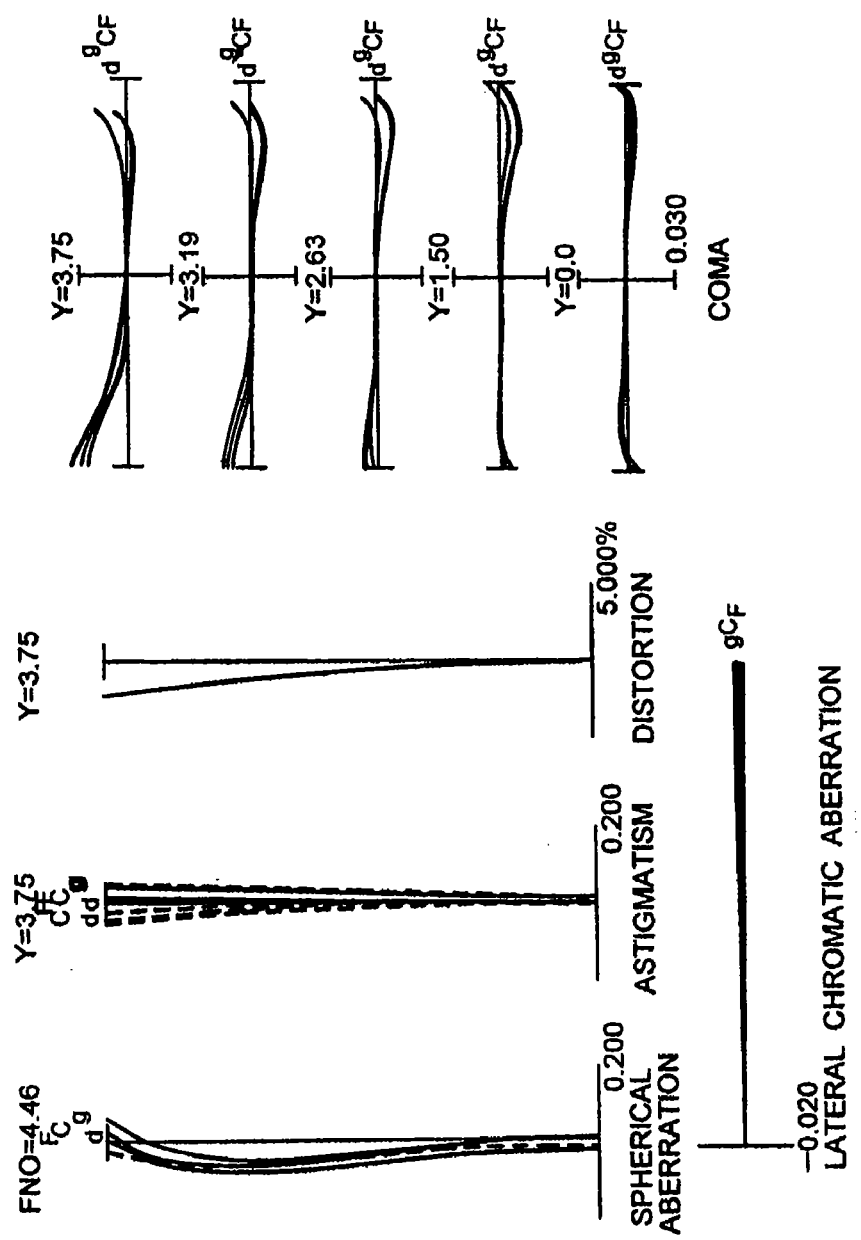
Figure 10C:
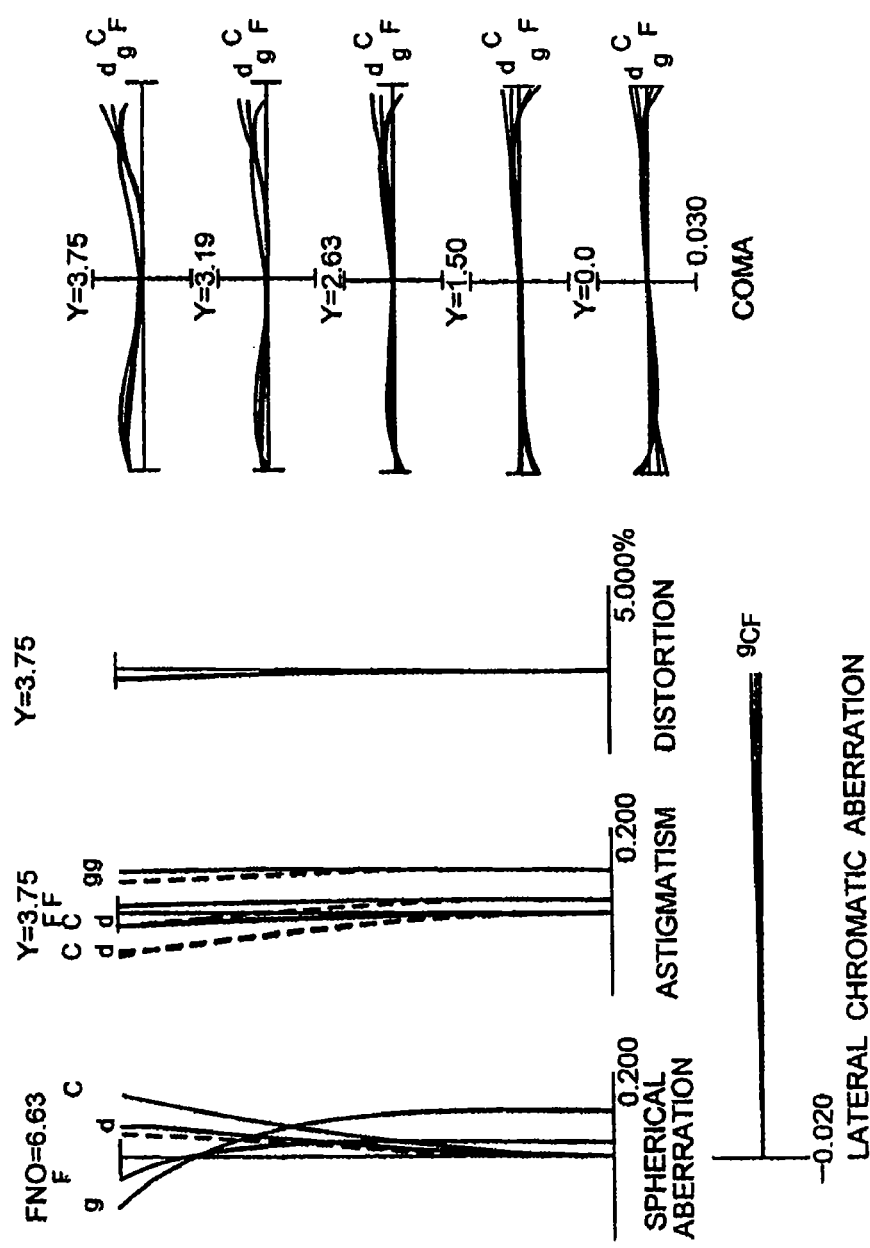
Figure 11A:
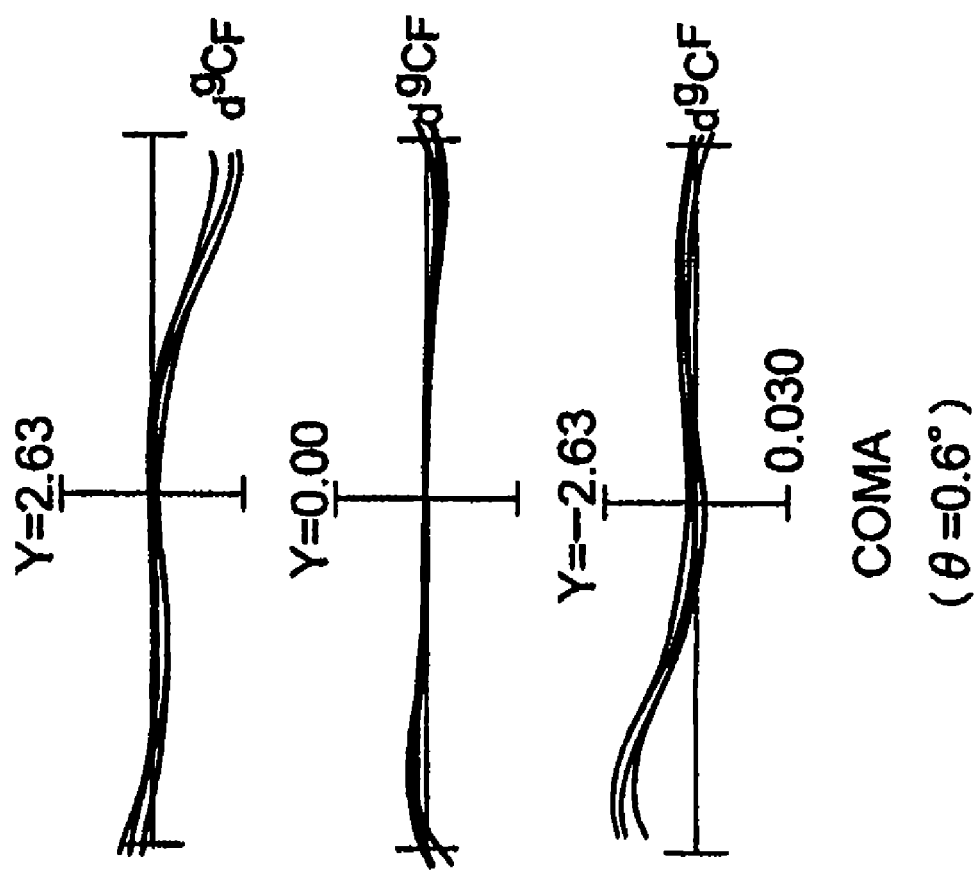
Figure 11B:
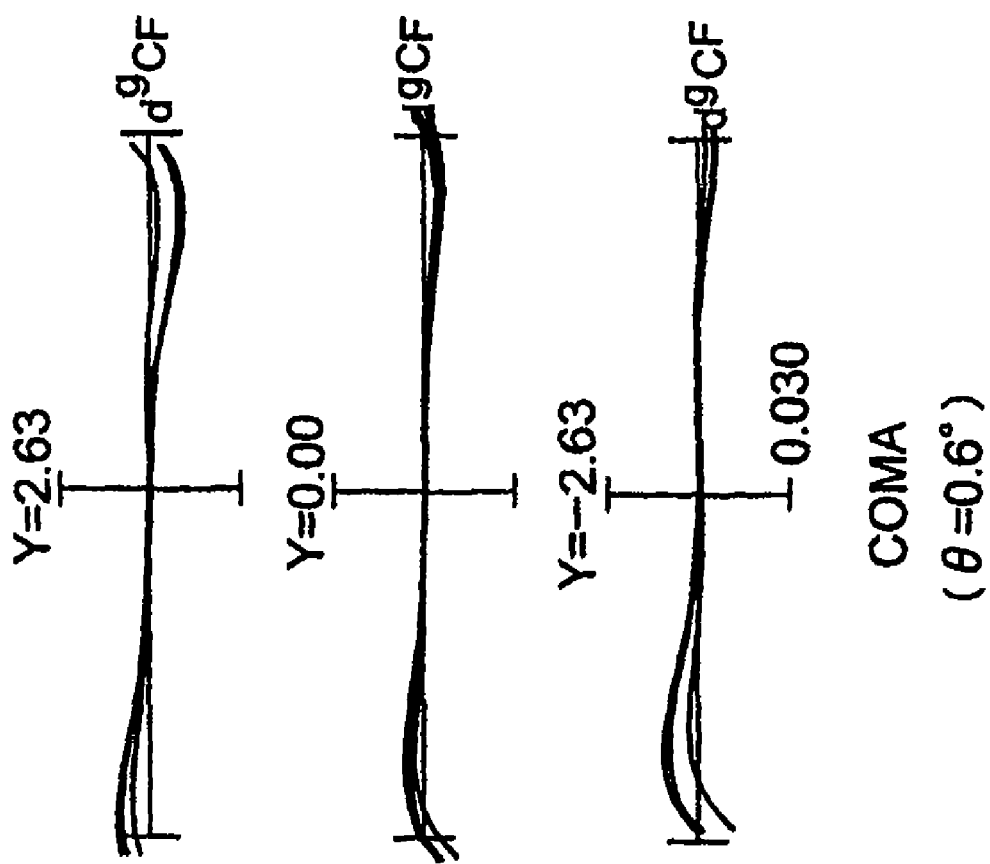
Figure 11C:
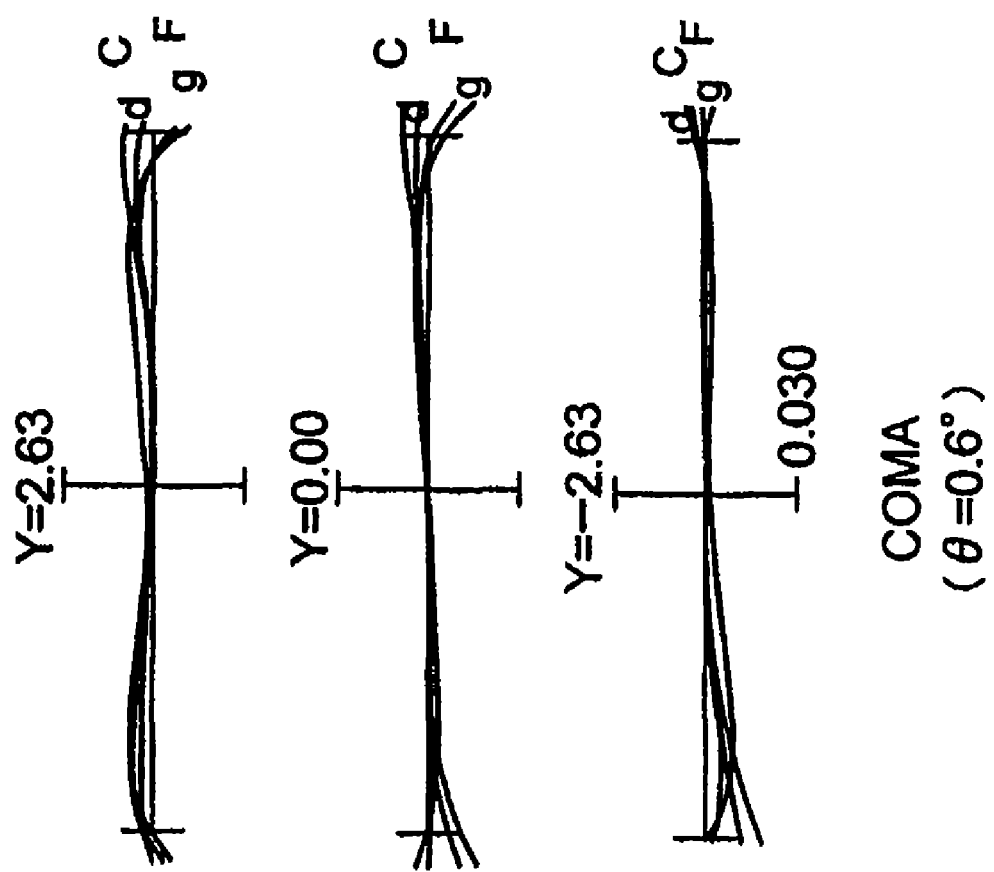

(1): $100 \times \alpha^2/(-f1) \times ft = 1.099$
(2): $fw \times f2/(-f1)^2 = 0.821$
(3): $S2/fw = 1.029$
(4): $FNw \times fw/(-f1) = 2.480$
(5): $Asag/fw = 0.174$
(6): $TLw/f34 = 1.093$
(7): $fw/f45 = -0.605$
(8): $Z \times S1/S2 = 1.981$ FIGS. 10A, 10B and 10C are graphs showing various aberrations of the zoom lens system according to Example 3 upon focusing on infinity, in which FIG. 10A shows the wide-angle end state, FIG. 10B shows the intermediate focal length state, and FIG. 10C shows the telephoto end state. FIGS. 11A, 11B, 11C are graphs showing coma upon shifting a vibration reduction lens group of the zoom lens system according to Example 3, in which FIG. 11A shows the wide-angle end state, FIG. 11B shows the intermediate focal length state, and FIG. 11C shows the telephoto end state.

As is apparent from the respective graphs, the zoom lens system according to Example 3 shows superb optical performance as a result of good corrections to various aberrations over entire zoom range from the wide-angle end state W to the telephoto end state T even in the state upon shifting.

Example 4

Figure 12:
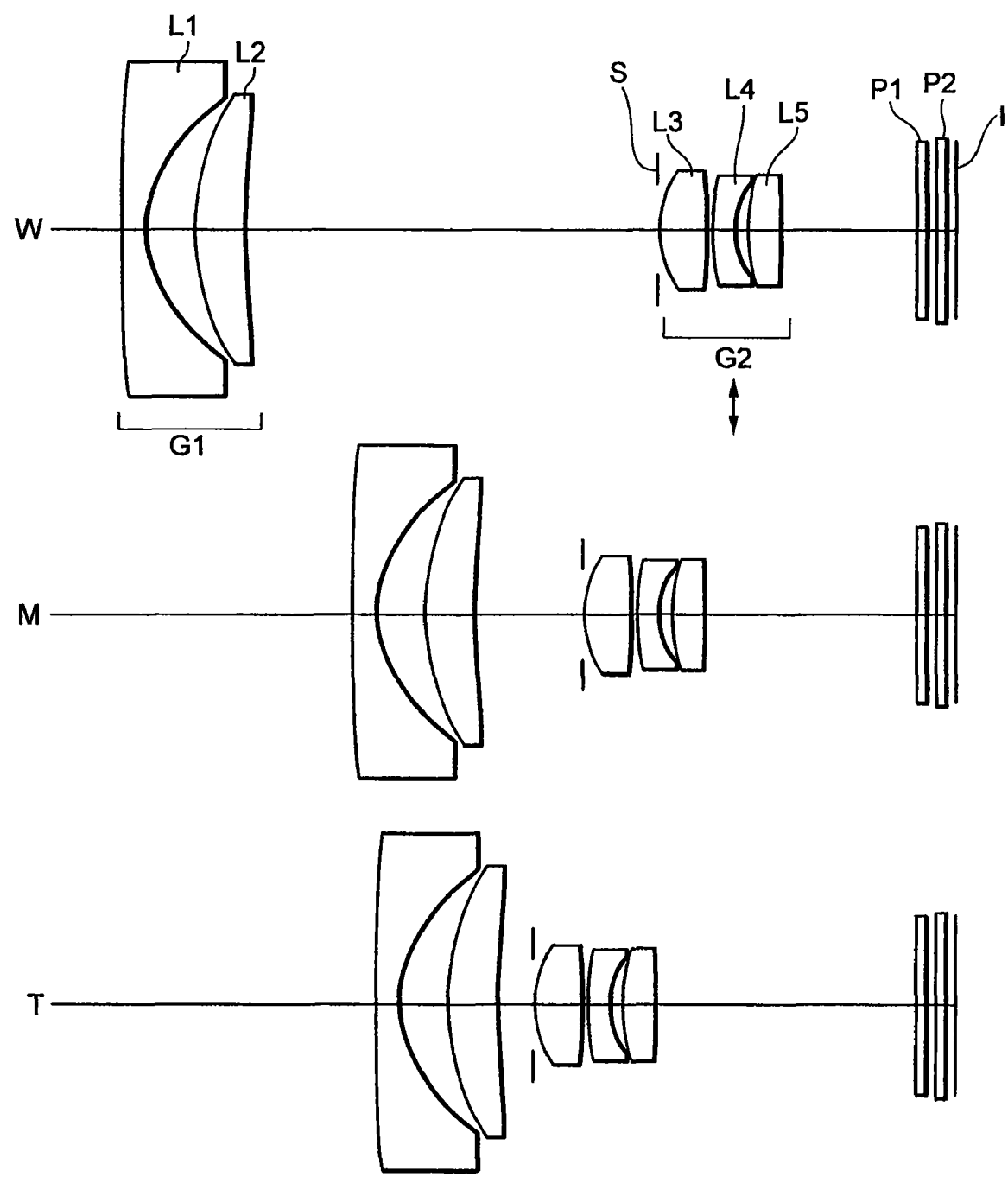
FIG. 12 is a diagram showing a lens configuration of a zoom lens system according to Example 4 of the present embodiment, in which W denotes a wide-angle end state, M denotes an intermediate focal length state, and T denotes a telephoto end state.

FIG. 12 is a diagram showing a lens configuration of a zoom lens system according to Example 4 of the present embodiment, in which W denotes a wide-angle end state, M denotes an intermediate focal length state, and T denotes a telephoto end state.

In FIG. 12, the zoom lens system according to Example 4 is composed of, in order from an object, a first lens group G1 having negative refractive power, and a second lens group G2 having positive refractive power. When a state of lens group positions varies from a wide-angle end state W to a telephoto end state T, the first lens group G1 and the second lens group G2 are moved along an optical axis such that a distance between the first lens group G1 and the second lens group G2 decreases.

The first lens group G1 having negative refractive power as a whole is composed of two lenses that are, in order from the object, a negative meniscus lens L1 having a convex surface facing the object, and a positive meniscus lens L2 having a convex surface facing the object.

The second lens group G2 having positive refractive power as a whole is composed of three lenses that are, in order from the object, a double convex positive lens L3, a negative meniscus lens L4 having a convex surface facing the object, and a double convex positive lens L5. Those three lenses are independently disposed with respective air spaces in between.

An aperture stop S for defining an f-number is disposed to the object side adjacent to the third lens L3, and moved together with the second lens group G2.

An image blur on the image plane I caused by a camera shake and the like is corrected by shifting the second lens group G2 as a whole in a direction substantially perpendicular to the optical axis.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with the zoom lens system according to Example 4 are listed in Table 4.

TABLE 4

[Specifications]

|  | W | M | T |
|---|---|---|---|
| f = | 3.8 | 8.0 | 11.0 |
| FNO = | 3.04 | 3.98 | 4.66 |
| 2ω = | 80.6° | 41.5° | 30.6° |
| Bf = | 0.00921 (constant) | | |

TABLE 4-continued

[Lens Data]

| | r | d | vd | nd |
|---|---|---|---|---|
| 1 | 105.8689 | 0.9500 | 40.10 | 1.851350 |
| 2* | 4.5716 | 2.2000 | | |
| 3 | 10.0444 | 2.0900 | 22.76 | 1.808095 |
| 4 | 54.1445 | D4 | | |
| 5* | 3.6784 | 2.0000 | 61.18 | 1.589130 |
| 6* | −24.4656 | 0.3000 | | |
| 7 | 9.5904 | 0.9500 | 23.78 | 1.846660 |
| 8 | 2.9782 | 0.5472 | | |
| 9 | 6.8299 | 1.4250 | 45.79 | 1.548141 |
| 10 | −69.6476 | D10 | | |
| 11 | 0.0000 | 0.3800 | 70.51 | 1.544370 |
| 12 | 0.0000 | 0.3800 | | |
| 13 | 0.0000 | 0.4560 | 64.14 | 1.516330 |
| 14 | 0.0000 | Bf | | |

[Aspherical Data]

Surface Number: 2

K = 0.0933
C4 = 2.45730E−04
C6 = −2.55670E−06
C8 = −7.95340E−08
C10 = 1.93750E−09

Surface Number: 5

K = −1.2552
C4 = 3.83160E−03
C6 = −9.22850E−05
C8 = 3.00040E−06
C10 = 2.92390E−08

Surface Number: 6

K = −25.3737
C4 = 1.28950E−04
C6 = 3.58760E−05
C8 = 3.82080E−06
C10 = −1.00290E−06

[Variable Distances]

| | W | M | T |
|---|---|---|---|
| f | 3.80000 | 8.00000 | 11.0000 |
| D0 | ∞ | ∞ | ∞ |
| D4 | 17.98214 | 4.81514 | 1.56614 |
| D10 | 5.81270 | 8.89270 | 11.09270 |

[Values for Conditional Expressions]

Figure 13A:
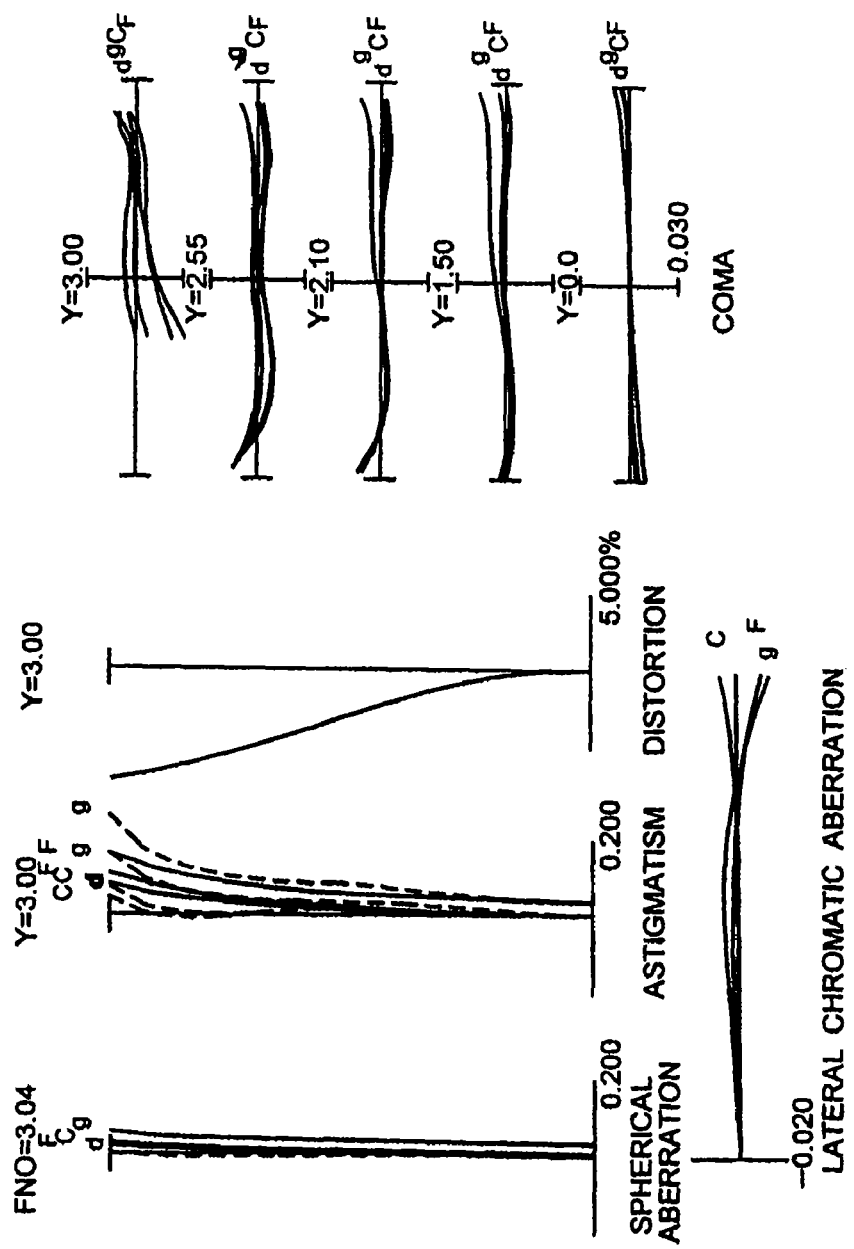
Figure 13B:
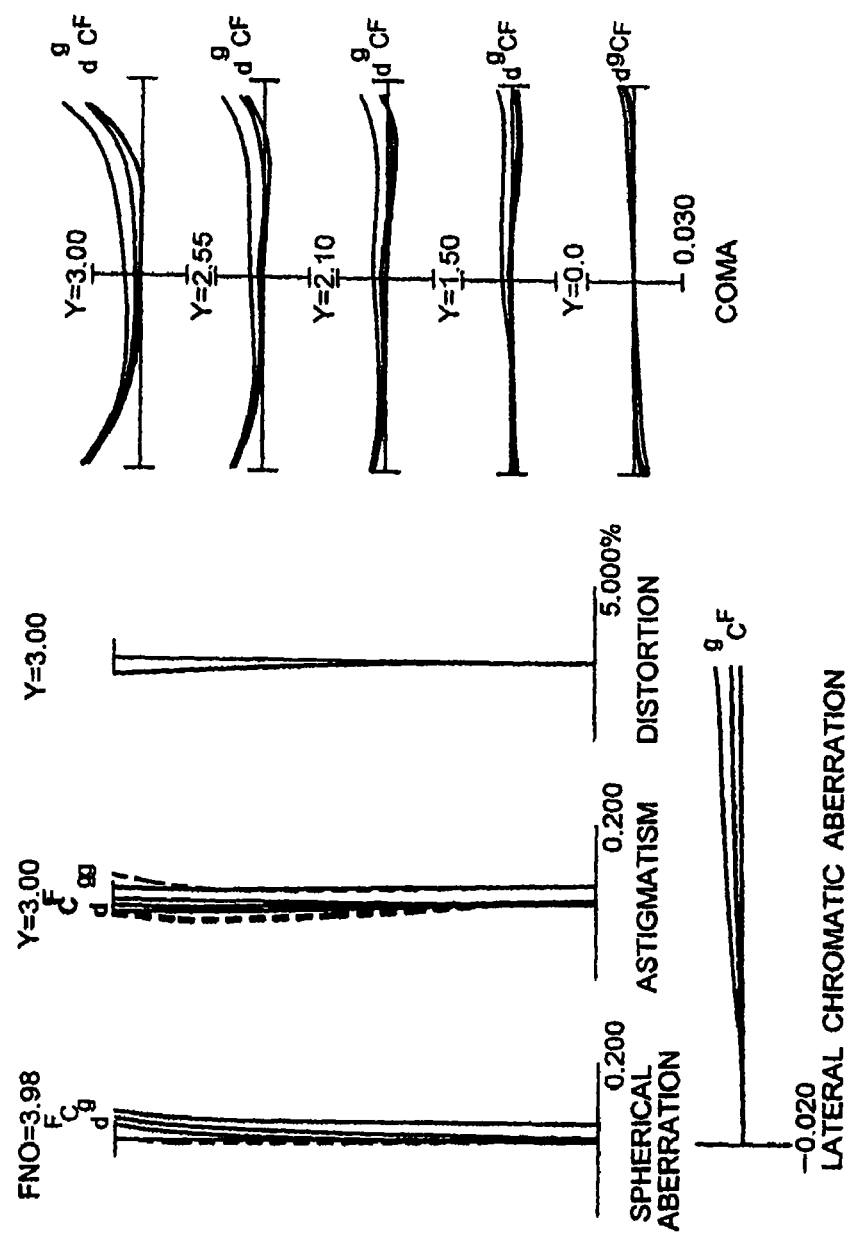
Figure 13C:
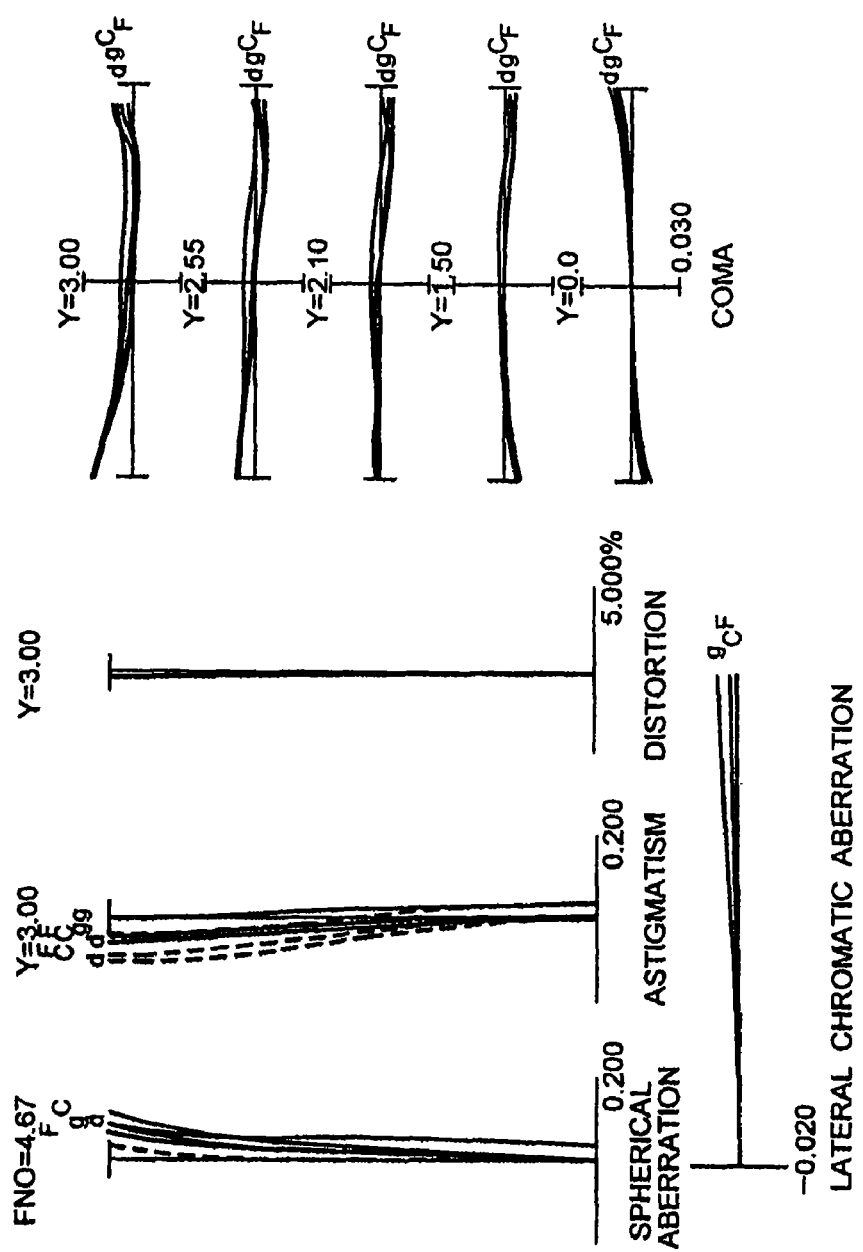
Figure 14A:
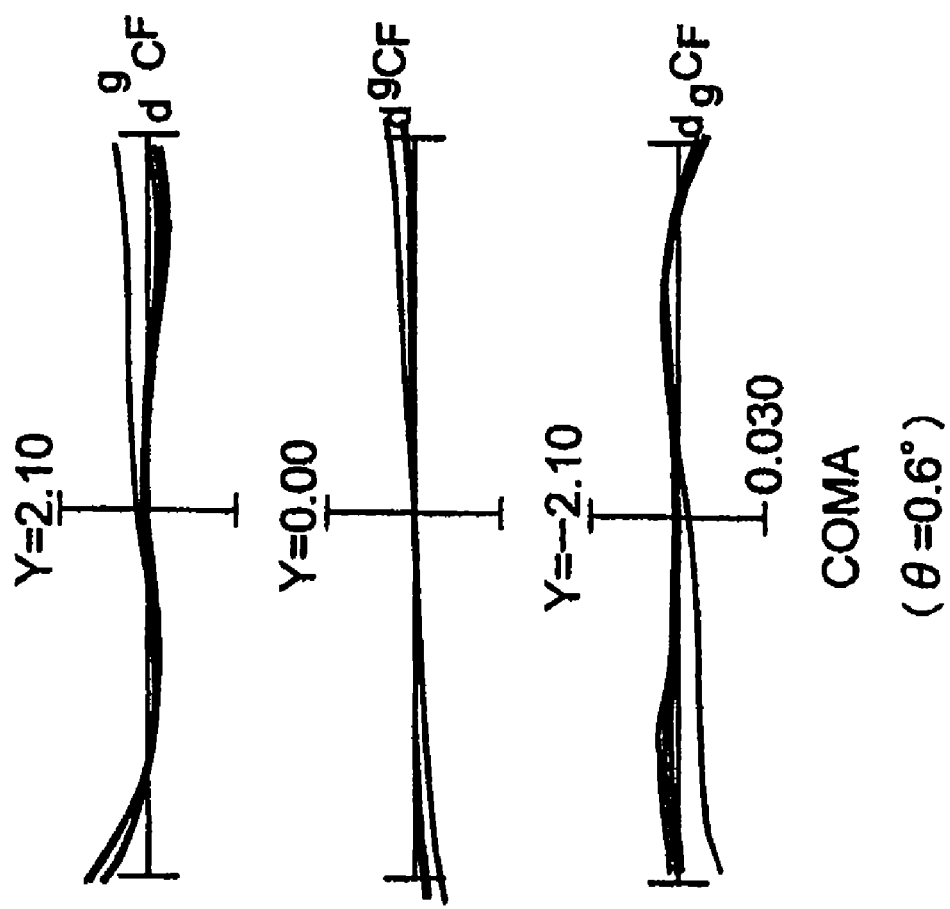
Figure 14B:
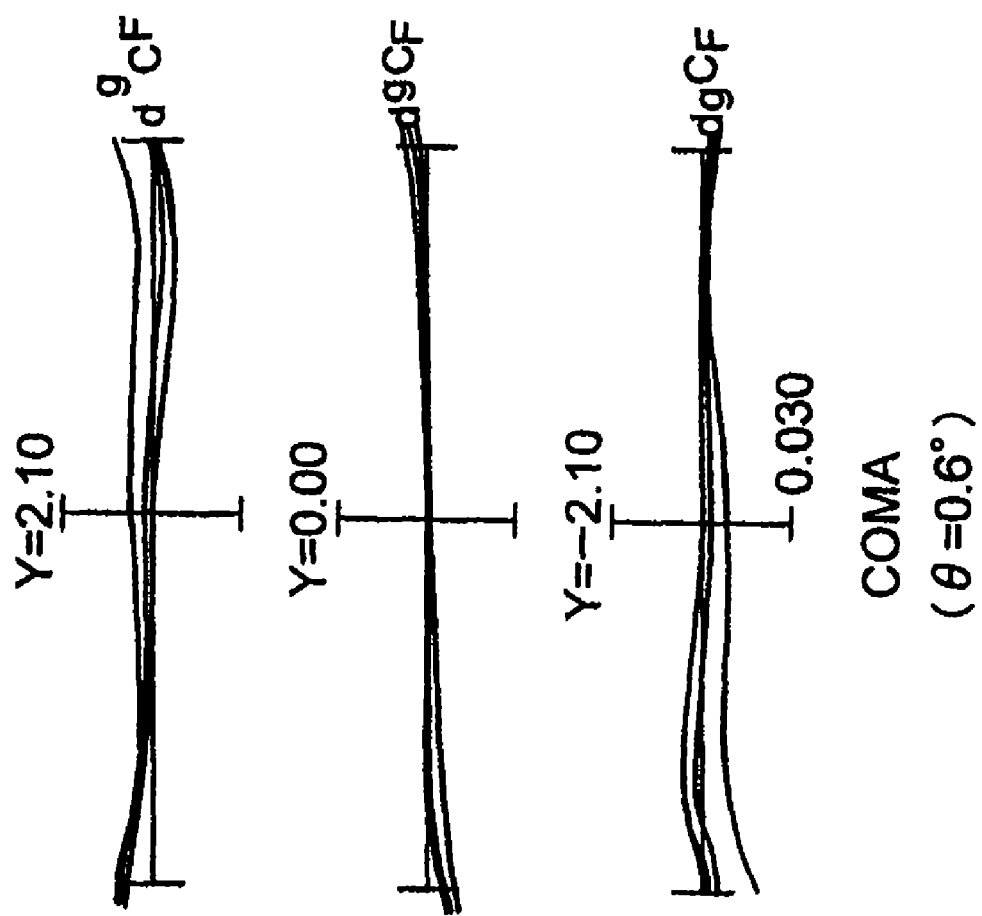
Figure 14C:
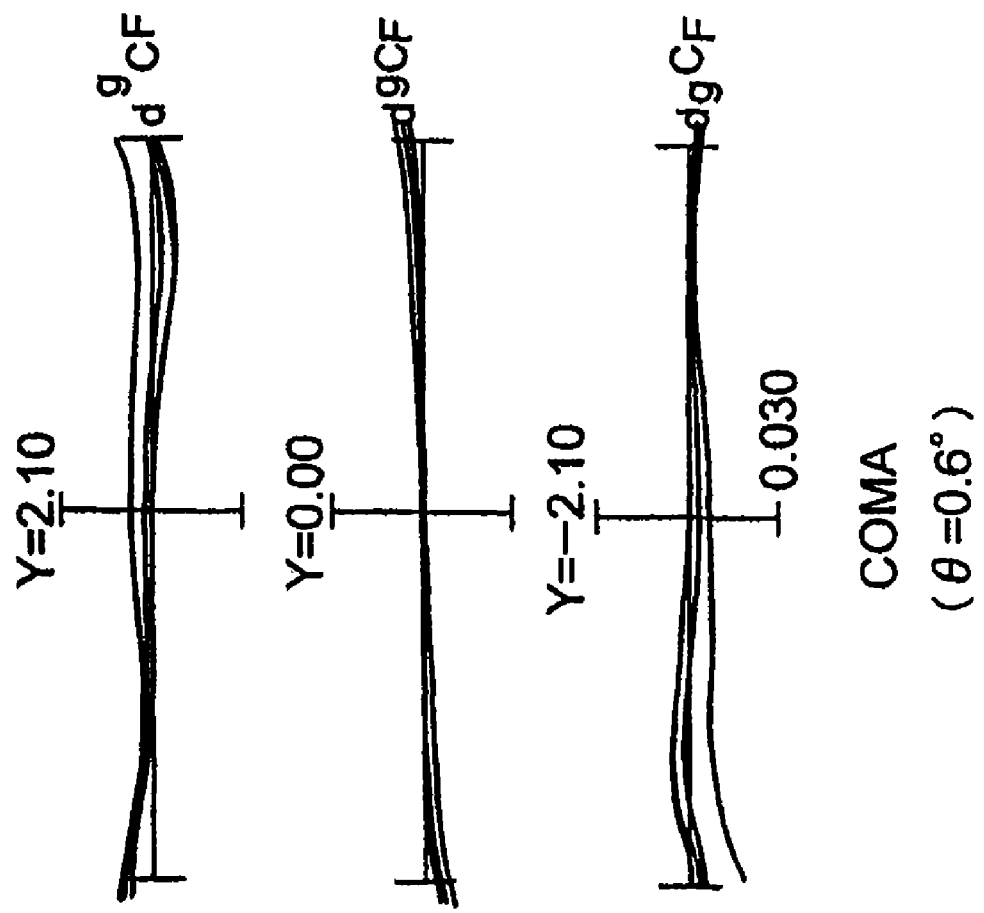

(1): $100 \times \alpha^2/(-f1) \times ft = 0.332$
(2): $fw \times f2/(-f1)^2 = 0.244$
(3): $S2/fw = 1.374$
(4): $FNw \times fw/(-f1) = 1.014$
(5): $\Delta sag/fw = 0.315$
(6): $TLw/f34 = 3.964$
(7): $fw/f45 = -0.718$
(8): $Z \times S1/S2 = 3.586$ FIGS. 13A, 13B and 13C are graphs showing various aberrations of the zoom lens system according to Example 4 upon focusing on infinity, in which FIG. 13A shows the wide-angle end state, FIG. 13B shows the intermediate focal length state, and FIG. 13C shows the telephoto end state. FIGS. 14A, 14B, 14C are graphs showing coma upon shifting a vibration reduction lens group of the zoom lens system according to Example 4, in which FIG. 14A shows the wide-angle end state, FIG. 14B shows the intermediate focal length state, and FIG. 14C shows the telephoto end state.

As is apparent from the respective graphs, the zoom lens system according to Example 4 shows superb optical performance as a result of good corrections to various aberrations over entire zoom range from the wide-angle end state W to the telephoto end state T even in the state upon shifting.

Example 5

Figure 15:
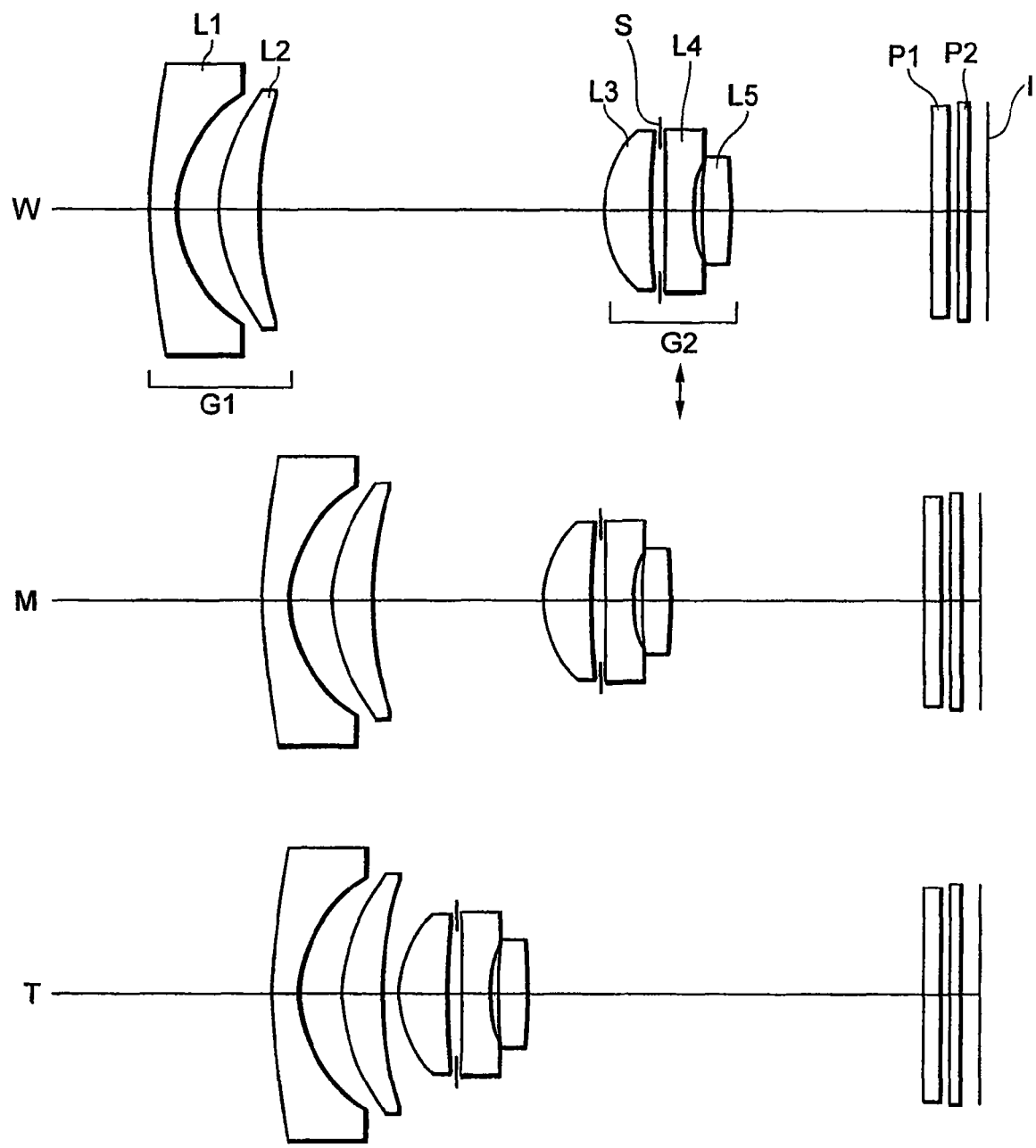
FIG. 15 is a diagram showing a lens configuration of a zoom lens system according to Example 5 of the present embodiment, in which W denotes a wide-angle end state, M denotes an intermediate focal length state, and T denotes a telephoto end state.

FIG. 15 is a diagram showing a lens configuration of a zoom lens system according to Example 5 of the present embodiment, in which W denotes a wide-angle end state, M denotes an intermediate focal length state, and T denotes a telephoto end state.

In FIG. 15, the zoom lens system according to Example 5 is composed of, in order from an object, a first lens group G1 having negative refractive power, and a second lens group G2 having positive refractive power. When a state of lens group positions varies from a wide-angle end state W to a telephoto end state T, the first lens group G1 and the second lens group G2 are moved along an optical axis such that a distance between the first lens group G1 and the second lens group G2 decreases.

The first lens group G1 having negative refractive power as a whole is composed of two lenses that are, in order from the object, a negative meniscus lens L1 having a convex surface facing the object, and a positive meniscus lens L2 having a convex surface facing the object.

The second lens group G2 having positive refractive power as a whole is composed of three lenses that are, in order from the object, a double convex positive lens L3, a double concave negative lens L4, and a double convex positive lens L5. Those three lenses are independently disposed with respective air spaces in between.

An aperture stop S for defining an f-number is disposed to the object side adjacent to the fourth lens L4, and moved together with the second lens group G2.

An image blur on the image plane I caused by a camera shake and the like is corrected by shifting the second lens group G2 as a whole in a direction substantially perpendicular to the optical axis.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with the zoom lens system according to Example 5 are listed in Table 5.

TABLE 5

[Specifications]

| | W | M | T |
|---|---|---|---|
| f = | 5.87 | 9.0 | 16.6 |
| FNO = | 2.92 | 3.44 | 4.84 |
| 2ω = | 68.7° | 46.0° | 25.5° |
| Bf = | 0.37 (constant) | | |

[Lens Data]

| | r | d | vd | nd |
|---|---|---|---|---|
| 1 | 37.0598 | 1.0000 | 40.10 | 1.851350 |
| 2* | 4.9359 | 1.7500 | | |
| 3 | 7.8587 | 1.6000 | 23.78 | 1.846660 |
| 4 | 16.5416 | D4 | | |
| 5 | 4.6342 | 1.9000 | 53.31 | 1.693500 |
| 6* | −6517.4350 | 0.5500 | | |
| 7 | −70.0933 | 1.1000 | 23.78 | 1.846660 |
| 8 | 5.8445 | 0.3182 | | |
| 9 | 19.5418 | 1.1500 | 40.42 | 1.727600 |

TABLE 5-continued

| | | | | |
|---|---|---|---|---|
| 10* | −11.2979 | D10 | | |
| 11 | 0.0000 | 0.6000 | 64.20 | 1.516800 |
| 12 | 0.0000 | 0.4000 | | |
| 13 | 0.0000 | 0.5000 | 64.20 | 1.516800 |
| 14 | 0.0000 | Bf | | |

[Aspherical Data]

Surface Number: 2

K = 0.1766
C4 = 4.21260E−04
C6 = 1.29760E−06
C8 = 1.88970E−07
C10 = −2.86990E−09

Surface Number: 6

K = 1.0000
C4 = 1.01780E−03
C6 = 1.11190E−05
C8 = −9.61610E−06
C10 = 5.59730E−07

Surface Number: 10

K = 12.2503
C4 = 1.80220E−03
C6 = 6.44670E−05
C8 = 3.26320E−05
C10 = 2.75600E−08

[Variable Distances]

| | W | M | T |
|---|---|---|---|
| f | 5.87000 | 9.00000 | 16.60000 |
| D0 | ∞ | ∞ | ∞ |
| D4 | 13.72252 | 6.61470 | 0.51181 |
| D10 | 8.37518 | 10.63169 | 16.11076 |

[Values for Conditional Expressions]

Figure 16A:
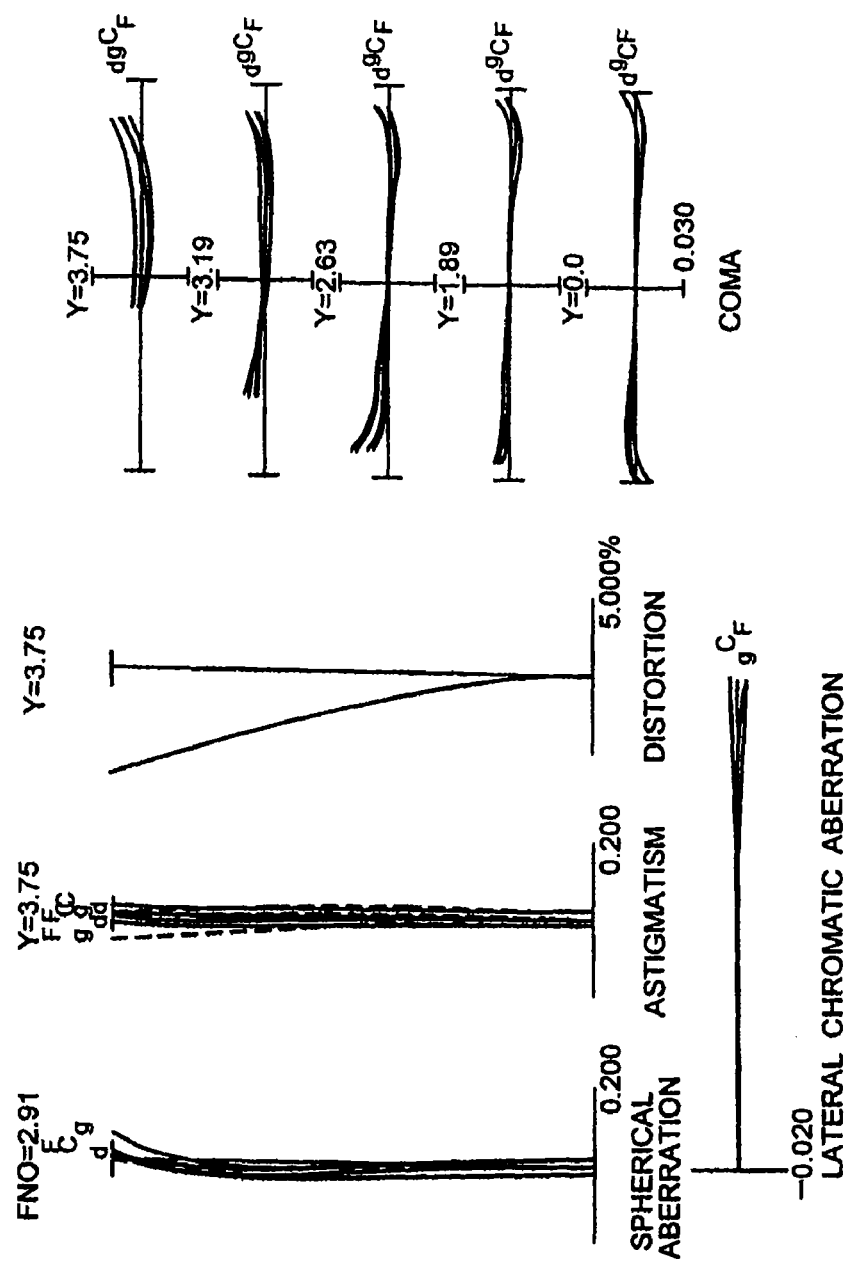
Figure 16B:
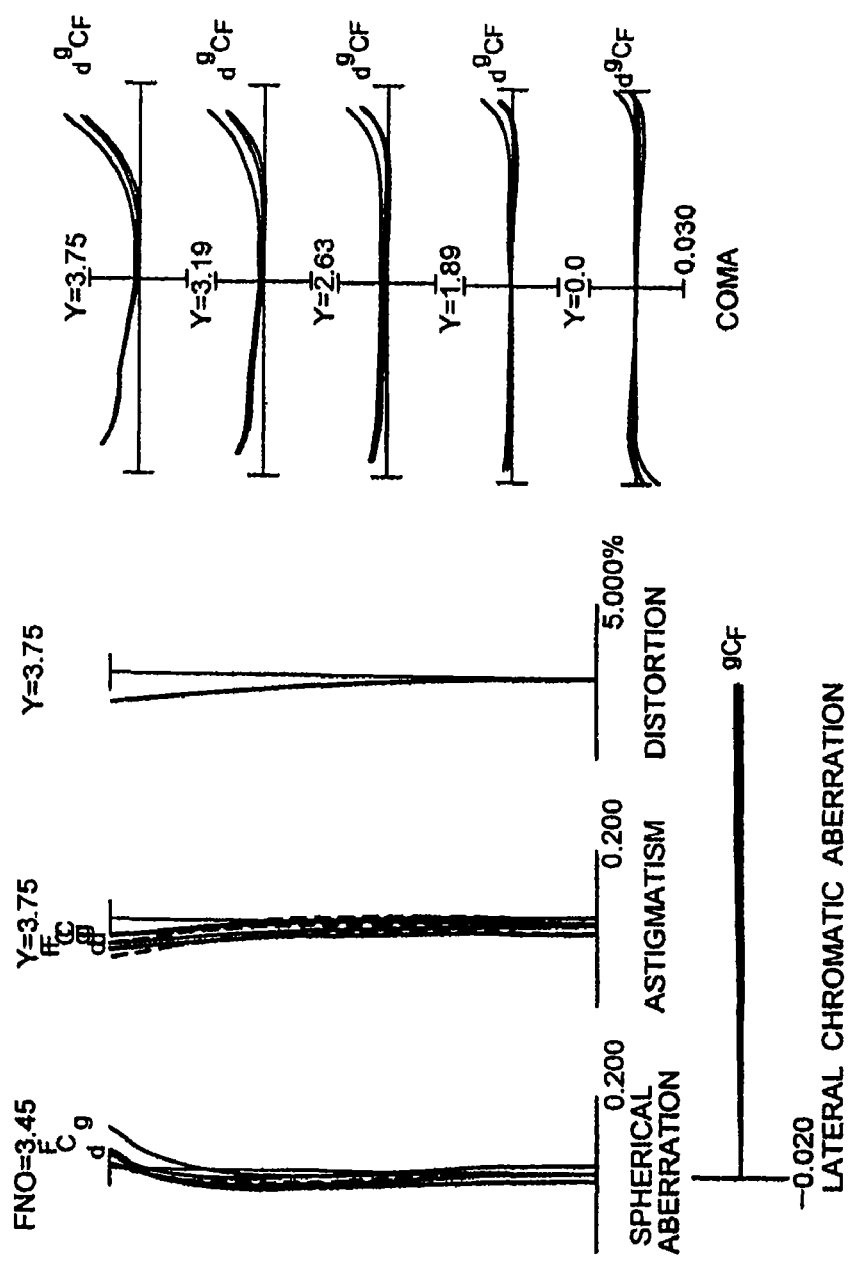
Figure 16C:
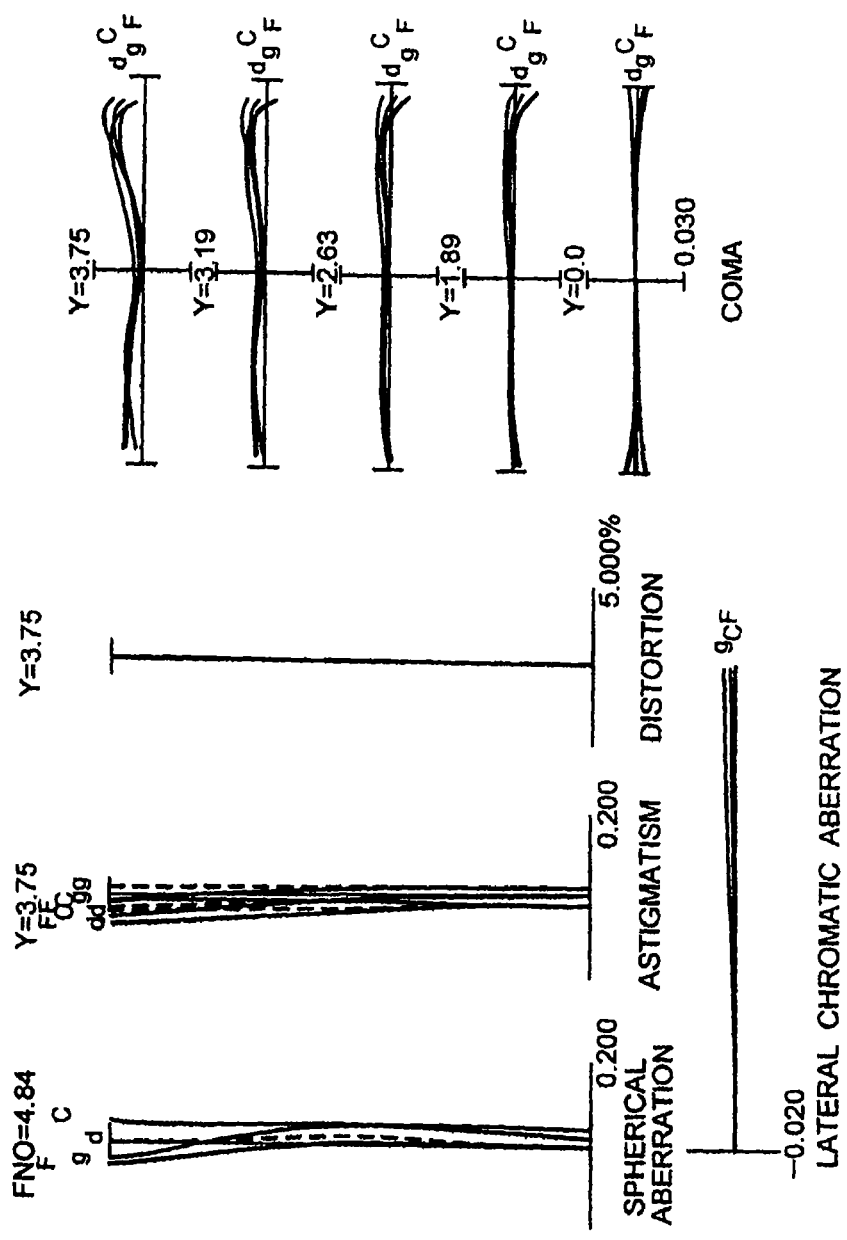
Figure 17A:
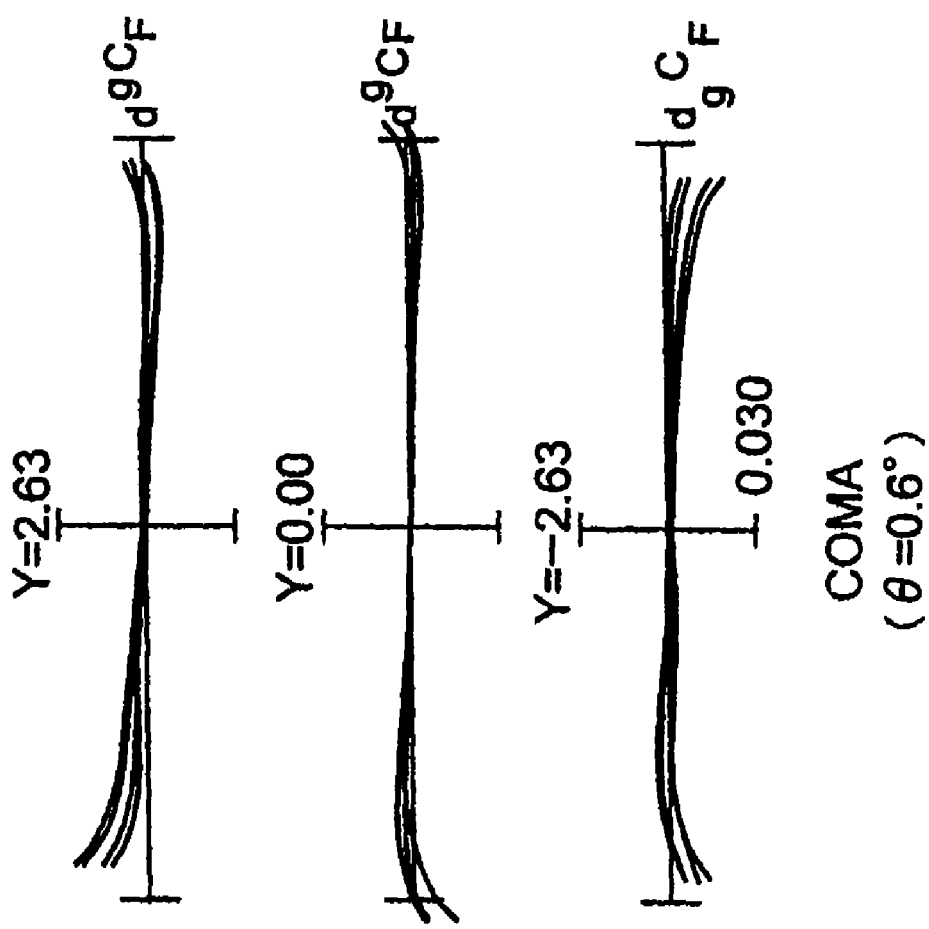
Figure 17B:
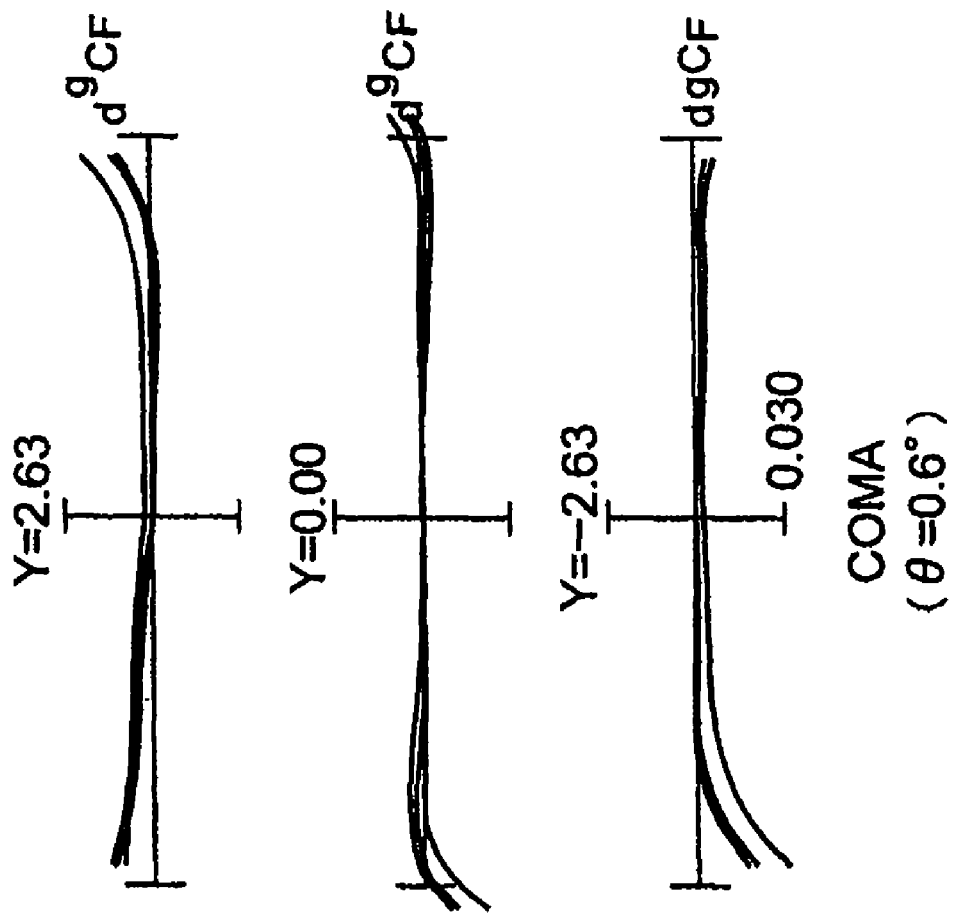
Figure 17C:
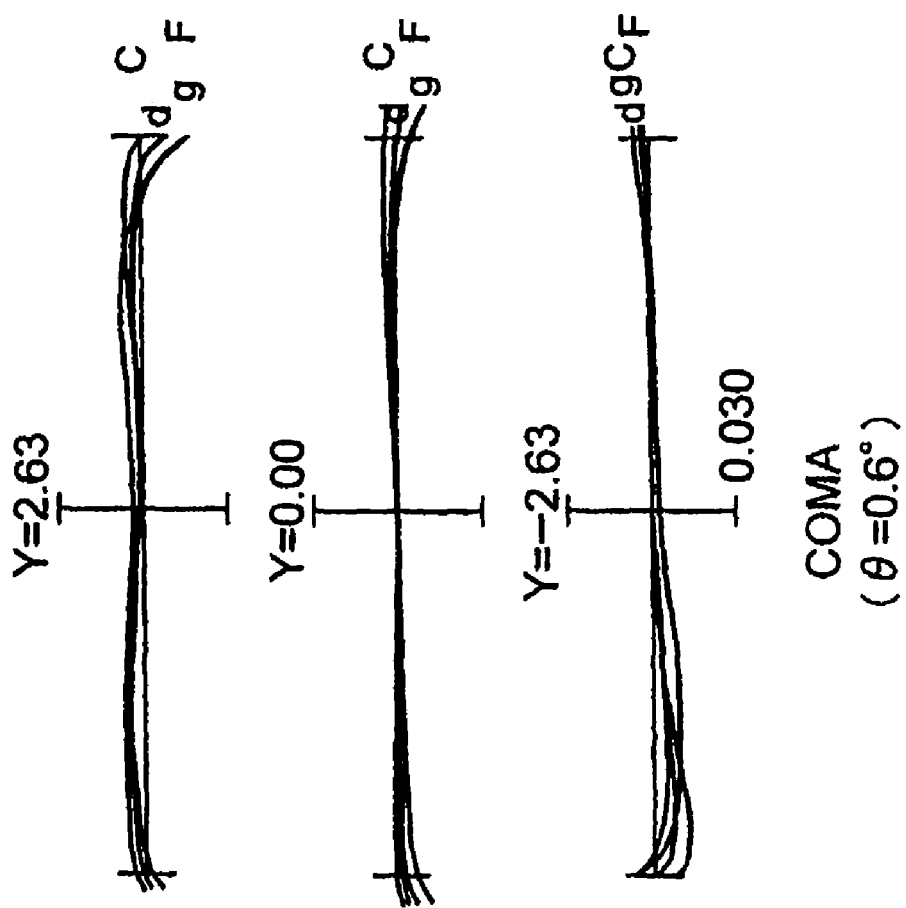

(1): $100 \times \alpha^2/(-f1) \times ft = 0.748$
(2): $fw \times f2/(-f1)^2 = 0.328$
(3): $S2/fw = 0.855$
(4): $FNw \times fw/(-f1) = 1.328$
(5): $\Delta sag/fw = 0.198$
(6): $TLw/f34 = -0.399$
(7): $fw/f45 = -0.622$
(8): $Z \times S1/S2 = 2.451$ FIGS. 16A, 16B and 16C are graphs showing various aberrations of the zoom lens system according to Example 5 upon focusing on infinity, in which FIG. 16A shows the wide-angle end state, FIG. 16B shows the intermediate focal length state, and FIG. 16C shows the telephoto end state. FIGS. 17A, 17B, 17C are graphs showing coma upon shifting a vibration reduction lens group of the zoom lens system according to Example 5, in which FIG. 17A shows the wide-angle end state, FIG. 17B shows the intermediate focal length state, and FIG. 17C shows the telephoto end state.

As is apparent from the respective graphs, the zoom lens system according to Example 5 shows superb optical performance as a result of good corrections to various aberrations over entire zoom range from the wide-angle end state W to the telephoto end state T even in the state upon shifting.

Example 6

Figure 18:
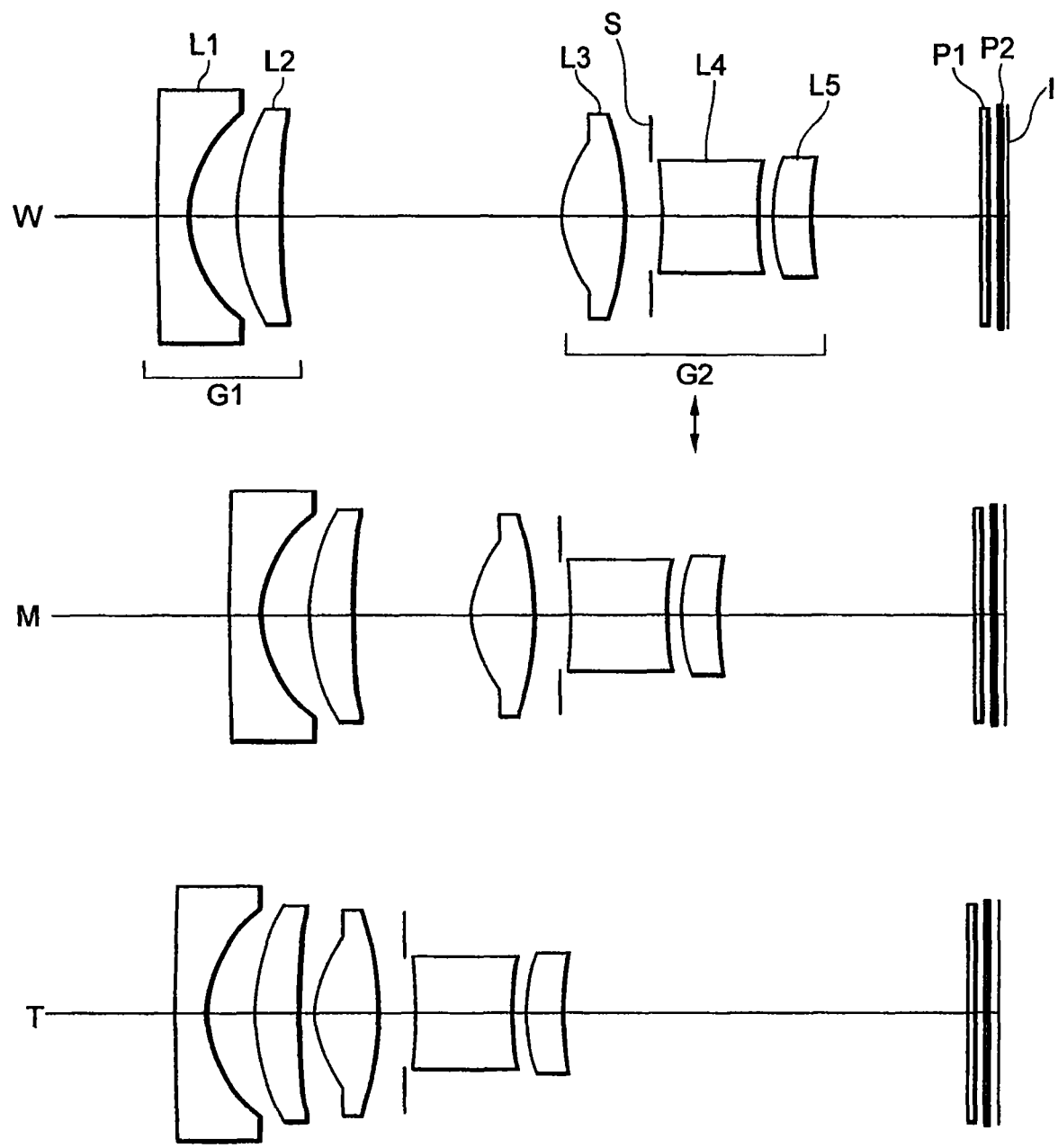
FIG. 18 is a diagram showing a lens configuration of a zoom lens system according to Example 6 of the present embodiment, in which W denotes a wide-angle end state, M denotes an intermediate focal length state, and T denotes a telephoto end state.

FIG. 18 is a diagram showing a lens configuration of a zoom lens system according to Example 6 of the present embodiment, in which W denotes a wide-angle end state, M denotes an intermediate focal length state, and T denotes a telephoto end state.

In FIG. 18, the zoom lens system according to Example 6 is composed of, in order from an object, a first lens group G1 having negative refractive power, and a second lens group G2 having positive refractive power. When a state of lens group positions varies from a wide-angle end state W to a telephoto end state T, the first lens group G1 and the second lens group G2 are moved along an optical axis such that a distance between the first lens group G1 and the second lens group G2 decreases.

The first lens group G1 having negative refractive power as a whole is composed of two lenses that are, in order from the object, a double concave negative lens L1, and a positive meniscus lens L2 having a convex surface facing the object.

The second lens group G2 having positive refractive power as a whole is composed of three lenses that are, in order from the object, a double convex positive lens L3, a double concave negative lens L4, and a positive meniscus lens L5 having a convex surface facing the object. Those three lenses are independently disposed with respective air spaces in between.

An aperture stop S for defining an f-number is disposed to the image side adjacent to the third lens L3, and moved together with the second lens group G2.

An image blur on the image plane I caused by a camera shake and the like is corrected by shifting the second lens group G2 as a whole in a direction substantially perpendicular to the optical axis.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with the zoom lens system according to Example 6 are listed in Table 6.

TABLE 6

[Specifications]

| | W | M | T |
|---|---|---|---|
| f = | 5.87 | 9.0 | 16.6 |
| FNO = | 2.92 | 3.44 | 4.84 |
| 2ω = | 68.7° | 46.0° | 25.5° |
| Bf = | 0.37 (constant) | | |

[Lens Data]

| | r | d | νd | nd |
|---|---|---|---|---|
| 1* | −195.6964 | 1.1640 | 40.94 | 1.806100 |
| 2* | 4.5226 | 1.9873 | | |
| 3 | 9.5349 | 1.6490 | 23.78 | 1.846660 |
| 4 | 37.3802 | D4 | | |
| 5* | 4.3708 | 2.5000 | 90.30 | 1.456000 |
| 6 | −10.6922 | 1.4314 | | |
| 7 | −17.7045 | 3.7626 | 24.06 | 1.821140 |
| 8* | 18.5346 | 0.5713 | | |
| 9 | 8.0000 | 1.4550 | 43.73 | 1.605620 |
| 10 | 15.8376 | D10 | | |
| 11 | 0.0000 | 0.3880 | 64.14 | 1.516330 |
| 12 | 0.0000 | 0.3880 | | |
| 13 | 0.0000 | 0.0970 | 64.14 | 1.516330 |
| 14 | 0.0000 | Bf | | |

[Aspherical Data]

Surface Number: 1

K = 1.0000
C4 = −1.02700E−04
C6 = 1.16450E−12
C8 = 2.31740E−07
C10 = 1.31540E−16

TABLE 6-continued

Surface Number: 2

K = 0.1587
C4 = −1.16470E−04
C6 = 1.39510E−05
C8 = −1.79920E−06
C10 = 1.42740E−07

Surface Number: 5

K = 0.2160
C4 = 1.09570E−10
C6 = −1.00600E−05
C8 = −1.33580E−07
C10 = 1.31540E−16

Surface Number: 8

K = 1.0000
C4 = 1.99640E−03
C6 = 1.16450E−12
C8 = 1.85960E−05
C10 = 1.31540E−16

[Variable Distances]

|     | W        | M        | T        |
| --- | -------- | -------- | -------- |
| f   | 6.00000  | 9.99999  | 17.00000 |
| D0  | ∞        | ∞        | ∞        |
| D4  | 11.06568 | 4.59611  | 0.60019  |
| D10 | 6.51184  | 9.92140  | 15.88813 |

[Values for Conditional Expressions]

Figure 19A:
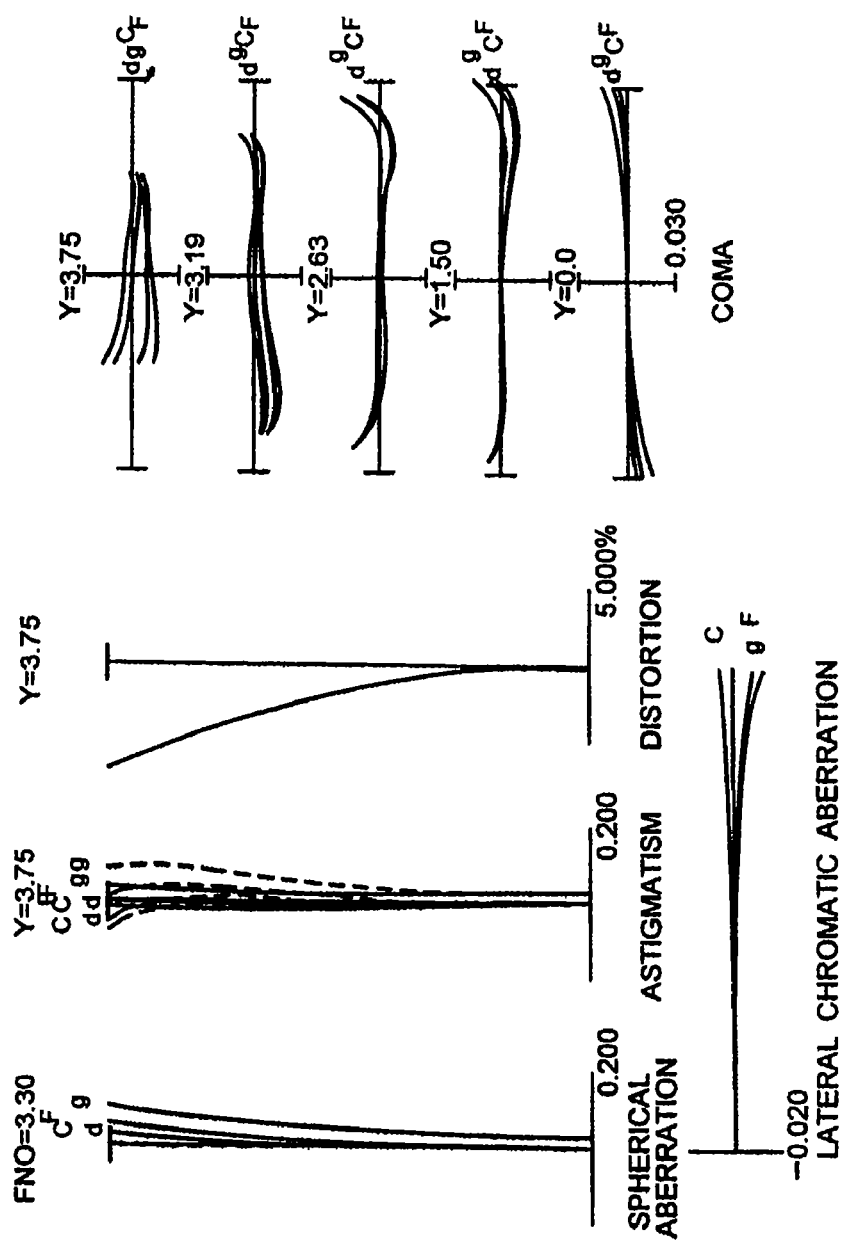
Figure 19B:
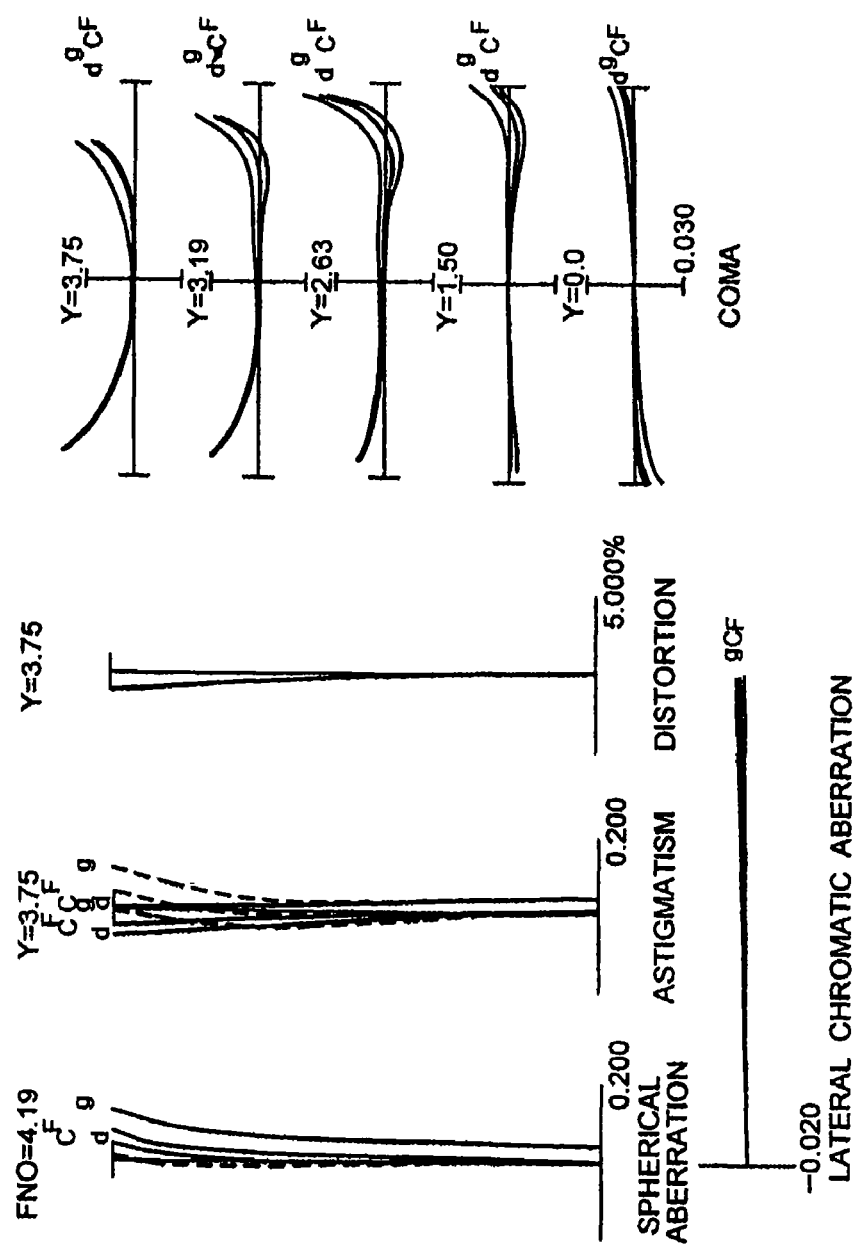
Figure 19C:
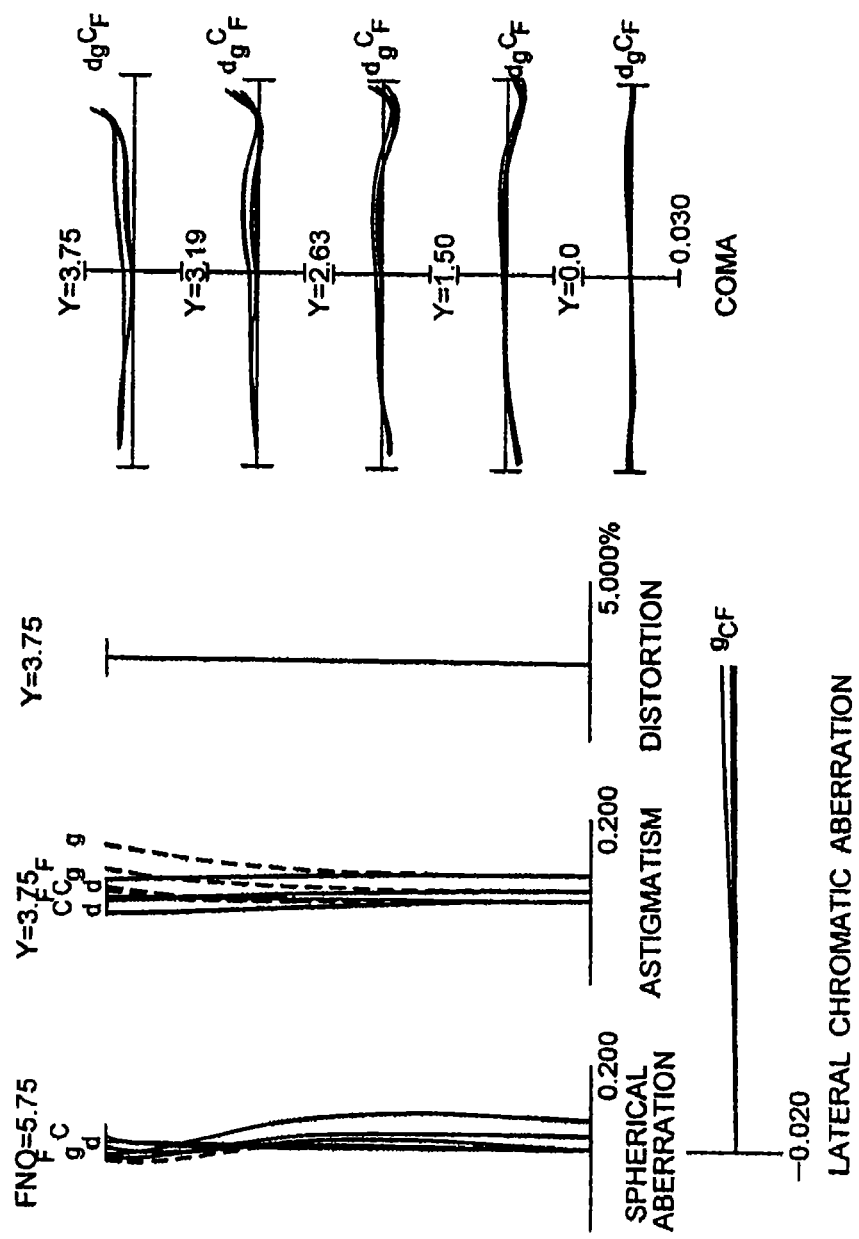
Figure 20A:
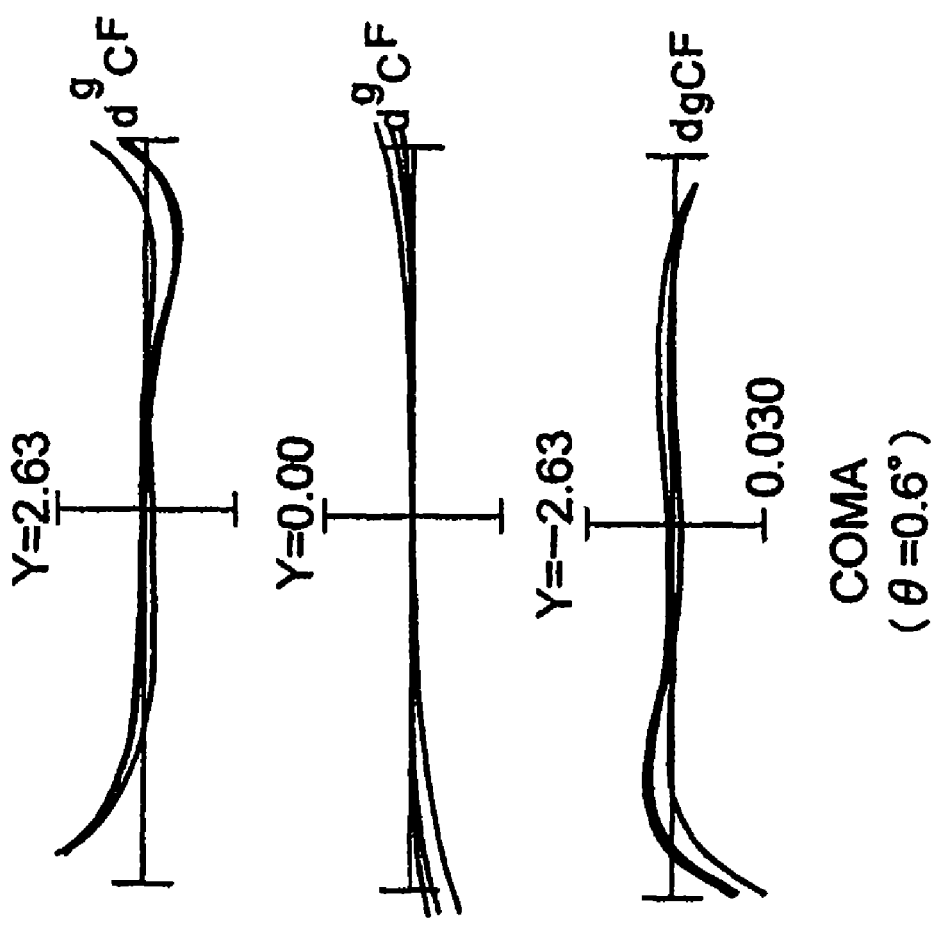
Figure 20B:
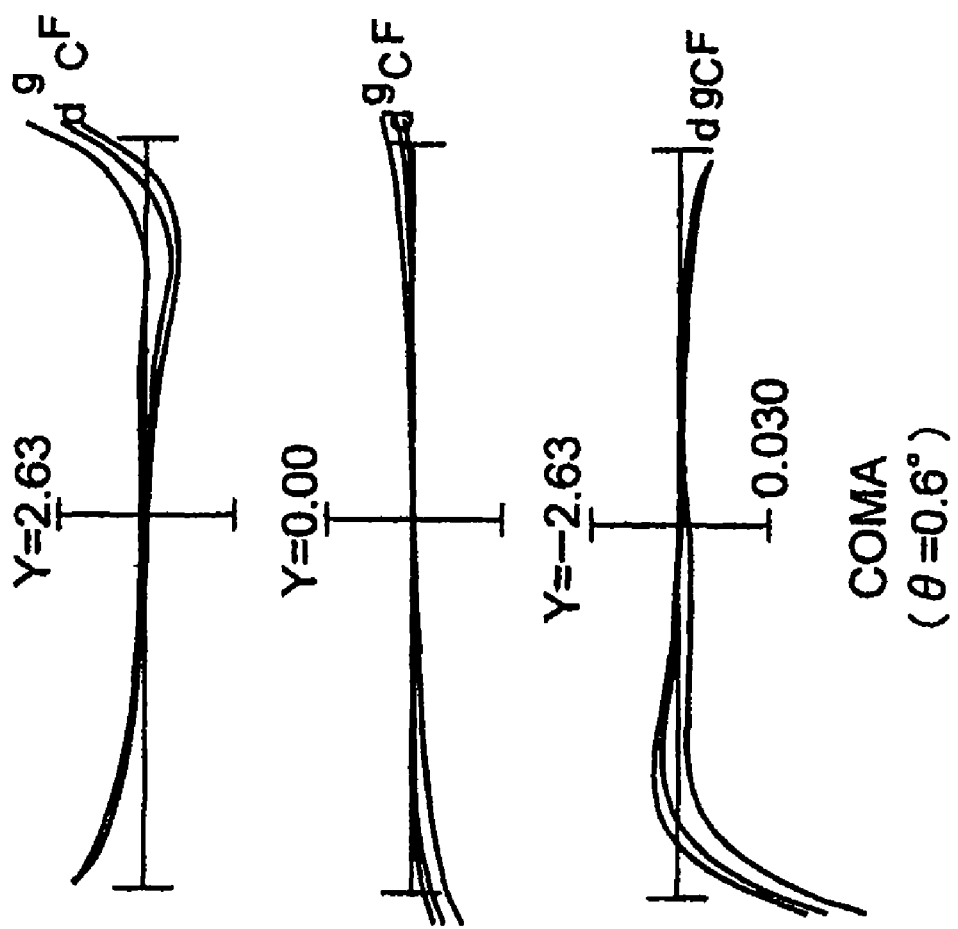
Figure 20C:
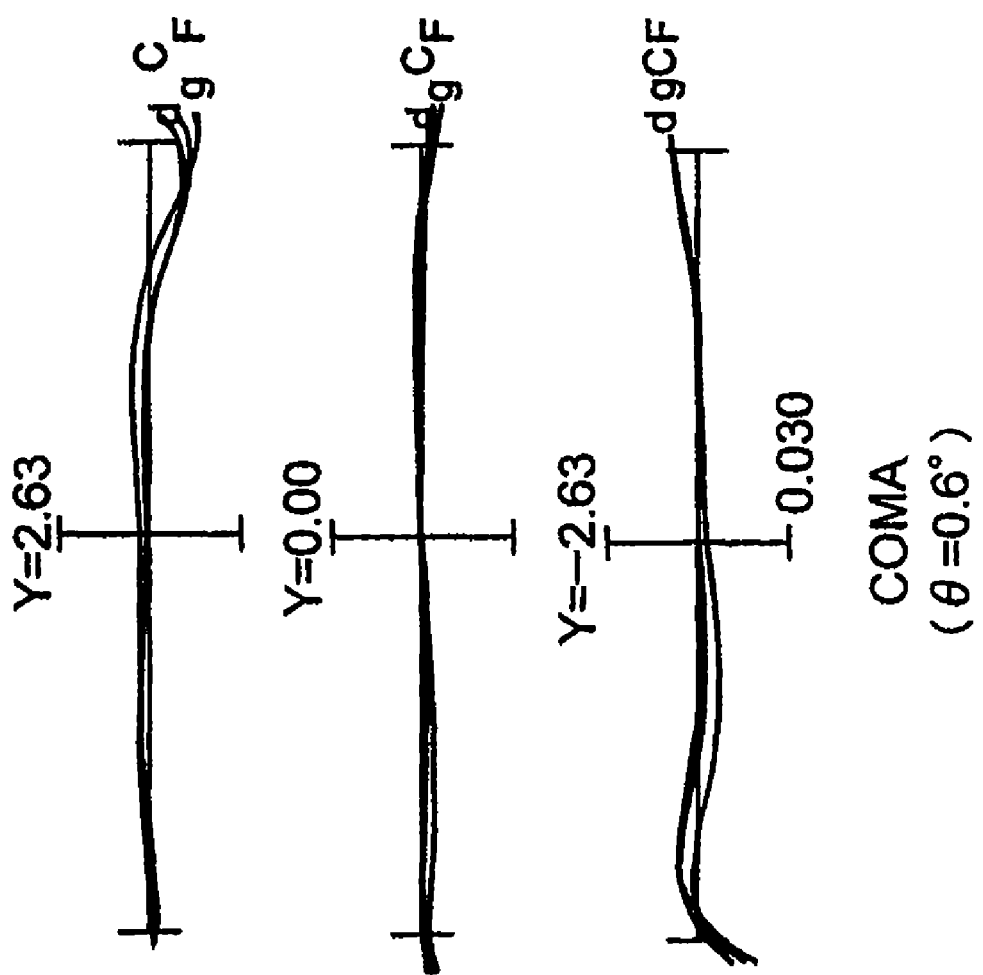

(1): $100 \times \alpha^2/(-f1) \times ft = 0.751$
(2): $fw \times f2/(-f1)^2 = 0.479$
(3): $S2/fw = 1.620$
(4): $FNw \times fw/(-f1) = 1.854$
(5): $\Delta sag/fw = 0.196$
(6): $TLw/f34 = -0.029$
(7): $fw/f45 = 0.200$
(8): $Z \times S1/S2 = 1.414$ FIGS. 19A, 19B and 19C are graphs showing various aberrations of the zoom lens system according to Example 6 upon focusing on infinity, in which FIG. 19A shows the wide-angle end state, FIG. 19B shows the intermediate focal length state, and FIG. 19C shows the telephoto end state. FIGS. 20A, 20B, 20C are graphs showing coma upon shifting a vibration reduction lens group of the zoom lens system according to Example 6, in which FIG. 20A shows the wide-angle end state, FIG. 20B shows the intermediate focal length state, and FIG. 20C shows the telephoto end state.

As is apparent from the respective graphs, the zoom lens system according to Example 6 shows superb optical performance as a result of good corrections to various aberrations over entire zoom range from the wide-angle end state W to the telephoto end state T even in the state upon shifting.

Example 7

Figure 21:
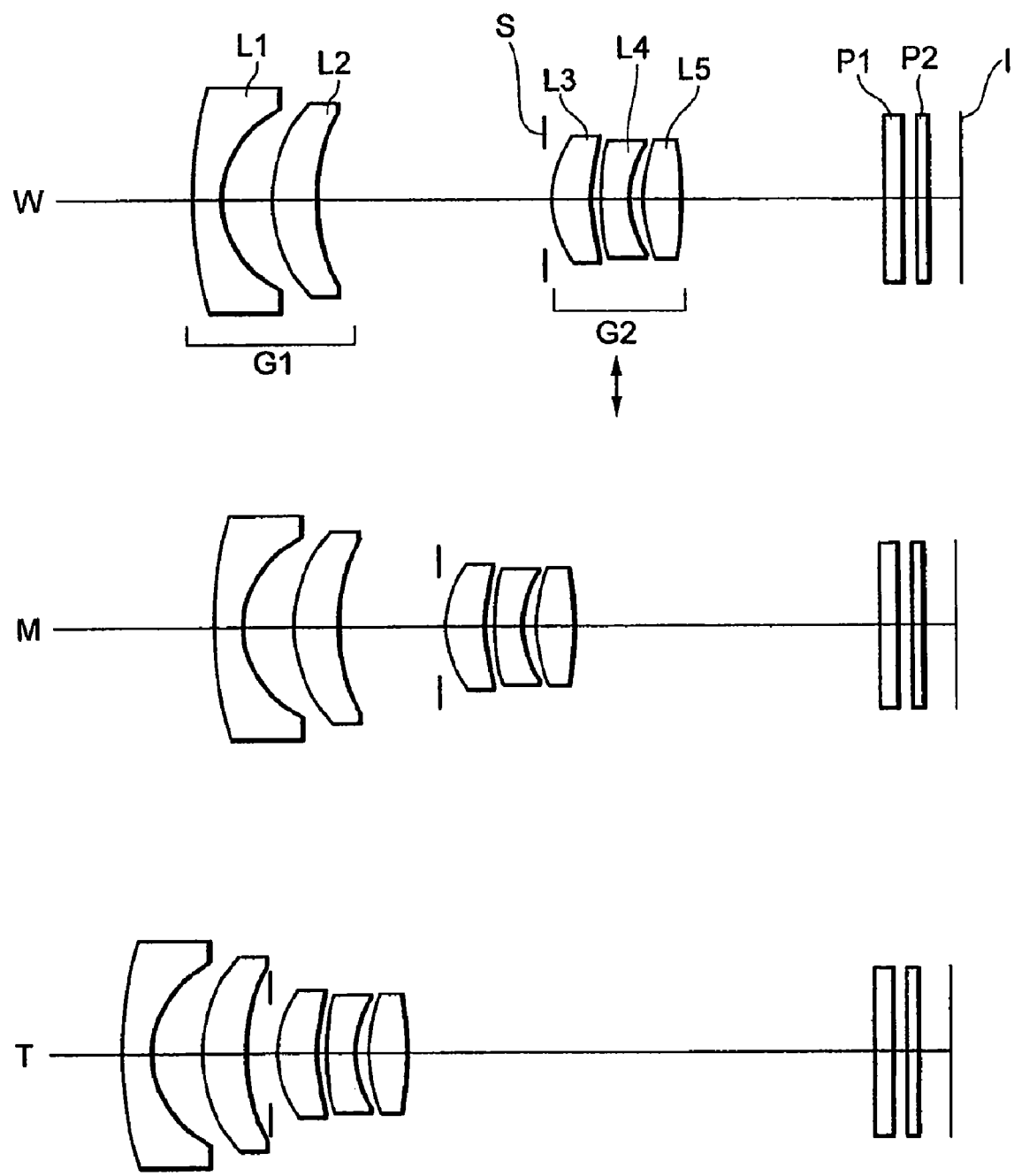
FIG. 21 is a diagram showing a lens configuration of a zoom lens system according to Example 7 of the present embodiment, in which W denotes a wide-angle end state, M denotes an intermediate focal length state, and T denotes a telephoto end state.

FIG. 21 is a diagram showing a lens configuration of a zoom lens system according to Example 7 of the present embodiment, in which W denotes a wide-angle end state, M denotes an intermediate focal length state, and T denotes a telephoto end state.

In FIG. 21, the zoom lens system according to Example 7 is composed of, in order from an object, a first lens group G1 having negative refractive power, and a second lens group G2 having positive refractive power. When a state of lens group positions varies from a wide-angle end state W to a telephoto end state T, the first lens group G1 and the second lens group G2 are moved along an optical axis such that a distance between the first lens group G1 and the second lens group G2 decreases.

The first lens group G1 having negative refractive power as a whole is composed of two lenses that are, in order from the object, a negative meniscus lens L1 having a convex surface facing the object, and a positive meniscus lens L2 having a convex surface facing the object.

The second lens group G2 having positive refractive power as a whole is composed of three lenses that are, in order from the object, a positive meniscus lens L3 having a convex surface facing the object, a negative meniscus lens L4 having a convex surface facing the object, and a double convex positive lens L5. Those three lenses are independently disposed with respective air spaces in between.

An aperture stop S for defining an f-number is disposed to the object side adjacent to the third lens L3, and moved together with the second lens group G2.

An image blur on the image plane I caused by a camera shake and the like is corrected by shifting the second lens group G2 as a whole in a direction substantially perpendicular to the optical axis.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with the zoom lens system according to Example 7 are listed in Table 7.

TABLE 7

[Specifications]

|       | W                 | M     | T     |
| ----- | ----------------- | ----- | ----- |
| f =   | 5.3               | 9.0   | 15.0  |
| FNO = | 3.60              | 4.58  | 6.17  |
| 2ω =  | 74.5°             | 46.4° | 28.3° |
| Bf =  | 1.30828 (constant) |       |       |

[Lens Data]

|    | r        | d      | νd    | nd       |
| -- | -------- | ------ | ----- | -------- |
| 1  | 17.4449  | 1.0000 | 45.60 | 1.755120 |
| 2* | 3.2739   | 1.8966 |       |          |
| 3* | 5.7432   | 1.6000 | 24.06 | 1.821140 |
| 4  | 7.9300   | D4     |       |          |
| 5  | 3.5757   | 1.4700 | 63.86 | 1.618810 |
| 6* | 13.2237  | 0.3136 |       |          |
| 7* | 9.4181   | 1.0000 | 25.43 | 1.805180 |
| 8  | 3.3532   | 0.5410 |       |          |
| 9  | 6.4560   | 1.4000 | 50.80 | 1.570990 |
| 10 | −10.2969 | D10    |       |          |
| 11 | 0.0000   | 0.7840 | 70.51 | 1.544370 |
| 12 | 0.0000   | 0.4000 |       |          |
| 13 | 0.0000   | 0.4000 | 64.14 | 1.516330 |
| 14 | 0.0000   | Bf     |       |          |

[Aspherical Data]

Surface Number: 2

K = 0.3700
C4 = 1.20240E−03
C6 = 2.48260E−05
C8 = 4.89150E−07
C10 = 1.54250E−07

Surface Number: 3

K = 1.3230
C4 = 1.10360E−04
C6 = 1.00000E−12
C8 = 1.49790E−07
C10 = 1.00000E−16

TABLE 7-continued

Surface Number: 6

K = 1.0927
C4 = −4.46250E−04
C6 = −1.14510E−04
C8 = 4.66280E−06
C10 = −2.38850E−06

Surface Number: 7

K = −1.0000
C4 = 2.15350E−03
C6 = −1.59980E−05
C8 = −8.91310E−07
C10 = 8.93630E−16

[Variable Distances]

| | W | M | T |
|---|---|---|---|
| f | 5.30000 | 9.00001 | 14.99999 |
| D0 | ∞ | ∞ | ∞ |
| D4 | 8.28586 | 3.59545 | 0.90798 |
| D10 | 7.40617 | 11.12892 | 17.16581 |

[Values for Conditional Expressions]

Figure 22A:
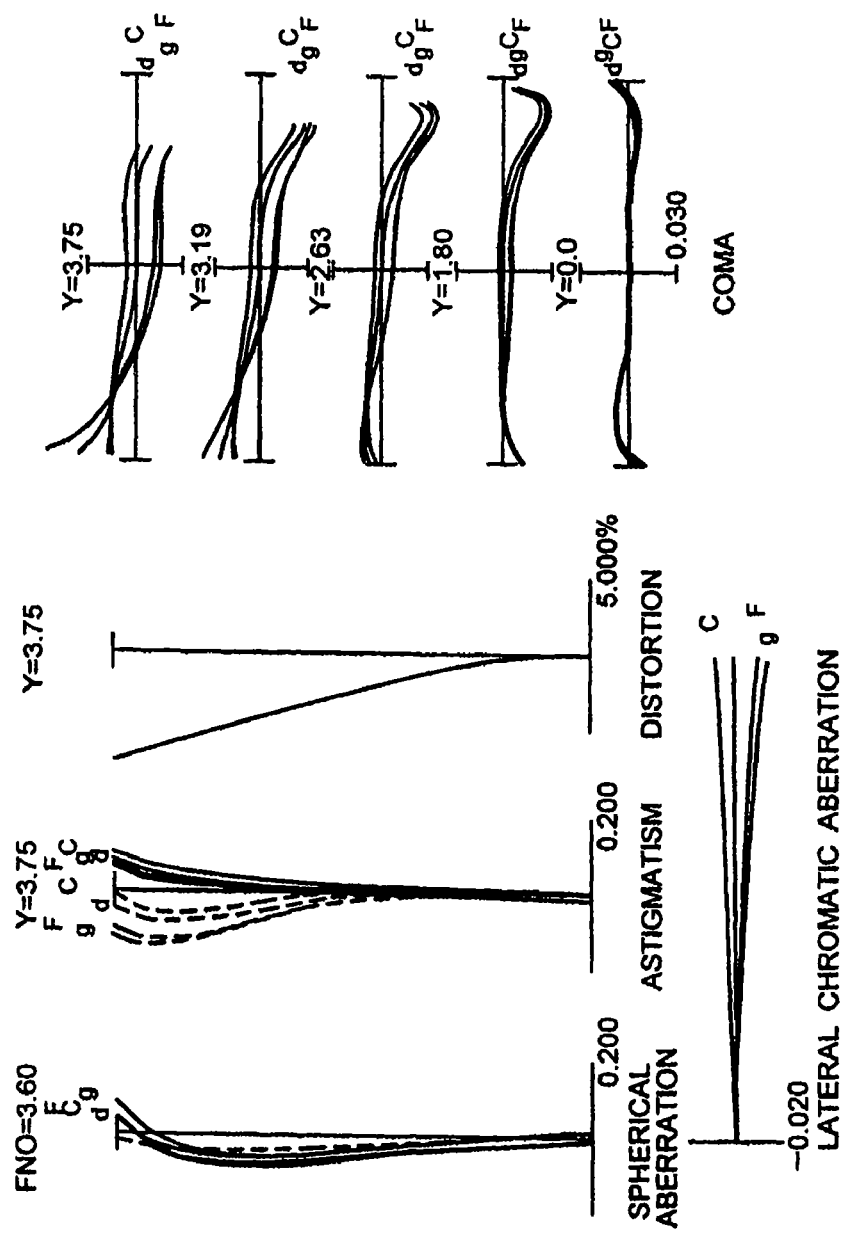
Figure 22B:
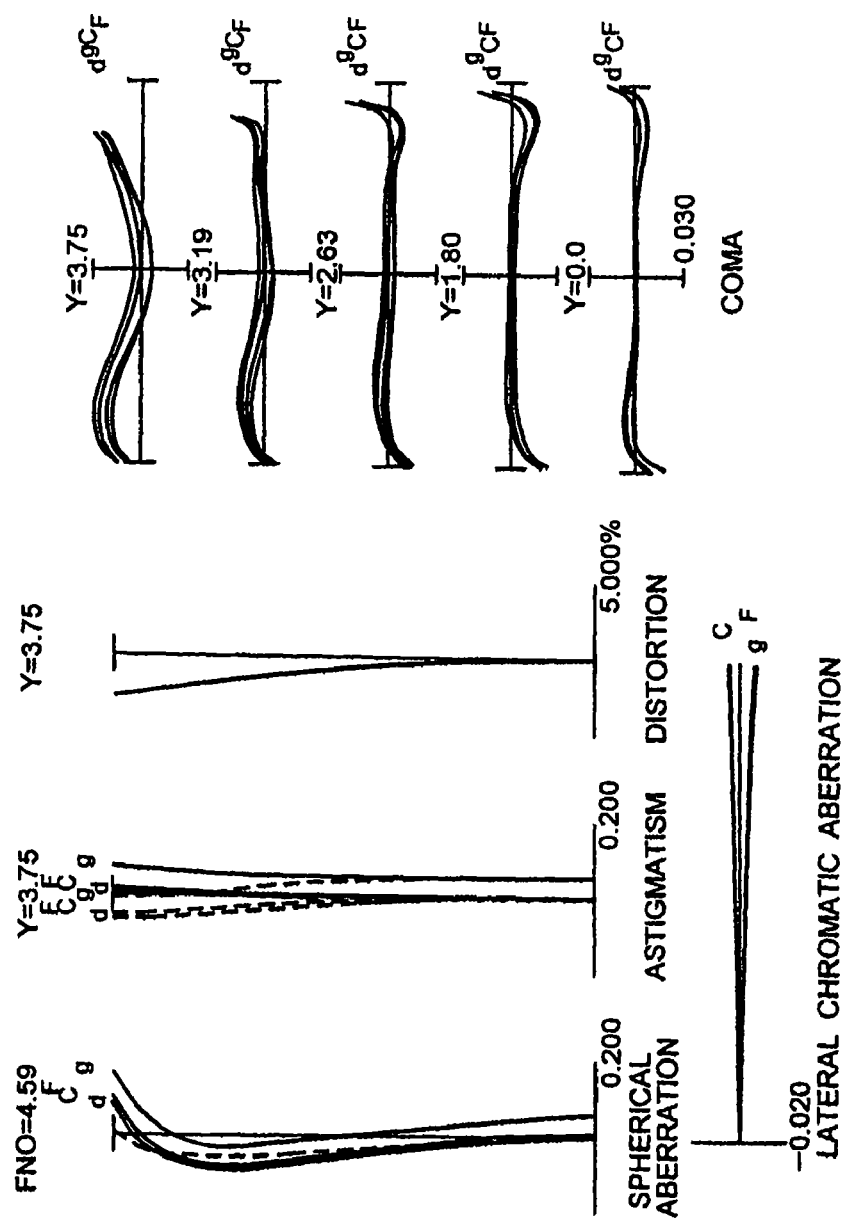
Figure 22C:
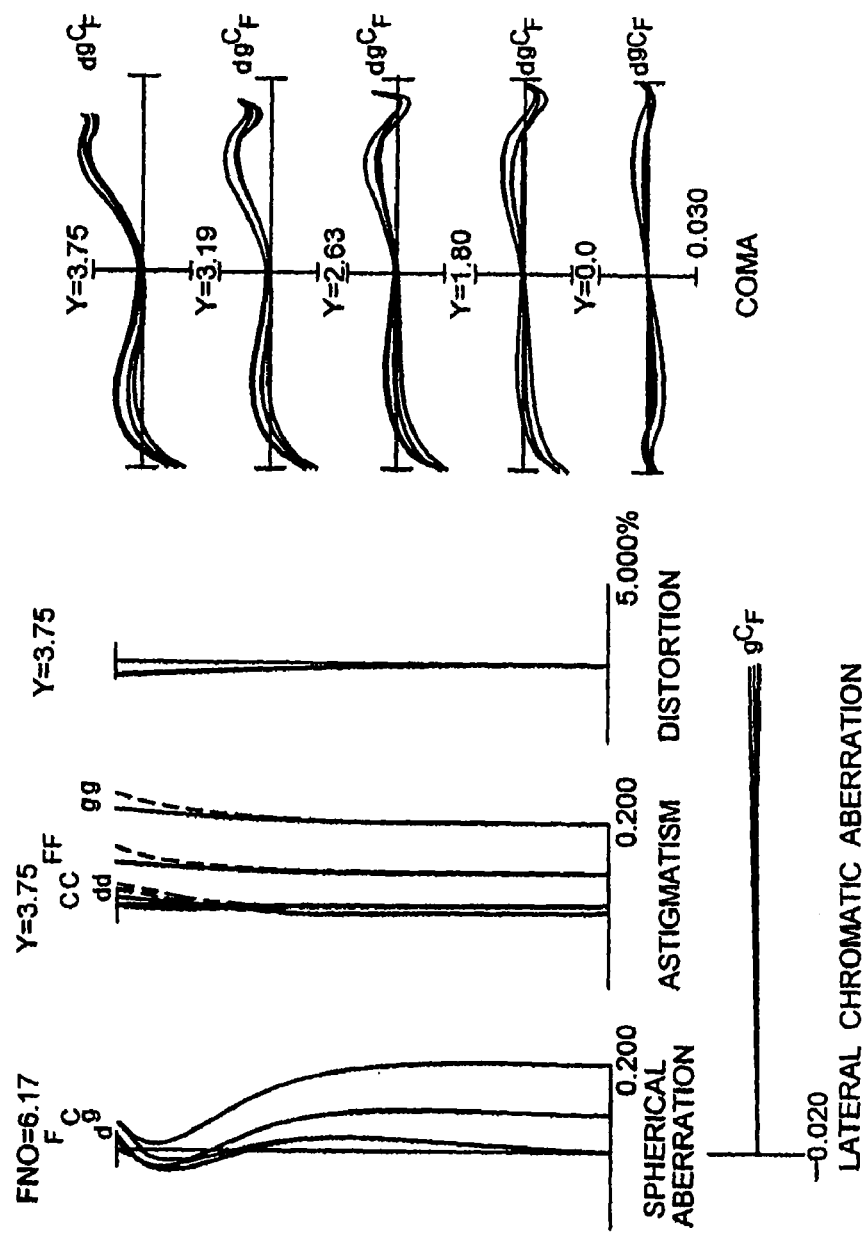
Figure 23A:
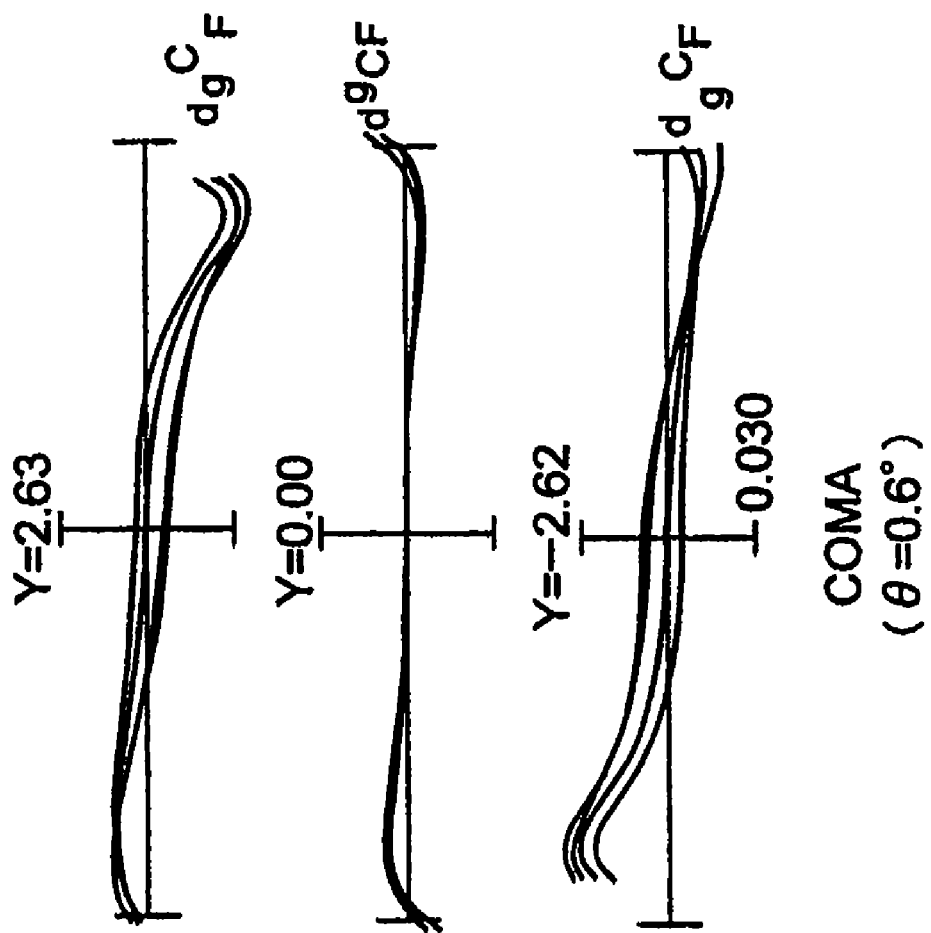
Figure 23B:
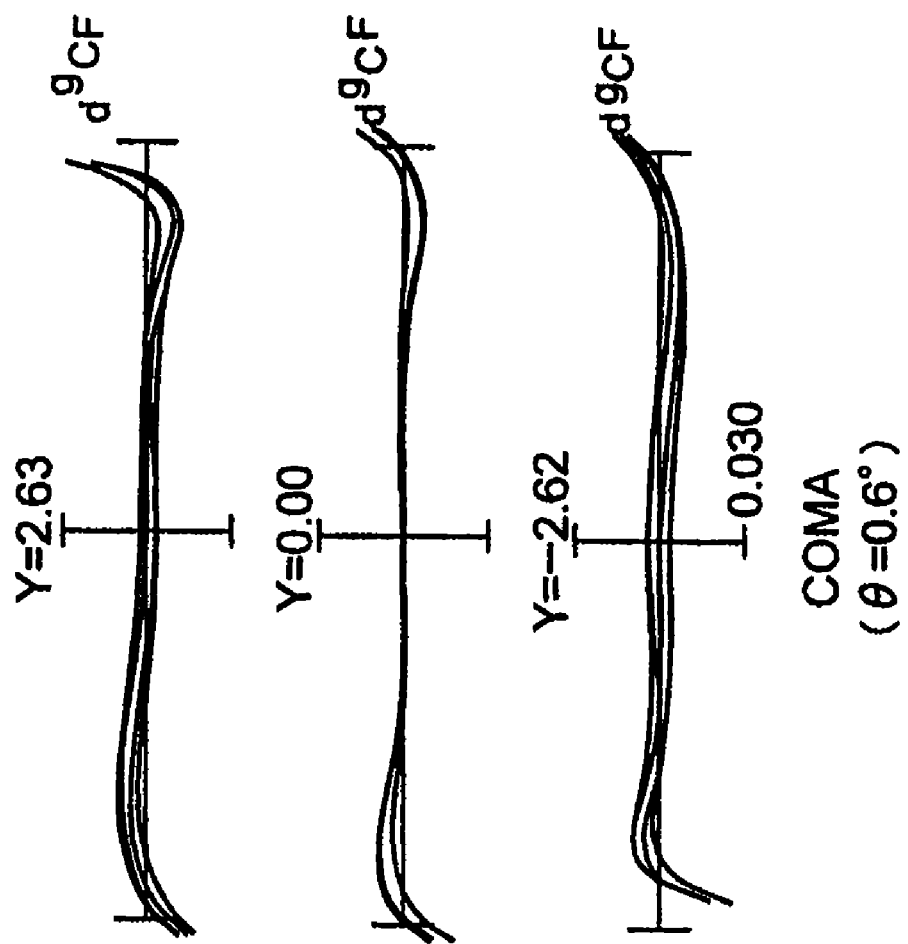
Figure 23C:
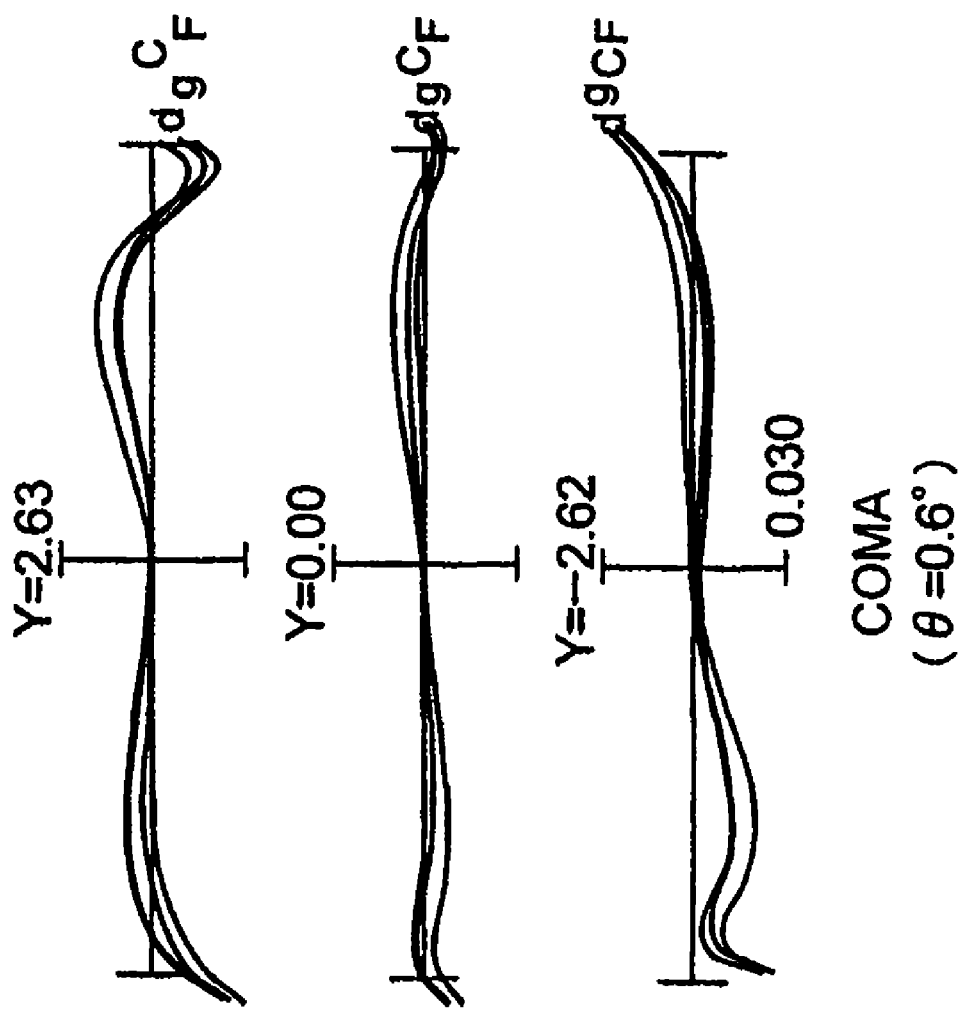

(1): $100 \times \alpha^2/(-f1) \times ft = 0.554$
(2): $fw \times f2/(-f1)^2 = 0.688$
(3): $S2/fw = 0.891$
(4): $FNw \times fw/(-f1) = 2.464$
(5): $\Delta sag/fw = 0.137$
(6): $TLw/f34 = 1.123$
(7): $fw/f45 = -0.743$
(8): $Z \times S1/S2 = 2.694$ FIGS. 22A, 22B and 22C are graphs showing various aberrations of the zoom lens system according to Example 7 upon focusing on infinity, in which FIG. 22A shows the wide-angle end state, FIG. 22B shows the intermediate focal length state, and FIG. 22C shows the telephoto end state. FIGS. 23A, 23B, 23C are graphs showing coma upon shifting a vibration reduction lens group of the zoom lens system according to Example 7, in which FIG. 23A shows the wide-angle end state, FIG. 23B shows the intermediate focal length state, and FIG. 23C shows the telephoto end state.

As is apparent from the respective graphs, the zoom lens system according to Example 6 shows superb optical performance as a result of good corrections to various aberrations over entire zoom range from the wide-angle end state W to the telephoto end state T even in the state upon shifting.

Incidentally, the following description may suitably be applied within limits that do not deteriorate optical performance.

It is preferable that the second lens group or a portion of the second lens group is used as the vibration reduction lens group by shifting in a direction substantially perpendicular to the optical axis. In view of manufacturing tolerance, it is preferable that the second lens group as a whole is shifted in a direction substantially perpendicular to the optical axis. In order to simplify the moving mechanism, it is preferable that only the third lens is shifted in a direction substantially perpendicular to the optical axis. In order to correct aberrations, it is preferable that only the fourth lens is shifted in a direction substantially perpendicular to the optical axis. In addition, it is possible to shift only the fifth lens, or the third lens and the fourth lens as a sub-lens-group.

In order to carry out focusing from infinity to a close-range object, a portion of a lens group, a single lens group, or a plurality of lens groups may be moved along the optical axis. The focusing lens group(s) may be used for auto focus, and suitable for being driven by a motor such as an ultrasonic motor. In a zoom lens system according to the present embodiment, the first lens group may preferably be used for the focusing lens group.

Moreover, any lens surface may be formed as an aspherical surface. The aspherical surface may be fabricated by a fine grinding process, a glass molding process that a glass material is formed into an aspherical shape by a mold, or a compound type process that a resin material is formed into an aspherical shape on a glass lens surface.

Moreover, although an aperture stop is preferably disposed in the vicinity of the second lens group, the function may be substituted by a lens frame without disposing a member as the aperture stop.

An antireflection coating having high transmittance over a broad wavelength range may be applied to each lens surface to reduce flare or ghost images, so that high optical performance with a high contrast can be attained.

The present embodiment only shows a specific example for the purpose of better understanding of the present invention. Accordingly, it is needless to say that the invention in its broader aspect is not limited to the specific details and representative devices shown and described herein, and various modifications may be made without departing from the spirit or scope of the general inventive concept as defined by the appended claims and their equivalents.

What is claimed is:

1. A zoom lens system consisting of, in order from an object side:
   a first lens group having negative refractive power;
   a second lens group having positive refractive power;
   upon varying a state of lens group positions from a wide-angle end state to a telephoto end state, a distance between the first lens group and the second lens group decreases,
   the first lens group consisting of, in order from the object side, a first lens having negative refractive power and a second lens having positive refractive power,
   the second lens group consisting of, in order from the object side, a third lens having positive refractive power, a fourth lens having negative refractive power, and a fifth lens having positive refractive power,
   at least a portion of the second lens group being movable in a direction substantially perpendicular to an optical axis, and
   the following conditional expression being satisfied:

$$0.20 < fw \times f2/(-f1)^2 < 0.35$$

where fw denotes a focal length of the zoom lens system in the wide-angle end state, f1 denotes a focal length of the first lens group, and f2 denotes a focal length of the second lens group.

2. The zoom lens system according to claim 1, wherein the first lens has at least one aspherical surface.

3. The zoom lens system according to claim 2, wherein the aspherical surface is disposed at least on an image side surface of the first lens.

4. The zoom lens system according to claim 2, wherein the following conditional expression is satisfied:

$$0.10 < \Delta sag/fw < 0.50$$

where $\Delta sag = XS(h) - X(h)$, in which sag amounts $XS(h)$ and $X(h)$ are denoted by the following spherical expression $XS(h)$ and aspherical expression $X(h)$ upon $y = h = 0.85r$:

$$XS(y) = y^2 / \left[ r \times \{1 + (1 - y^2/r^2)^{1/2}\} \right]$$

-continued
$$X(y) = y^2 / [r \times \{1 + (1 - K \times y^2/r^2)^{1/2}\}] + C4 \times y^4 + C6 \times y^6 + C8 \times y^8 + C10 \times y^{10}$$

where y denotes a vertical height from the optical axis, X(y) denotes a sag amount which is a distance along the optical axis from the tangent surface at the vertex of the aspherical surface to the aspherical surface at the vertical height y from the optical axis, XS(y) denotes a sag amount which is a distance along the optical axis from the tangent surface at the vertex of the reference sphere at the vertical height y from the optical axis, r denotes a radius of curvature of a reference sphere (paraxial radius of curvature), K denotes a conical coefficient, and Cn denotes aspherical coefficient of n-th order, and where X(y) and XS(y) are positive toward the image plane.

5. The zoom lens system according to claim 1, wherein the third lens, the fourth lens, and the fifth lens are disposed with respective air spaces in between.

6. The zoom lens system according to claim 1, wherein the following conditional expression is satisfied:

$$0.02 < 100 \times \alpha^2/(-f1) \times ft < 2.90$$

where α denotes an amount of shift of at least a portion of the second lens group in the direction substantially perpendicular to the optical axis for vibration reduction, f1 denotes a focal length of the first lens group, and ft denotes a focal length of the zoom lens system in the telephoto end state.

7. The zoom lens system according to claim 1, wherein the following conditional expression is satisfied:

$$0.76 < S2/fw < 1.30$$

where S2 denotes a thickness of the second lens group.

8. The zoom lens system according to claim 1, wherein the following conditional expression is satisfied:

$$1.05 < FNw \times fw/(-f1) < 1.85$$

where FNw denotes an f-number of the zoom lens system in the wide-angle end state.

9. The zoom lens system according to claim 1, wherein the following conditional expression is satisfied:

$$TLw/f34 < 2.90$$

where TLw denotes a total lens length of the zoom lens system in the wide-angle end state, and f34 denotes a focal length of an air distance between the image side surface of the third lens and the object side surface of the fourth lens, which is defined by the following expression:

$$(1/f34) = ((1-n3)/r3R) + ((n4-1)/r4F) + d34 \times ((1-n3)/r3R) \times ((n4-1)/r4F)$$

where r3R denotes a radius of curvature of the image side surface of the third lens, r4F denotes a radius of curvature of the object side surface of the fourth lens, n3 denotes refractive index of the third lens at d-line (λ=587.6 nm), n4 denotes refractive index of the fourth lens at d-line (λ=587.6 nm), and d34 denotes a distance between the image side surface of the third lens and the object side surface of the fourth lens.

10. The zoom lens system according to claim 1, wherein the following conditional expression is satisfied:

$$-1.10 < fw/f45$$

where f45 denotes a focal length of an air distance between the image side surface of the fourth lens and the object side surface of the fifth lens, which is defined by the following expression:

$$(1/f45) = ((1-n4)/r4R) + ((n5-1)/r5F) + d45 \times ((1-n4)/r4R) \times ((n5-1)/r5F)$$

where r4R denotes a radius of curvature of the image side surface of the fourth lens, r5F denotes a radius of curvature of the object side surface of the fifth lens, n4 denotes refractive index of the fourth lens at d-line (λ=587.6 nm), n5 denotes refractive index of the fifth lens at d-line (λ=587.6 nm), and d45 denotes a distance between the image side surface of the fourth lens and the object side surface of the fifth lens.

11. The zoom lens system according to claim 1, wherein the third lens has at least one aspherical surface.

12. The zoom lens system according to claim 1, wherein the following conditional expression is satisfied:

$$1.85 < Z \times S1/S2 < 5.00$$

where S1 denotes a thickness of the first lens group, S2 denotes a thickness of the second lens group, and Z denotes a zoom ratio.

13. An optical apparatus using the zoom lens system according to claim 1.

14. A method for correcting an image blur of a zoom lens system that consists of, in order from an object side, a first lens group having negative refractive power and a second lens group having positive refractive power, a distance between the first lens group and the second lens group decreasing upon varying a state of lens group positions from a wide-angle end state to a telephoto end state, the first lens group consisting of, in order from the object side, a first lens having negative refractive power and a second lens having positive refractive power, and the second lens group consisting of, in order from the object side, a third lens having positive refractive power, a fourth lens having negative refractive power, and a fifth lens having positive refractive power, the method comprising a step of:
shifting at least a portion of the second lens group in a direction substantially perpendicular to an optical axis, and
the following conditional expression being satisfied:

$$0.20 < fw \times f2/(-f1)^2 < 0.35$$

where fw denotes a focal length of the zoom lens system in the wide-angle end state, f1 denotes a focal length of the first lens group, and f2 denotes a focal length of the second lens group.

15. The method according to claim 14, wherein the first lens has at least one aspherical surface, and the aspherical surface is disposed at least on an image side surface of the first lens.

16. The method according to claim 15, wherein the following conditional expression is satisfied:

$$0.10 < \Delta sag/fw < 0.50$$

where Δsag=XS(h)−X(h), in which sag amounts XS(h) and X(h) are denoted by the following spherical expression XS(h) and aspherical expression X(h) upon y=h=0.85r:

$$XS(y) = y^2 / \left[ r \times \{1 + (1 - y^2/r^2)^{1/2}\} \right]$$

$$X(y) = y^2 / \left[ r \times \{1 + (1 - K \times y^2/r^2)^{1/2}\} \right] + C4 \times y^4 + C6 \times y^6 + C8 \times y^8 + C10 \times y^{10}$$

where y denotes a vertical height from the optical axis, X(y) denotes a sag amount which is a distance along the optical axis from the tangent surface at the vertex of the aspherical surface to the aspherical surface at the vertical height y from the optical axis, XS(y) denotes a sag amount which is a distance along the optical axis from the tangent surface at the vertex of the reference sphere at the vertical height y from the optical axis, r denotes a radius of curvature of a reference sphere (paraxial radius of curvature), K denotes a conical coefficient, and Cn denotes aspherical coefficient of n-th order, and where X(y) and XS(y) are positive toward the image plane.

17. The method according to claim 14, wherein the following conditional expression is satisfied:

$$0.02 < 100 \times \alpha^2/(-f1) \times ft < 2.90$$

where α denotes an amount of shift of at least a portion of the second lens group in the direction substantially perpendicular to the optical axis for vibration reduction and ft denotes a focal length of the zoom lens system in the telephoto end state.

18. The method according to claim 14, wherein the following conditional expression is satisfied:

$$0.76 < S2/fw < 1.30$$

where S2 denotes a thickness of the second lens group.

19. The method according to claim 14, wherein the following conditional expression is satisfied:

$$1.85 < Z \times S1/S2 < 5.00$$

where S1 denotes the thickness of the first lens group, S2 denotes the thickness of the second lens group, and Z denotes a zoom ratio.

20. A method for varying a focal length of a zoom lens system that consists of, in order from an object side, a first lens group having negative refractive power and a second lens group having positive refractive power, the first lens group consisting of, in order from the object side, a first lens having negative refractive power and a second lens having positive refractive power, and the second lens group consisting of, in order from the object side, a third lens having positive refractive power, a fourth lens having negative refractive power, and a fifth lens having positive refractive power, and the second lens group as a whole being shiftable in a direction substantially perpendicular to an optical axis, the method comprising a step of:

decreasing a distance between the first lens group and the second lens group upon varying a state of lens group positions from a wide-angle end state to a telephoto end state, wherein the following conditional expression is satisfied:

$$0.20 < fw \times f2/(-f1)^2 < 0.35$$

where fw denotes a focal length of the zoom lens system in the wide-angle end state, f1 denotes a focal length of the first lens group, and f2 denotes a focal length of the second lens group.

21. The method according to claim 20, wherein the first lens has at least one aspherical surface.

22. The method according to claim 20, wherein the third lens, the fourth lens, and the fifth lens are disposed with respective air spaces in between.

23. A zoom lens system consisting of, in order from an object side:

a first lens group having negative refractive power;
a second lens group having positive refractive power;
upon varying a state of lens group positions from a wide-angle end state to a telephoto end state, a distance between the first lens group and the second lens group decreases,
the first lens group consisting of, in order from the object side, a first lens having negative refractive power and a second lens having positive refractive power,
the second lens group consisting of, in order from the object side, a third lens having positive refractive power, a fourth lens having negative refractive power, and a fifth lens having positive refractive power, and
the second lens group as a whole being movable in a direction substantially perpendicular to an optical axis,
wherein the following conditional expression is satisfied:

$$0.20 < fw \times f2/(-f1)^2 < 0.35$$

where fw denotes a focal length of the zoom lens system in the wide-angle end state, f1 denotes a focal length of the first lens group, and f2 denotes a focal length of the second lens group.

24. The zoom lens system according to claim 23, wherein the following conditional expression is satisfied:

$$-1.10 < fw/f45$$

where f45 denotes a focal length of an air distance between the image side surface of the fourth lens and the object side surface of the fifth lens, which is defined by the following expression:

$$(1/f45) = ((1-n4)/r4R) + ((n5-1)/r5F) + d45 \times ((1-n4)/r4R) \times ((n5-1)/r5F)$$

where r4R denotes a radius of curvature of the image side surface of the fourth lens, r5F denotes a radius of curvature of the object side surface of the fifth lens, n4 denotes refractive index of the fourth lens at d-line (λ=587.6 nm), n5 denotes refractive index of the fifth lens at d-line (λ=587.6 nm), and d45 denotes a distance between the image side surface of the fourth lens and the object side surface of the fifth lens.

* * * * *